(12) United States Patent
Yeo et al.

(10) Patent No.: US 11,183,882 B2
(45) Date of Patent: Nov. 23, 2021

(54) WIRELESS POWER TRANSMITTER, ELECTRONIC DEVICE RECEIVING POWER WIRELESSLY, AND METHOD FOR OPERATING SAME

(71) Applicant: SAMSUNG ELECTRONICS CO., LTD., Suwon-si (KR)

(72) Inventors: Sung-Ku Yeo, Seoul (KR); Chang-Yeong Kim, Seoul (KR); Joon-Hyun Lee, Seoul (KR); Sang-Wook Kwon, Seongnam-si (KR); Sung-Bum Park, Suwon-si (KR); Jae-Hyun Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 42 days.

(21) Appl. No.: 16/488,155

(22) PCT Filed: Feb. 20, 2018

(86) PCT No.: PCT/KR2018/002066
§ 371 (c)(1),
(2) Date: Aug. 22, 2019

(87) PCT Pub. No.: WO2018/155881
PCT Pub. Date: Aug. 30, 2018

(65) Prior Publication Data
US 2020/0021138 A1    Jan. 16, 2020

Related U.S. Application Data

(60) Provisional application No. 62/462,020, filed on Feb. 22, 2017.

(30) Foreign Application Priority Data

Apr. 21, 2017 (KR) .......................... 10-2017-0051476

(51) Int. Cl.
*H02J 50/12* (2016.01)
*H02J 50/90* (2016.01)
(Continued)

(52) U.S. Cl.
CPC ............ *H02J 50/12* (2016.02); *H01Q 9/0414* (2013.01); *H02J 7/025* (2013.01); *H02J 50/20* (2016.02);
(Continued)

(58) Field of Classification Search
CPC .. H02J 50/12; H02J 50/90; H02J 50/20; H02J 50/40; H02J 50/50; H02J 50/60; H02J 7/025; H02J 50/10; H01Q 9/0414
See application file for complete search history.

(56) References Cited

U.S. PATENT DOCUMENTS 9,825,674 B1 * 11/2017 Leabman ................ H02J 50/20
10,333,357 B1 * 6/2019 Abu Qahouq .......... H02J 50/40
(Continued)

FOREIGN PATENT DOCUMENTS

EP          2 387 127 A2      11/2011
KR    10-2010-0134774 A      12/2010
(Continued)

OTHER PUBLICATIONS

International Search Report (PCT/ISA/210) dated May 21, 2018 issued by the International Searching Authority in International Application No. PCT/KR2018/002066.
(Continued)

*Primary Examiner* — Hal Kaplan
*Assistant Examiner* — Joseph N Inge
(74) *Attorney, Agent, or Firm* — Sughrue Mion, PLLC

(57) ABSTRACT

A wireless power transmitter according to various embodiments of the present invention can comprise a plurality of patch antennas, a coil, and a processor. The processor can
(Continued)

control such that an electronic device is detected, the plurality of patch antennas and/or the coil is selected as a power transmission circuit for transmitting power for charging the electronic device, and power is transmitted by means of the plurality of patch antennas and/or the coil in accordance with the selection.

14 Claims, 43 Drawing Sheets

(51) Int. Cl.
  *H02J 50/20* (2016.01)
  *H02J 50/40* (2016.01)
  *H02J 50/50* (2016.01)
  *H02J 50/60* (2016.01)
  *H01Q 9/04* (2006.01)
  *H02J 7/02* (2016.01)

(52) U.S. Cl.
  CPC .............. *H02J 50/40* (2016.02); *H02J 50/50* (2016.02); *H02J 50/60* (2016.02); *H02J 50/90* (2016.02)

(56) References Cited

U.S. PATENT DOCUMENTS

| | | | |
|---|---|---|---|
| 2008/0054638 A1 | 3/2008 | Greene et al. | |
| 2010/0038970 A1 | 2/2010 | Cook et al. | |
| 2010/0225272 A1 | 9/2010 | Kirby et al. | |
| 2010/0277003 A1 | 11/2010 | Von Novak et al. | |
| 2011/0241616 A1 | 10/2011 | Kim et al. | |
| 2011/0279244 A1 | 11/2011 | Park et al. | |
| 2011/0309689 A1 | 12/2011 | Kamata | |
| 2014/0354063 A1 | 12/2014 | Leabman et al. | |
| 2015/0008736 A1* | 1/2015 | Uchida | H02J 50/90 307/18 |
| 2015/0022009 A1 | 1/2015 | Leabman et al. | |
| 2015/0102773 A1 | 4/2015 | Song | |
| 2015/0241999 A1* | 8/2015 | Bae | G06F 3/038 345/163 |
| 2015/0263535 A1 | 9/2015 | Bae | |
| 2015/0371771 A1* | 12/2015 | Abu Qahouq | H02J 50/90 307/104 |
| 2016/0094092 A1 | 3/2016 | Davlantes et al. | |
| 2016/0099614 A1* | 4/2016 | Leabman | H02J 50/90 307/104 |
| 2016/0099756 A1 | 4/2016 | Leabman et al. | |
| 2016/0183056 A1 | 6/2016 | Leabman | |
| 2016/0211704 A1* | 7/2016 | Uchida | H02J 50/12 |
| 2016/0254705 A1* | 9/2016 | Jung | H02J 50/40 307/104 |
| 2016/0268842 A1* | 9/2016 | Wang | H02J 50/12 |
| 2016/0359370 A1 | 12/2016 | Park et al. | |
| 2017/0047786 A1* | 2/2017 | Park | H02J 50/80 |
| 2017/0187248 A1* | 6/2017 | Leabman | H02J 50/20 |
| 2017/0237293 A1* | 8/2017 | Faraone | H02J 50/12 713/300 |
| 2017/0324447 A1 | 11/2017 | Park | |
| 2018/0145544 A1* | 5/2018 | Park | H04W 4/80 |
| 2018/0183259 A1* | 6/2018 | Lee | H02J 7/04 |
| 2018/0294681 A1* | 10/2018 | Bae | H02J 50/90 |
| 2020/0252141 A1* | 8/2020 | Sarajedini | H02J 50/40 |

FOREIGN PATENT DOCUMENTS

| | | |
|---|---|---|
| KR | 10-2011-0122728 A | 11/2011 |
| KR | 10-2011-0125755 A | 11/2011 |
| KR | 10-2011-0134912 A | 12/2011 |
| KR | 10-2014-0095655 A | 8/2014 |
| KR | 10-2016-0054410 A | 5/2016 |
| KR | 10-2016-0093127 A | 8/2016 |
| KR | 10-2016-0125048 A | 10/2016 |
| WO | 2011032048 A1 | 3/2011 |

OTHER PUBLICATIONS

Written Opinion (PCT/ISA/237) dated May 21, 2018 issued by the International Searching Authority in International Application No. PCT/KR2018/002066.
Communication dated Dec. 2, 2019 issued by the European Patent Office in counterpart European Application No. 18757957.8.
Communication dated Sep. 23, 2021, issued by the Korean Intellectual Property Office in Korean Patent Application No. 10-2017-0051476.

* cited by examiner ved to the U.S. Patent and Trademark Office, and Korean Patent
WIRELESS POWER TRANSMITTER, ELECTRONIC DEVICE RECEIVING POWER WIRELESSLY, AND METHOD FOR OPERATING SAME

CROSS-REFERENCE TO RELATED APPLICATION(S)

This application is a National Phase Entry of PCT International Application No. PCT/KR2018/002066, which was filed on Feb. 20, 2018, and claims priority to U.S. Provisional Application No. 62/462,020, filed on Feb. 22, 2017 in the U.S. Patent and Trademark Office, and Korean Patent Application No. 10-2017-0051476, filed on Apr. 21, 2017 in the Korean Intellectual Property Office, the entire disclosure of each of these applications is incorporated herein by reference.

TECHNICAL FIELD

Various embodiments of the disclosure relate to a wireless power transmitter that transmits power wirelessly, an electronic device that receives power wirelessly, and operation methods therefor.

BACKGROUND ART

Portable digital communication devices have become essential to many people in modern times. Customers desire to receive various high-quality services anywhere and anytime. In addition, recently various sensors, home appliances, communication devices or the like existing in our lives have been connected over a network through the Internet of Things (IoT). A wireless power transmission system is required to smoothly operate the various sensors.

Wireless power transmission has a magnetic induction scheme, a magnetic resonance scheme, and an electromagnetic wave scheme. The magnetic induction scheme or the magnetic resonance scheme is advantageous for charging an electronic device located relatively close to a wireless power transmitter. The electromagnetic wave scheme is more advantageous for long-distance power transmission to several meters compared to the magnetic induction scheme or the magnetic resonance scheme. The electromagnetic wave scheme is mainly used for long distance power transmission, and can most efficiently transfer power by recognizing an accurate location of a power receiver located at a long distance.

DETAILED DESCRIPTION OF THE INVENTION

Technical Problem

A location of a wireless power transmitter is primarily fixed, and thus a distance from the wireless power transmitter to an electronic device is changed frequently. For example, a user may have an electronic device, such as a mobile device, and may be located close to a wireless power transmitter or may be located remotely from the wireless power transmitter.

If the wireless power transmitter performs charging according to one charging method, there may arise a problem of performing charging at a relatively low efficiency depending on the distance between the wireless power transmitter and the electronic device. For example, when the wireless power transmitter uses an electromagnetic wave scheme that is advantageous for long distance power transmission, the electromagnetic wave scheme should be used even when the electronic device is close to the wireless power transmitter. When the electronic device is in the vicinity, an induction scheme or a resonance scheme may have a higher transmission efficiency.

Various embodiments of the disclosure may provide a wireless power transmitter and an operation method therefor, the wireless power transmitter including a power transmission circuit of an electromagnetic wave scheme that is advantageous for long distance transmission, and a power transmission circuit of an induction or resonance scheme that is advantageous for short distance transmission. Various embodiments of the disclosure may provide an electronic device and an operation method therefor, the electronic device including a power reception circuit of an electromagnetic wave scheme that is advantageous for long distance transmission, and a power reception circuit of an induction or resonance scheme that is advantageous for short distance transmission.

Technical Solution

A wireless power transmitter according to various embodiments of the disclosure may include: multiple patch antennas; a coil, and a processor, wherein the processor is configured to control to detect an electronic device, select at least one of the coil or the multiple patch antennas, as a power transmission circuit to transmit power for charging the electronic device, and transmit the power through at least one of the coil or the multiple patch antennas according to the selection.

An electronic device according to the various embodiments of the disclosure may include: multiple patch antennas; a coil; a communication circuit; and a processor, wherein the processor is configured to control to select at least one of the coil or the multiple patch antennas, as a power reception circuit to receive power from a power transmitter, transmit information of the selected power reception circuit to the wireless power transmitter through the communication circuit, and receive the power through at least one of the coil or the multiple patch antennas according to the selection.

An operation method of a wireless power transmitter including multiple patch antennas and a coil according to various embodiments of the disclosure may include: detecting an electronic device; selecting at least one of the coil or the multiple patch antennas, as a power transmission circuit to transmit power for changing the electronic device; and transmitting the power through at least one of the coil or the multiple patch antennas according to the selection.

An operation method of an electronic device including multiple patches according to the various embodiments of the disclosure may include: multiple patch antennas; a coil; a communication circuit; and a processor, wherein the processor is configured to control to select at least one of the coil or the multiple patch antennas, as a power reception circuit to receive power from a power transmitter, transmit information of the selected power reception circuit to the wireless power transmitter through the communication circuit, and receive the power through at least one of the coil or the multiple patch antennas according to the selection.

Advantageous Effects

Various embodiments of the disclosure may provide a wireless power transmitter and an operation method therefor, the wireless power transmitter configured to transmit power according to at least one of an electromagnetic wave scheme, a resonance scheme, or an induction scheme on the basis of a distance. Various embodiments of the disclosure may provide a wireless power transmitter and an operation method therefor, the wireless power transmitter configured to transmit power according to at least one of an electromagnetic wave scheme, a resonance scheme, or an inductive scheme on the basis of not only a distance but also various information, such as a charging scheme compatible with an electronic device, information related to power received by the electronic device, charging-related information of the electronic device, a wireless power transmission efficiency, a wireless power transmission-related protocol, the presence or absence of an obstacle, or the like. Various embodiments of the disclosure may provide a wireless power transmitter and an operation method therefor, the wireless power transmitter configured to receive power according to at least one of an electromagnetic wave scheme, a resonance scheme, or an induction scheme on the basis of a distance. Various embodiments of the disclosure may provide an electronic device and an operation method therefor, the electronic device configured to receive power according to at least one of an electromagnetic wave scheme, a resonance scheme, or an inductive scheme on the basis of not only a distance but also various information, such as a charging scheme compatible with the electronic device, information related to power received by the electronic device, charging-related information of the electronic device, a wireless power transmission efficiency, a wireless power transmission-related protocol, the presence or absence of an obstacle, or the like.

MODE FOR CARRYING OUT THE INVENTION

Figure 1:
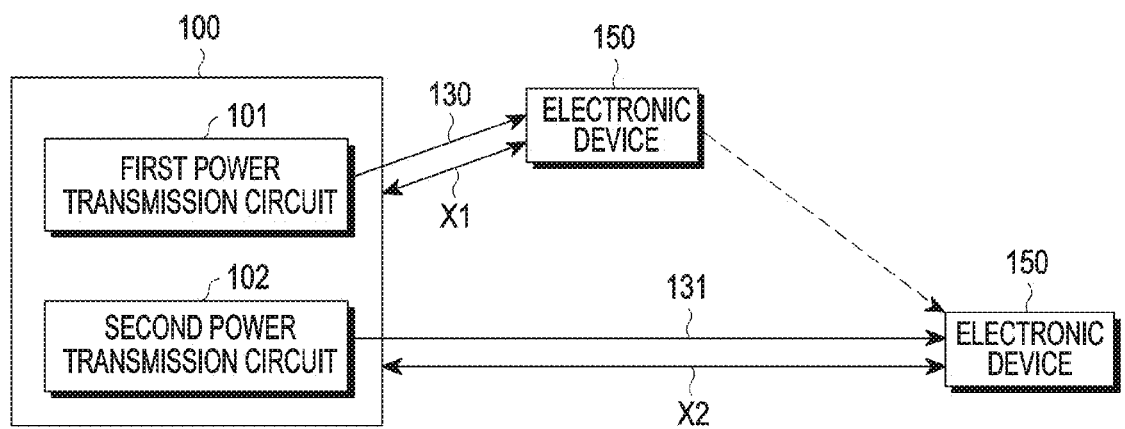
FIG. 1 illustrates a conceptual diagram for explaining a wireless power transmitter and an electronic device according to various embodiments of the disclosure.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

A wireless power transfer device or electronic device according to various embodiments of the disclosure may include at least one of, for example, a smartphone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the wireless power transfer device or electronic device may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a media box, a game console, an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Navigation Satellite System (GNSS) receiver, an Event Data Recorder (EDR), a Flight Data Recorder (FDR), a Vehicle Infotainment Device, an electronic device for a ship (e.g., a navigation device for a ship and a gyro-compass), avionics, security devices, an automotive head unit, a robot for home or industry, a drone, an automatic teller's machine (ATM) in banks, point of sales (POS) in a shop, or an Internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, a wireless power transmitter, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the wireless power transmitter or the electronic device may be flexible, or may be a combination of one or more of the aforementioned various devices. The wireless power transmitter or the electronic device according to embodiments of the disclosure is not limited to the above described devices. In the disclosure, the term "user" may indicate a person using an electronic device or a device (e.g., an artificial intelligence electronic device) using a wireless power transmitter or an electronic device.

FIG. 1 illustrates a conceptual diagram for explaining a wireless power transmitter and an electronic device according to various embodiments of the disclosure.

A wireless power transmitter 100 may include a first power transmission circuit 101 and a second power transmission circuit 102. The first power transmission circuit 101 may be implemented, for example, as a power transmission circuit by an induction scheme. When implemented as a power transmission circuit by the induction scheme, the first power transmission circuit 101 may include, for example, a power source, a DC-to-AC conversion circuit, an amplification circuit, an impedance matching circuit, at least one capacitor, at least one coil, a communication modulation/demodulation circuit, and the like. At least one capacitor and at least one coil may constitute a resonance circuit. The first power transmission circuit 101 may be implemented in a scheme defined in a Wireless Power Consortium (WPC) standard (or a Qi standard). The first power transmission circuit 101 may be implemented, for example, as a power transmission circuit by a resonance scheme. When implemented as a power transmission circuit by the resonance scheme, the first power transmission circuit 101 may include, for example, a power source, a DC-to-AC conversion circuit, an amplification circuit, an impedance matching circuit, at least one capacitor, at least one coil, an out-band communication circuit (e.g., a Bluetooth Low Energy (BLE) communication circuit), and the like. At least one capacitor and at least one coil may constitute a resonance circuit. The first power transmission circuit 101 may be implemented in a scheme defined in an Alliance for Wireless Power (A4WP) standard (or an Air Fuel Alliance (AFA) standard). The first transmission circuit 101 may include a coil that can generate an induction magnetic field 130 when current flows according to the resonance scheme or the induction scheme. According to an embodiment, the first power transmission circuit 101 may include both of the power transmission circuit by the induction scheme and the power transmission circuit by the resonance scheme.

The second power transmission circuit 102 may be implemented, for example, as a power transmission circuit by an electromagnetic wave scheme. The second power transmission circuit 102 may include, for example, a power source, a DC-to-AC conversion circuit, an amplification circuit, a distribution circuit, a phase shifter, a power transmission antenna array including multiple patch antennas, a communication module (e.g., a BLE communication module) of an out-band scheme, and the like. Each of the multiple patch antennas may form a radio frequency (RF) wave.

For example, when an electronic device 150 is located a first distance X1 away from the wireless power transmitter 100, the wireless power transmitter 100 may transmit power to the electronic device 150 via the first power transmission circuit 101. The magnetic field 130 generated from the coil included in the first power transmission circuit 101 may be transferred to the electronic device 150 and, accordingly, transmission of power 130 through the coil may be referred to as generation of the magnetic field 130 through the coil. The magnetic field 130 may change in magnitude over time. Transmission of power through the coil may be referred to as transfer energy through the coil. The electronic device 150 may include a coil, and an induced electromotive force may be generated in the coil by the magnetic field 130, the magnitude of which varies over time at which the magnetic field is generated in the vicinity. A procedure of generation of an induced electromotive force may be referred to as reception of power or energy by the electronic device 150 through the coil. In the case of being separated by the first distance X1, transmission of power through the first transmission circuit 101 according to the induction scheme or the resonance scheme may be determined by the wireless power transmitter 100 or may be determined by the electronic device 150.

For example, when the electronic device 150 is located a second distance X2 away from the wireless power transmitter 100, the wireless power transmitter 100 may transmit power to the electronic device 150 via the second power transmission circuit 102. An RF wave 131 generated from multiple patch antennas included in the second power transmission circuit 102 may be transferred to the electronic device 150 and, accordingly, transmission of power through the multiple patch antennas may be referred to as generation of the RF wave 131 through the plurality of patch antennas. The RF wave 131 may change in magnitude over time. Transmission of power through multiple patch antennas may be referred to as transferring energy through the multiple patch antennas. Formation of the RF wave 131 will be described in more detail with reference to FIG. 2. The electronic device 150 may include multiple patch antennas for reception, and the patch antennas may generate current or voltage by the RF wave 131, the magnitude of which varies over time at which the RF wave 131 is generated in the vicinity. A procedure of generating current or voltage by the multiple patch antennas may be referred to as reception of current or energy through the multiple patch antennas by the electronic device 150. In the case of being separated by the second distance X2, transmission of power through the second transmission circuit 102 according to the electromagnetic wave scheme may be determined by the wireless power transmitter 100 or may be determined by the electronic device 150.

In various embodiments of the disclosure, if the electronic device 150 is located at the first distance X1 away from the wireless power transmitter 100, and then moves so as to be located at the second distance X2 away from the wireless power transmitter 100, the wireless power transmitter 100 may change the power transmission circuit from the first power transmission circuit 101 to the second power transmission circuit 102.

In various embodiments of the disclosure, when the electronic device 150 is located the first distance X1 away from the wireless power transmitter 100, the wireless power transmitter 100 may transmit energy by using both the first power transmission circuit 101 and the second power transmission circuit 102. For example, when rapid charging of the electronic device 150 is required, the wireless power transmitter 100 may transmit energy by using multiple power transmission circuits.

In various embodiments of the disclosure, when the electronic device 150 is located the first distance X1 away from the wireless power transmitter 100, the wireless power transmitter 100 may also transmit energy in the electromagnetic wave scheme through the second power transmission circuit 102. For example, when the electronic device 150 supports only the electromagnetic wave scheme, the wireless power transmitter 100 may transmit energy through the second power transmission circuit 102 on the basis of information of a support scheme. The wireless power transmitter 100 or the electronic device 150 may determine a charging scheme according to various information, such as a charging scheme compatible with the electronic device, information relating to power received by the electronic device, information relating to charging the electronic device, a wireless power transmission efficiency, a wireless power transmission-related protocol, the presence or absence of an obstacle, and the like. The wireless power transmitter 100 may transmit energy by using a power transmission circuit corresponding to the determined charging scheme.

Figure 2:
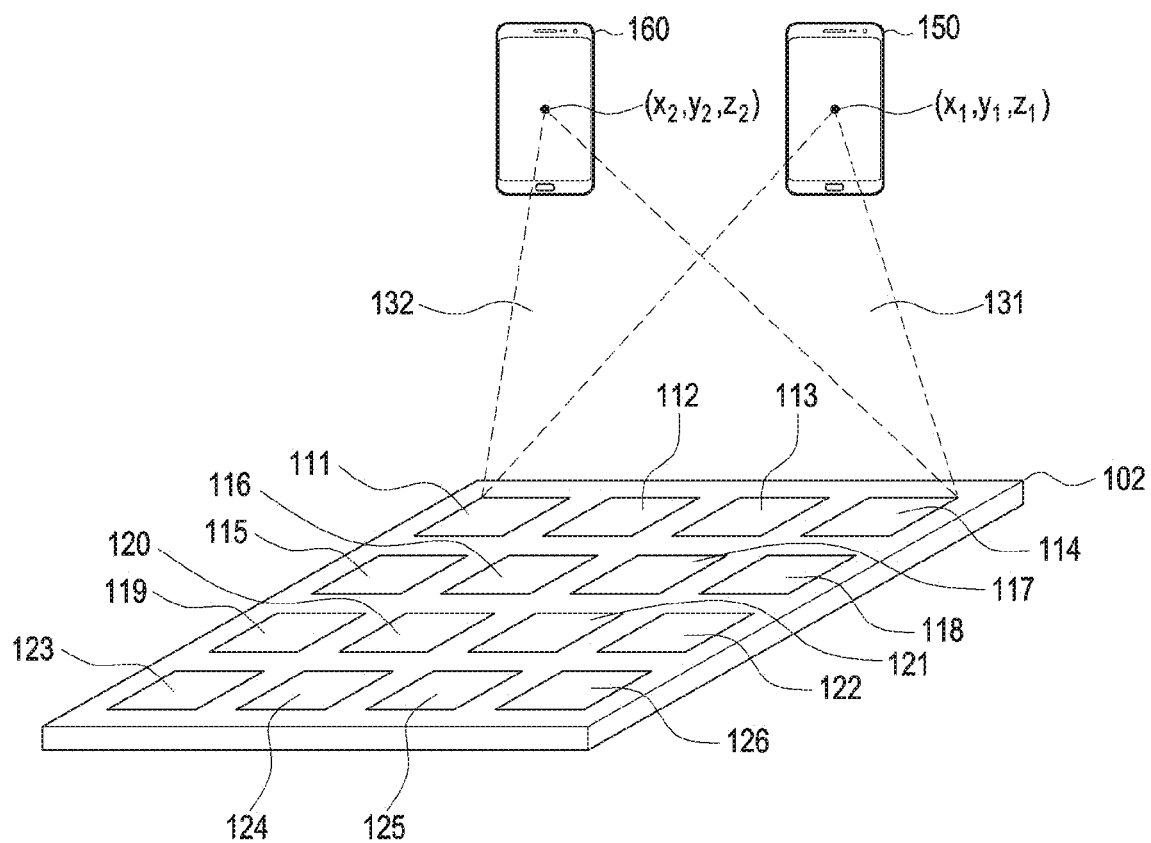
FIG. 2 illustrates a conceptual diagram of a wireless power transmission system according to various embodiments of the disclosure.

FIG. 2 illustrates a conceptual diagram of a wireless power transmission system according to various embodiments of the disclosure.

The second power transmission circuit 102 may transmit power wirelessly to at least one of electronic devices 150 and 160. In various embodiments of the disclosure, the second power transmission circuit 102 may include multiple patch antennas 111 to 126. There may be no restriction for the patch antennas 111 to 126 as long as the patch antennas are capable of generating RF waves 131 and 132, respectively. At least one of amplitudes and phases of the RF waves generated by the patch antennas 111 to 126 may be adjusted by the second power transmission circuit 102 or a processor of the wireless power transmitter 100. For ease of description, RF waves generated by the respective patch antennas 111 to 126 may be referred to as sub-RF waves.

In various embodiments of the disclosure, the second power transmission circuit 102 may adjust at least one of amplitudes and phases of sub-RF waves generated by the patch antennas 111 to 126, respectively. The sub-RF waves may mutually interfere with one another. For example, the sub-RF waves may be constructively interfering with each other at one point, and may be destructively interfering with each other at another point. The wireless second power transmission circuit 102 according to various embodiments of the disclosure may adjust at least one of the amplitudes and the phases of the respective sub-RF waves generated by the patch antennas 111 to 126, so that the sub-RF waves constructively interfere with each other at a first point (x1,y1,z1).

For example, the wireless power transmitter 100 may determine that the electronic device 150 is disposed at the first point (x1,y1,z1). The location of the electronic device 150 may be a point at which a power reception antenna of the electronic device 150 is located. The wireless power transmitter 100 may determine the location of the electronic device 150 according to various schemes. For example, the wireless power transmitter 100 may determine the location of the electronic device 150 according to vision recognition or radar recognition. For example, the wireless power transmitter 100 may receive communication signals (e.g., BLE communication signals) received from the electronic device 150 through multiple communication antennas, and may determine the location of the electronic device 150 by using information on time points of the respective multiple communication antennas. The wireless power transmitter 100 may determine a direction in which the electronic device 150 is located, according to various schemes such as a time difference of arrival (TDOA) scheme, a frequency difference of arrival (FDOA), or the like. The wireless power transmitter 100 may determine a distance between the wireless power transmitter 100 and the electronic device 150 on the basis of a difference between the transmission intensity included in the communication signals and the reception intensity received by the communication antennas. The wireless power transmitter 100 may determine the location of the electronic device 150 on the basis of the determined direction and the determined distance. For example, the wireless power transmitter 100 may form testing RF waves according to multiple directions and multiple distances. The electronic device 150 may report information (e.g., information of voltage at an output terminal of a rectifier of the electronic device 150, etc.) of the magnitude of received power to the wireless power transmitter 100. The wireless power transmitter 100 may determine that the electronic device 150 is located at a place that is reported to be optimal for power reception. The electronic device 150 may first determine, on the basis of the communication signals, the direction in which the electronic device 150 is located, and then may form testing RF waves in the corresponding direction. For example, the wireless power transmitter 100 may modulate the testing RF waves, and include at least one of identification information of the direction or identification information of the distance for the testing RF waves. The electronic device 150 may demodulate the received testing RF waves, and may report at least one of the identification information of the direction or the identification information of the distance, which are included in a demodulation result, to the wireless power transmitter 100 through the communication circuit. The wireless power transmitter 100 may determine the location of the electronic device 150 on the basis of at least one of the identification information of the direction and the identification information of the distance which are included in a report result. The wireless power transmitter 100 may form pilot RF waves in multiple directions and then store, as reference information, information (e.g., a phase error, a time of flight (TOF), etc.) on reflection waves of the pilot RF waves. The wireless power transmitter 100 may form pilot RF waves periodically or aperiodically, may receive reflection waves, and may determine that the electronic device 150 is located in the corresponding direction when it is detected that there is a difference between information of the reflection waves and previously stored reference information. For example, the wireless power transmitter 100 may receive information on the location of the electronic device 150 from another external electronic device. For example, the wireless power transmitter 100 may directly receive information on the location from the electronic device 150. The described method of determining the location of the electronic device 150 by the wireless power transmitter 100 is merely exemplary, and those skilled in the art would easily understand that there is no limitation on relation to the technology of determining a location.

In order to allow the electronic device 150 to wirelessly receive power with a high transmission efficiency, sub-RF waves need to be constructively interfered at the first point (x1,y1,z1). Accordingly, the second power transmission circuit 102 may control the patch antennas 111 to 126 so that the sub-RF waves are constructively interfered at the first point (x1,y1,z1). Here, controlling the patch antennas 111 to 126 may indicate controlling the magnitudes of signals input to the respective patch antennas 111 to 126 or controlling the phases (or delays) of signals input to the respective patch antennas 111 to 126. Those skilled in the art may readily understand beamforming which is a technology for controlling RF waves to be constructively interfered at a predetermined point. Additionally, those skilled in the art may readily understand that the type of beamforming used in the disclosure is not limited. For example, various beamforming methods may be used, such as methods disclosed in U.S. patent No. 2016/0099611, U.S. patent No. 2016/0099755, U.S. patent No. 2016/0100124, and the like. The form of RF waves formed by beamforming may be referred to as pockets of energy.

Accordingly, an RF wave 131 including sub-RF waves may have a maximum amplitude at the first point (x1,y1,z1) and, accordingly, the electronic device 150 may receive wireless power with high efficiency. The second power transmission circuit 102 may sense that an electronic device 160 is disposed at a second point (x2,y2,z2). In order to charge the electronic device 160, the second power transmission circuit 102 may control the patch antennas 111 to 126 so that the sub-RF waves are constructively interfered at the second point (x2,y2,z2). Accordingly, an RF wave 132 including sub-RF waves may have a maximum amplitude at the second point (x2,y2,z2) and, accordingly, the electronic device 160 may receive wireless power with a high transmission efficiency.

More particularly, the electronic device 150 may be disposed relatively on the right side. In this case, the second power transmission circuit 102 may apply a relatively higher delay to the sub-RF waves formed from the patch antennas (e.g., 114, 118, 122, and 126) disposed relatively on the right side. That is, sub-RF waves may be generated from patch antennas (e.g., patch antennas 114, 118, 122, and 126) disposed relatively on the right side at a predetermined period of time after sub-RF waves are formed, which are formed by patch antennas (e.g., patch antennas 111, 115, 119, and 123) disposed relatively on the left side. Accordingly, the sub-RF waves may simultaneously meet at a point relatively on the relatively right side. That is, the sub-RF waves may be constructively interfered at the point relatively on the right side. When beamforming is performed at a relatively center point, the second power transmission circuit 102 may apply substantially the same delay to the left side patch antennas (e.g., patch antennas 111, 115, 119, and 123) and the right side patch antennas (e.g., patch antennas 114, 118, 122, and 126). Also, when beamforming is performed at a point relatively on the left side, the second power transmission circuit 102 may apply a higher delay to the left side patch antennas (e.g., patch antennas 111, 115, 119, and 123) than to the right side patch antennas (e.g., patch antennas 114, 118, 122, and 126). According to another embodiment, the second power transmission circuit 102 may oscillate the sub-RF waves by all the patch antennas 111 to 126 at substantially the same time, and may perform beamforming by adjusting a phase corresponding to the above described delay. As described above, the wireless power transmitter 100 may transmit power or energy to the located electronic device 150 through the multiple patch antennas 111 to 126 included in the second power transmission circuit 102.

Figure 3A:
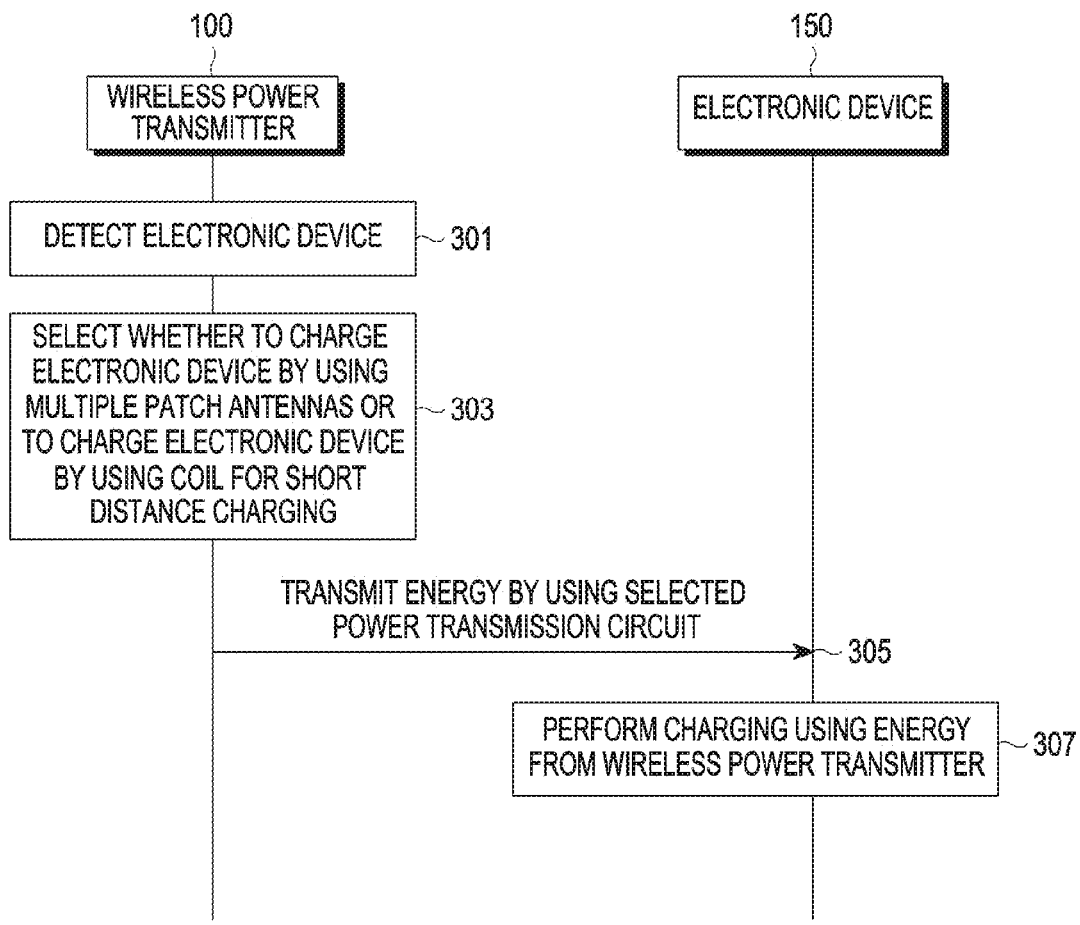
FIG. 3A illustrates a flowchart for explaining operation methods of the wireless power transmitter and the electronic device according to various embodiments of the disclosure.

FIG. 3A illustrates a flowchart for explaining operation methods of the wireless power transmitter and the electronic device according to various embodiments of the disclosure.

In operation 301, the wireless power transmitter 100 may detect the electronic device 150. In the disclosure, performing a specific operation by the wireless power transmitter 100 or the electronic device 150 may refer to performing a specific operation by various hardware included in the wireless power transmitter 100 or the electronic device 150, for example, a control circuit such as a processor. Alternatively, performing a specific operation by the wireless power transmitter 100 or the electronic device 150 may refer to controlling, by a processor, other hardware to perform the specific operation. Alternatively, performing a specific operation by the wireless power transmitter 100 or the electronic device 150 may refer to causing a processor or other hardware to perform the specific operation when instructions for performing the specific operation, which are stored in a storage circuit (e.g., a memory) of the electronic device 150 or the wireless power transmitter 100 are executed. The wireless power transmitter 100 may detect the electronic device 150 according to various schemes. For example, the wireless power transmitter 100 may determine the electronic device 150 according to vision recognition or radar recognition. For example, the wireless power transmitter 100 may detect the electronic device 150 according to a scheme defined in a standard of the resonance scheme or a standard of the induction scheme. In the case of complying with the WCP standard (or a Qi standard), the wireless power transmitter 100 may transmit a ping signal, and when a response thereto is received according to in-band communication, the wireless power transmitter 100 may determine that the electronic device 150 is detected. The wireless power transmitter 100 may perform modulation of on/off keying with respect to current or voltage applied to a coil and may perform a response. In the case of complying with the A4WP standard (or an AFA standard), the wireless power transmitter 100 may apply a beacon for detection of the electronic device 150 to the coil (or the resonance circuit). Here, the beacon may include, for example, at least one of a short beacon for detection of a load change by an object disposed in a charging area or a long beacon used to transmit a predetermined signal (e.g., an advertisement signal in a BLE communication scheme) by a communication circuit of the electronic device, which are defined in the AFA standard. The wireless power transmitter 100 may detect the electronic device 150 on the basis of various conditions that a load change is detected during a beacon applying period, an advertisement signal defined by the BLE standard is received, an reception intensity (e.g., received signal strength indication (RSSI)) of an advertisement signal is equal to or greater than a threshold value, or the like, or a combination of the various conditions. In the case of complying with the electromagnetic wave scheme, a communication signal (e.g., an advertisement signal) may be received, or the electronic device 150 may be detected on the basis of analysis of reflection waves of pilot RF waves. The wireless power transmitter 100 according to various embodiments of the disclosure may detect the electronic device 150 by using a combination of the described various methods of detecting the electronic device 150. For example, the wireless power transmitter 100 may detect, by vision recognition or radar recognition, that the electronic device 150 is located in a chargeable area, and then may determine a more accurate location by a scheme of forming an electromagnetic wave and using a reflection wave thereof. Alternatively, the wireless power transmitter 100 may detect, in response to a ping signal, that the electronic device 150 is located in a chargeable area and then may determine a more accurate location by a scheme of forming an electromagnetic wave and using a reflection wave thereof. The method of detecting the electronic device 150 is not limited.

In operation 303, the wireless power transmitter 100 may select whether to charge the electronic device 150 by using multiple patch antennas or to charge the electronic device 150 by using a coil for short distance charging. The wireless power transmitter 100 according to various embodiments of the disclosure may include multiple patch antennas capable of transmitting power according to the electromagnetic wave scheme and at least one coil capable of transmitting power according to the induction scheme or the resonance scheme. That is, the wireless power transmitter 100 may select a charging scheme and may determine at least one of the multiple patch antennas or the coil as a power transmission circuit corresponding to the selected charging scheme. For example, the wireless power transmitter 100 may acquire a distance to the electronic device 150 and may determine a charging scheme according to the distance. In another example, the wireless power transmitter 100 may select a charging scheme on the basis of various information, such as a charging scheme compatible with the electronic device, information relating to power received by the electronic device, information relating to charging the electronic device, a wireless power transmission efficiency, a wireless power transmission-related protocol, the presence or absence of an obstacle, and the like. Embodiments of selecting, on the basis of various information, a charging scheme by the wireless power transmitter 100 will be disclosed in more detail below.

In operation 305, the wireless power transmitter 100 may transmit energy by using a selected power transmission circuit. In operation 307, the electronic device 150 may perform charging using energy from the wireless power transmitter 100. For example, the electronic device 150 may receive information of the selected charging scheme from the wireless power transmitter 100 and may select a power reception circuit according to the received information. Alternatively, the electronic device 150 may receive power by using multiple power transmission circuits, and, as a reception result, the electronic device 150 may select a power reception circuit, through which a large power is received, and may perform charging. In various embodiments of the disclosure, the wireless power transmitter 100 may transmit information of the selected charging scheme to the electronic device 150, before or after energy is transmitted in operation 305. Before or after energy is transmitted in operation 305, the wireless power transmitter 100 may exchange, with the electronic device 150, information (e.g., information that is defined in the standard and required to be exchanged) required to perform the selected charging scheme. The wireless power transmitter 100 and the electronic device 150 may perform operations (e.g., a preparation operation for charging, defined in the standard) required in the selected charging scheme.

As described above, the wireless power transmitter 100 may select a charging scheme or a power transmission circuit to transmit energy.

Figure 3B:
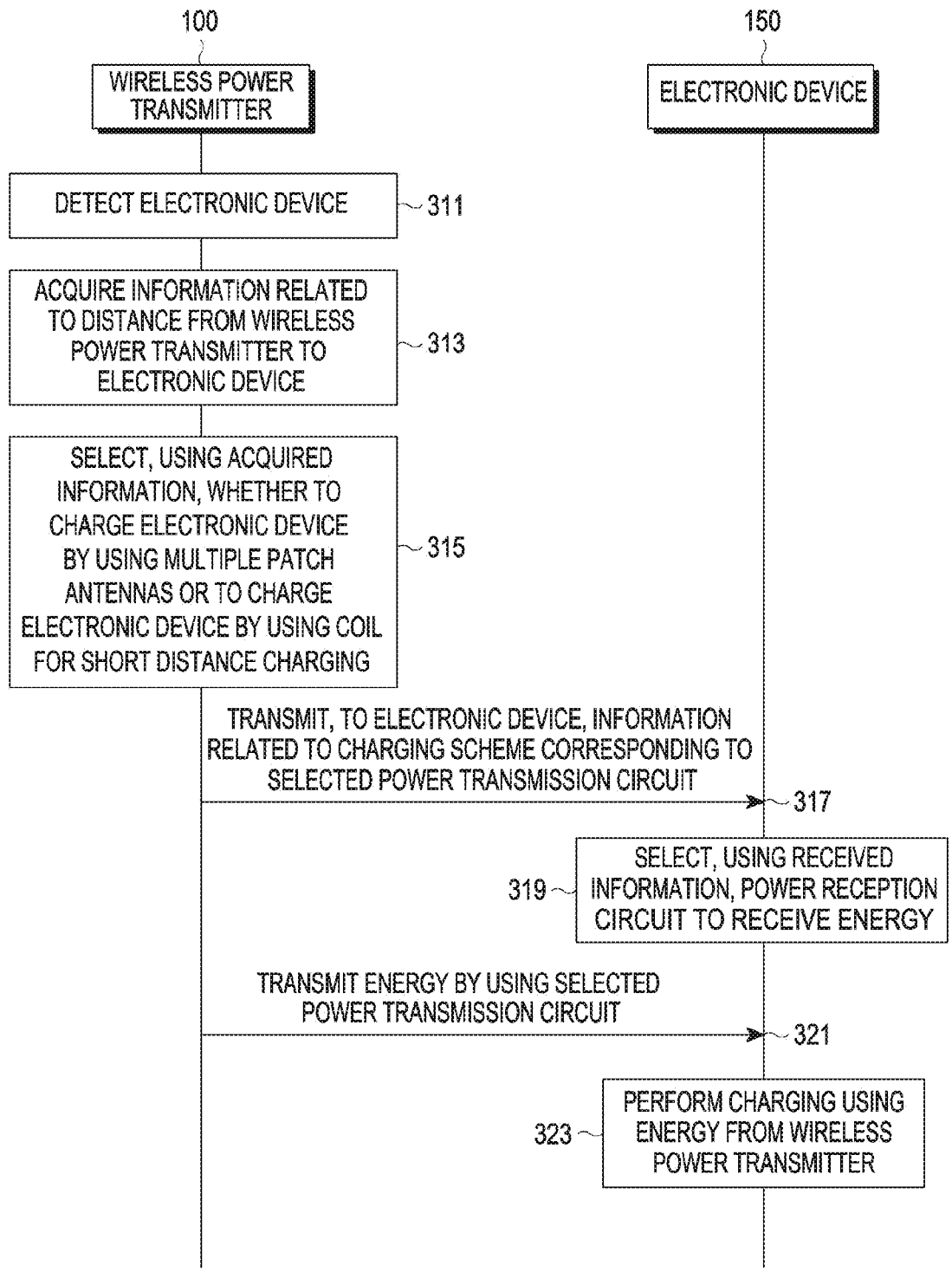
FIG. 3B illustrates a flowchart for explaining operation methods of the wireless power transmitter and the electronic device according to various embodiments of the disclosure.

FIG. 3B illustrates a flowchart for explaining operation methods of the wireless power transmitter and the electronic device according to various embodiments of the disclosure.

In operation 311, the wireless power transmitter 100 may detect the electronic device 150. In operation 313, the wireless power transmitter 100 may acquire information related to a distance from the wireless power transmitter 100 to the electronic device 150. For example, the wireless power transmitter 100 may determine a distance to the electronic device 150 according to vision recognition or radar recognition. For example, the wireless power transmitter 100 may receive a communication signal from the electronic device 150 and may compare an intensity of the received communication signal with a transmission intensity included in the communication signal so as to determine the distance to the electronic device 150. For example, the wireless power transmitter 100 may receive information of the location of the electronic device 150 from the electronic device 150 or another electronic device and may determine the distance from the wireless power transmitter 100 to the electronic device 150 on the basis of the information of the location of the electronic device 150. For example, an indoor positioning device, etc. may measure indoor coordinates of the electronic device 150 and may transmit location information thereof to the wireless power transmitter 100. The indoor positioning device may be an electronic device specialized for vision recognition or a radar scheme, and may measure information on the location of the electronic device 150 more accurately. The wireless power transmitter 100 may directly receive information on the location from the electronic device 150. The electronic device 150 may determine a current location according to various schemes, such as a Wi-Fi signal-based indoor positioning technique, an indoor positioning technique using a geomagnetism map, and an NFC tag-based indoor positioning technique and may transmit the determined current location to the wireless power transmitter 100. The wireless power transmitter 100 may determine the distance to the electronic device 150 by comparing indoor coordinates thereof with received indoor coordinates of the electronic device 150. As described above, the wireless power transmitter 100 may determine the distance to the electronic device 150 according to various schemes, and there is no limitation on a method of determining a distance.

Distance-related information in various embodiments of the disclosure may include information that is dependent on a distance between the wireless power transmitter 100 and the electronic device 150. For example, as the electronic device 150 is located further from the wireless power transmitter 100, the amount of power or energy that the electronic device 150 receives wirelessly from the wireless power transmitter 100 may be decreased. Therefore, information of the magnitude of power received by the electronic device 150 may also be information related to a distance, and may be referred to as received power-related information. The received power-related information is information related to power received by the electronic device from the wireless power transmitter, and may be, for example, the magnitude of voltage, current, or power in a specific point (e.g., an output terminal of a rectifier or an input terminal of the rectifier) of the electronic device 150. For example, the electronic device 150 may transmit information of voltage at an output terminal of a rectifier to the wireless power transmitter 100, and the wireless power transmitter 100 may select a charging scheme according to the received voltage in the output terminal of the rectifier. Meanwhile, those skilled in the art will easily understand that there is no limit on a specific point for measuring the magnitude of voltage, current, and power.

In operation 315, the wireless power transmitter 100 may select, using acquired information, whether to charge the electronic device by using multiple patch antennas or to charge the electronic device by using a coil for short distance charging. That is, the wireless power transmitter 100 may select, using acquired information, whether to charge the electronic device 150 by the electromagnetic wave scheme, or to charge the wireless power transmitter 100 by the resonance scheme or the induction scheme. For example, if it is determined that the distance from the wireless power transmitter 100 to the electronic device 150 exceeds a threshold value, the wireless power transmitter 100 may select to charge the electronic device 150 by the electromagnetic wave scheme, that is, to charge the electronic device 150 by using multiple patch antennas. For example, if it is determined that the distance from the wireless power transmitter 100 to the electronic device 150 has a value equal to or smaller than a threshold value, the wireless power transmitter 100 may select to charge the electronic device 150 by the induction scheme or the resonance scheme, that is, to charge the electronic device 150 by using the coil provided for short distance charging.

In operation 317, the wireless power transmitter 100 may transmit, to the electronic device, information related to a charging scheme corresponding to the selected power transmission circuit. In operation 319, the electronic device 150 may select a power reception circuit to receive energy, by using received information. In operation 321, the wireless power transmitter 100 may transmit energy by using the selected power transmission circuit. In operation 323, the electronic device 150 may perform charging using energy from the wireless power transmitter 100. The electronic device 150 may convert energy into current, voltage, or power via the selected power reception circuit.

As described above, the wireless power transmitter 100 may select a charging scheme by using information related to the distance to the electronic device 150. In another embodiment, the electronic device 150 may determine the distance between the wireless power transmitter 100 and the electronic device 150, and the electronic device 150 may select a charging scheme, and may provide a notification of the selected charging scheme to the wireless power transmitter 100. The wireless power transmitter 100 may select a power transmission circuit according to the notified charging scheme.

Figure 3C:
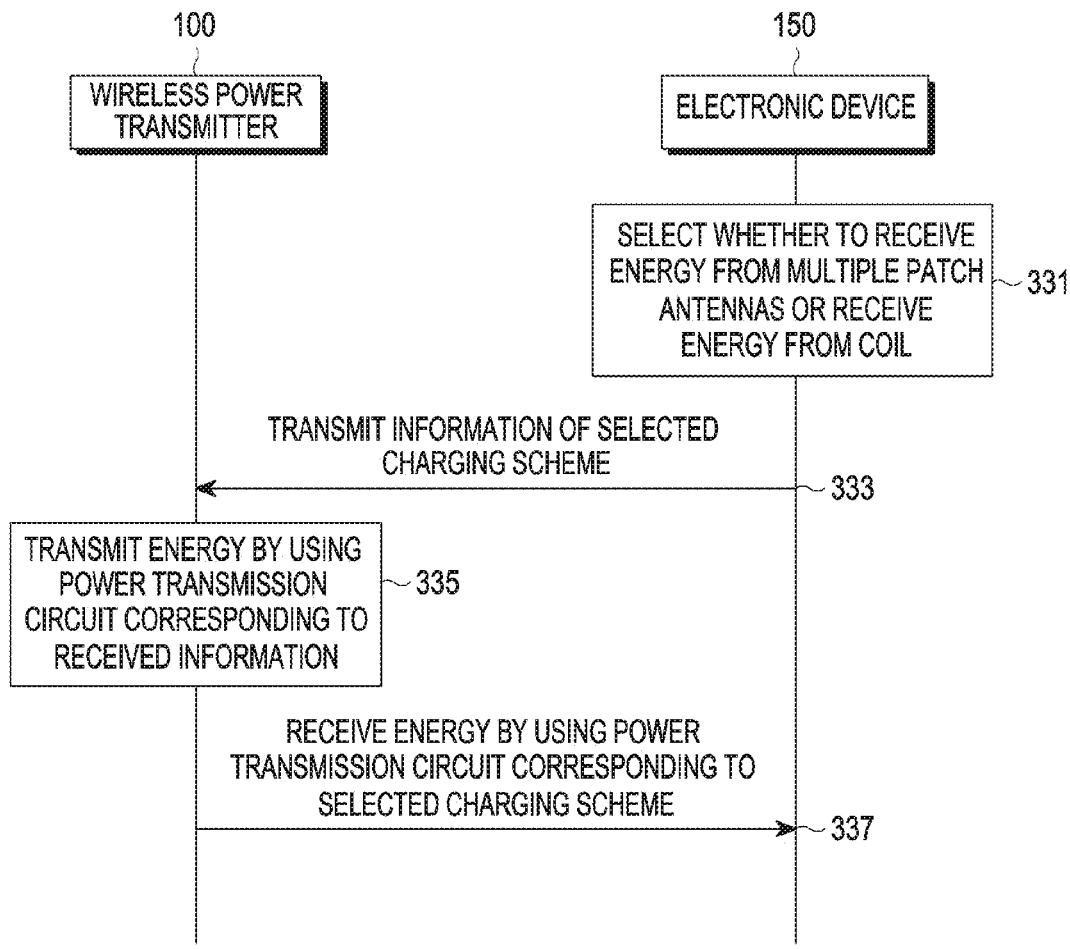
FIG. 3C illustrates a flowchart for explaining operation methods of the wireless power transmitter and the electronic device according to various embodiments of the disclosure.

FIG. 3C illustrates a flowchart for explaining operation methods of the wireless power transmitter and the electronic device according to various embodiments of the disclosure.

In operation 331, the electronic device 150 may select whether to receive energy from multiple patch antennas or to receive energy from a coil. The electronic device 150 according to various embodiments of the disclosure may include multiple patch antennas capable of receiving power according to the electromagnetic wave scheme, and at least one coil capable of receiving power according to the induction scheme or the resonance scheme. That is, the electronic device 150 may select a charging scheme, and may determine at least one of the multiple patch antennas or the coil as a power reception circuit corresponding to the selected charging scheme. For example, the wireless power transmitter 100 may transmit a testing power according to multiple charging schemes. The wireless power transmitter 100 may transmit a first testing power according to the resonance scheme and may transmit a second testing power sequentially or concurrently according to the electromagnetic wave scheme. In various embodiments of the disclosure, the wireless power transmitter 100 may previously determine a location of the electronic device 150 and may perform control according thereto so that an RF wave is beamformed at the location of the electronic device 150. The electronic device 150 may sequentially or concurrently receive the first testing power and the second testing power. The electronic device 150 may perform comparison with the magnitude (e.g., the magnitude of current, the magnitude of voltage, or the magnitude of power) of the received power so as to select a charging scheme of transmitting a larger power.

In operation 333, the electronic device 150 may transmit information of the selected charging scheme to the wireless power transmitter 100. When the testing power is provided, even in the case where a battery of the electronic device 150 is fully discharged, the electronic device 150 may be operated to transmit information. In operation 335, the wireless power transmitter 100 may transmit energy by using a selected power transmission circuit corresponding to the received information. In operation 337, the electronic device 150 may receive energy by using a power reception circuit corresponding to the selected charging scheme. As described above, the subject of selecting a charging scheme may be the electronic device 150.

Figure 4A:
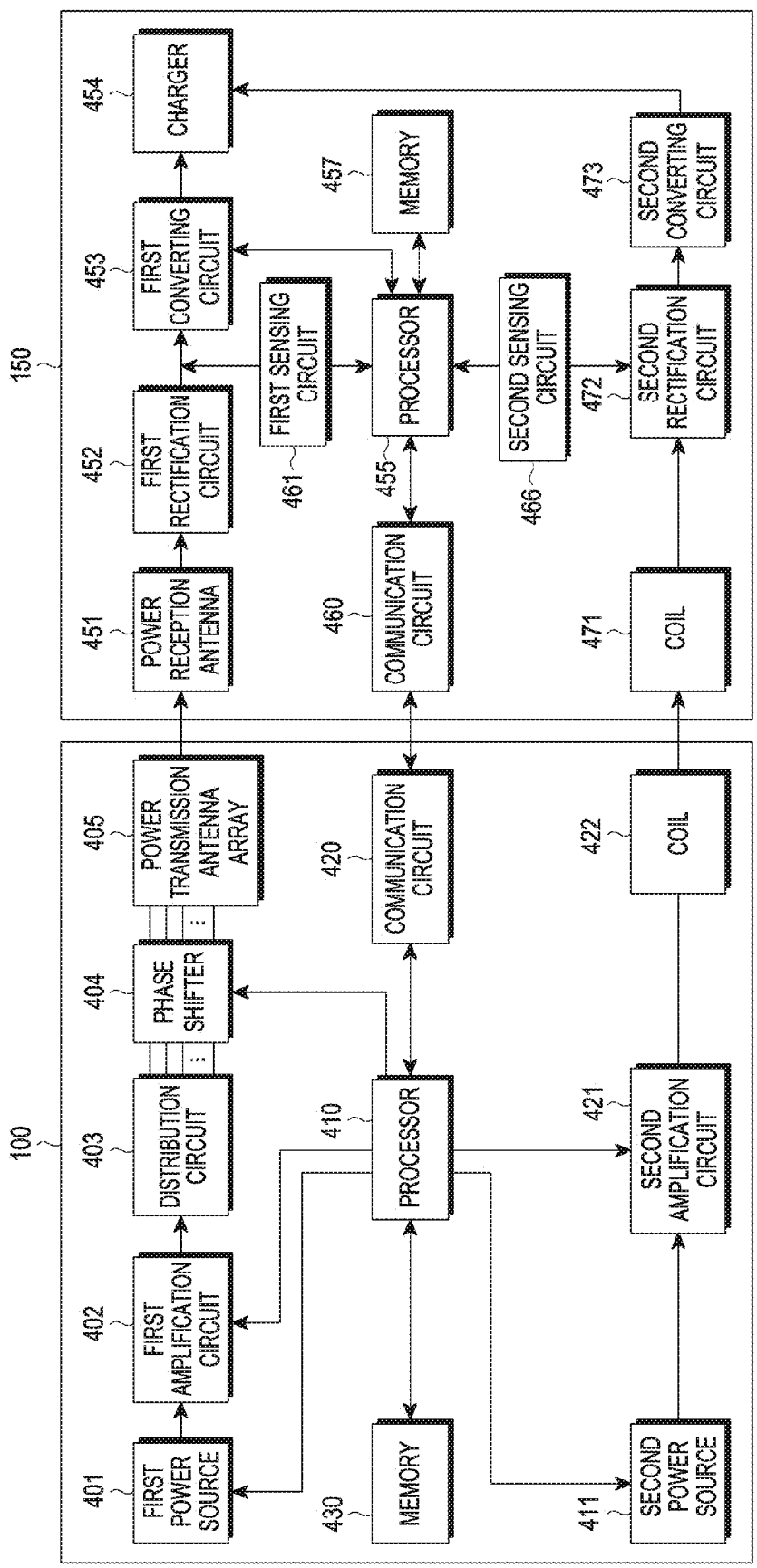
FIG. 4A illustrates a block diagram of the wireless power transmitter and the electronic device according to various embodiments of the disclosure.

FIG. 4A illustrates a block diagram of the wireless power transmitter and the electronic device according to various embodiments of the disclosure.

The wireless power transmitter 100 according to various embodiments of the disclosure may include a first power source 401, a first amplification circuit 402, a distribution circuit 403, a phase shifter 404, a power transmission antenna array 405, a processor 410, a communication circuit 420, a memory 430, a second power source 411, a second amplification circuit 421, and a coil 422. The electronic device 150 may include a power reception antenna 451, a first rectification circuit 452, a first converting circuit 453, a charger 454, a processor 455, a memory 457, a communication circuit 460, a first sensing circuit 461, a second sensing circuit 466, a coil 471, a second rectification circuit 472, and a second converting circuit 473.

The first power source 401 may provide an AC power having a frequency (e.g., 5.8 GHz) corresponding to the electromagnetic wave scheme. The first power source 402 may include, for example, a device that provides a DC power, and an inverter (not illustrated) that converts DC power to AC power. The processor 410 may control, for example, an output of the first power source 401. The first amplification circuit 401 may amplify received power and provide the amplified power to the distribution circuit 403. The processor 410 may control an amplification gain of received power. The first amplification circuit 402 may include at least one amplifier. The first amplification circuit 402 and the second amplification circuit 421 may be implemented as various amplifiers, such as a Drive Amplifier (DA), a High Power Amplifier (HPA), a Gain Block Amplifier (GBA), etc., or a combination thereof, and there is no limitation on examples of implementation. The distribution circuit 403 may distribute, to multiple paths, power output from the first amplification circuit 402. There is no limit as long as a circuit is capable of distribute an input power or signal to multiple paths. For example, the distribution circuit 403 may distribute power to as many paths as the number of patch antennas included in the power transmission antenna array 405.

The phase shifter 404 may shift phases (or delays) of multiple respective AC powers provided by the distribution circuit 403. There may be multiple phase shifters 404, and there may be, for example, as many phase shifters 404 as the number of patch antennas included in the power transmission antenna array 405. A hardware device such as HMC642, HMC1113, or the like may be used as the phase shifter 404. A shift degree of each phase shifter 404 may be controlled by the processor 410. The processor 410 may determine a location of the electronic device 150, and may shift phases of the multiple respective AC powers, so that sub-RF waves are constructively interfered at the location (or a location of the power reception antenna 451 of the electronic device 150) of the electronic device 150. Each of the multiple patch antennas included in the power transmission antenna array 405 may generate sub-RF waves on the basis of received power. An RF wave, in which sub-RF waves are interfered, may be converted into current, voltage, or power in the power reception antenna 451, so as to be output.

The power reception antenna 451 may include multiple patch antennas, and current, voltage, or power of an AC waveform may be generated using an RF wave formed in the periphery, that is, an electromagnetic wave, and may be referred to as received power. The first rectification circuit 452 may rectify received power into a DC waveform. The first converting circuit 453 may increase or decrease voltage of power in a DC waveform by a preset value and output the same. The charger 454 may adjust the magnitude of a converted voltage or current of power, so as to charge a battery. According to implementation, the electronic device 150 may not include the charger 454. In this case, the first converting circuit 453 may adjust the magnitude of voltage or current of power to be appropriate for charging a battery so as to directly charge the battery.

The first sensing circuit 461 may sense the magnitude of voltage, current, or power at an output terminal of the first rectification circuit 452. For example, the first sensing circuit 461 may include various types of voltmeters, such as an electro dynamic instrument voltmeter, an electrostatic voltmeter, and a digital voltmeter, various types of ammeters, such as a DC ammeter, an AC ammeter, and a digital ammeter, or an analog to digital converter (ADC). The processor 455 may identify the magnitude of current, voltage, or power, which is sensed by the first sensing circuit 461. The processor 455 may provide, as first received power-related information, the sensed magnitude of current, voltage, or power to the communication circuit 460. The communication circuit 460 may transmit a communication signal including the first received power-related information to the communication circuit 420 of the wireless power transmitter 100. The processor 455 or the processor 410 may be implemented with various circuits capable of performing operations, such as a general-purpose processor like a CPU, a minicomputer, a microprocessor, a Micro Controlling Unit (MCU), and a Field Programmable Gate Array (FPGA), and a processor type is not limited.

The processor 410 may determine the magnitude of power received by the electronic device 150, the power being transmitted through the power transmission antenna array 405, on the basis of the first received power-related information included in the communication signal received by the communication circuit 420.

The second power source 411 may provide an AC power having a frequency (e.g., 6.78 MHz) corresponding to the resonance scheme or an AC power having a frequency (e.g., 100 to 205 kHz) corresponding to the induction scheme. The second power source 411 may include, for example, a device that provides a DC power and an inverter (not illustrated) that converts a DC power to an AC power. The processor 410 may control, for example, an output of the second power source 411. The second amplification circuit 421 may amplify received power and provide the amplified power to the coil 422. The processor 410 may control an amplification gain of received power. The second amplification circuit 421 may include at least one amplifier. The coil 422 may generate a magnetic field by using the received power. For example, when an AC current flows through the coil 422, an induced magnetic field, the magnitude of which changes over time, may be generated according thereto. Although not illustrated, at least one capacitor may be connected to the coil 422, and the coil 422 and the capacitor may constitute the resonance circuit. The resonance circuit may have a resonance frequency corresponding to a frequency of the resonance scheme or induction scheme. The second power source 411 may be designed to be merged with the first power source 401.

An induced electromotive force may be generated within the coil 471 of the electronic device 150 on the basis of the magnetic field, the magnitude of which changes over time at which the magnetic field is generated in the vicinity, and the induced electromotive force may be referred to as received power. The AC power output from the coil 471 may be rectified by the second rectification circuit 472. The second converting circuit 473 may adjust the magnitude of voltage or current of the rectified power, and may be output to the charger 454. Although not illustrated, for example, the electronic device 150 may further include a combiner that combines power from the first converting circuit 453 and power from the second converting circuit 473. In this case, a DC power obtained by combination by the combiner may be provided to the charger 454. According to implementation, when the electronic device 150 does not include the charger 454, the second converting circuit 473 may adjust the magnitude of current or voltage to be appropriate for charging a battery so as to directly charge the battery. The second sensing circuit 466 may sense the magnitude of current, voltage, or power at an output terminal of the second rectification circuit 472. The processor 455 may identify the magnitude of current, voltage, or power, which is sensed by the second sensing circuit 466. The processor 455 may provide, as second received power-related information, the sensed magnitude of current, voltage, or power to the communication circuit 460. The communication circuit 460 may transmit a communication signal including the second received power-related information to the communication circuit 420 of the wireless power transmitter 100. The communication circuit 460 may include the first received power-related information and the second received power-related information in a single communication signal so as to transmit the same, or may include the first received power-related information and the second received power-related information in different respective communication signals so as to transmit the same. The processor 410 may determine the magnitude of power received by the electronic device 150, the power being transmitted through the coil 422, on the basis of the second received power-related information included in the communication signal received by the communication circuit 420.

The processor 410 according to various embodiments of the disclosure may compare the magnitude of power received by the electronic device 150, the power being transmitted through the power transmission antenna array 405, with the magnitude of power received by the electronic device 150, the power being transmitted through the coil 422. The processor 410 may select to perform charging using a power transmission circuit corresponding to a larger magnitude. That is, the processor 410 may select a charging scheme and may transmit information of the selected charging scheme to the electronic device 150 through the communication circuit 420. The processor 455 may select, as a power reception circuit to receive power, one among the power reception antenna 451 and the coil 471 on the basis of the information received through the communication circuit 460.

The processor 455 according to various embodiments of the disclosure may compare the first received power-related information with the second received power-related information so as to directly select a charging scheme. The processor 455 may provide information of the selected charging scheme to the communication circuit 460, and the communication circuit 460 may transmit a communication signal including the information of the selected charging scheme to the communication circuit 420. The processor 410 may select, as a power transmission circuit to transmit power, one among the power transmission antenna array 405 and the coil 422 by using the information of the received charging scheme.

The memory 430 or the memory 457 may store instructions causing the processor 410 or the processor 455 to perform the described operations. The memory 430 may be implemented in various forms, such as a Read Only Memory (ROM), a Random Access Memory (RAM), or a flash memory, and there is no limitation on the implementation forms. The wireless power transmitter 100 as shown in FIG. 4A may be referred to as a passive wireless power transmitter.

The processor 410 or the processor 455 according to various embodiments of the disclosure may select a charging scheme according to various information, such as a distance between the wireless power transmitter 100 and the electronic device 150, a charging scheme compatible with the electronic device 150, charging-related information of the electronic device 150, a wireless power transmission efficiency, a wireless power transmission-related protocol, and the presence or absence of an obstacle.

Figure 4B:
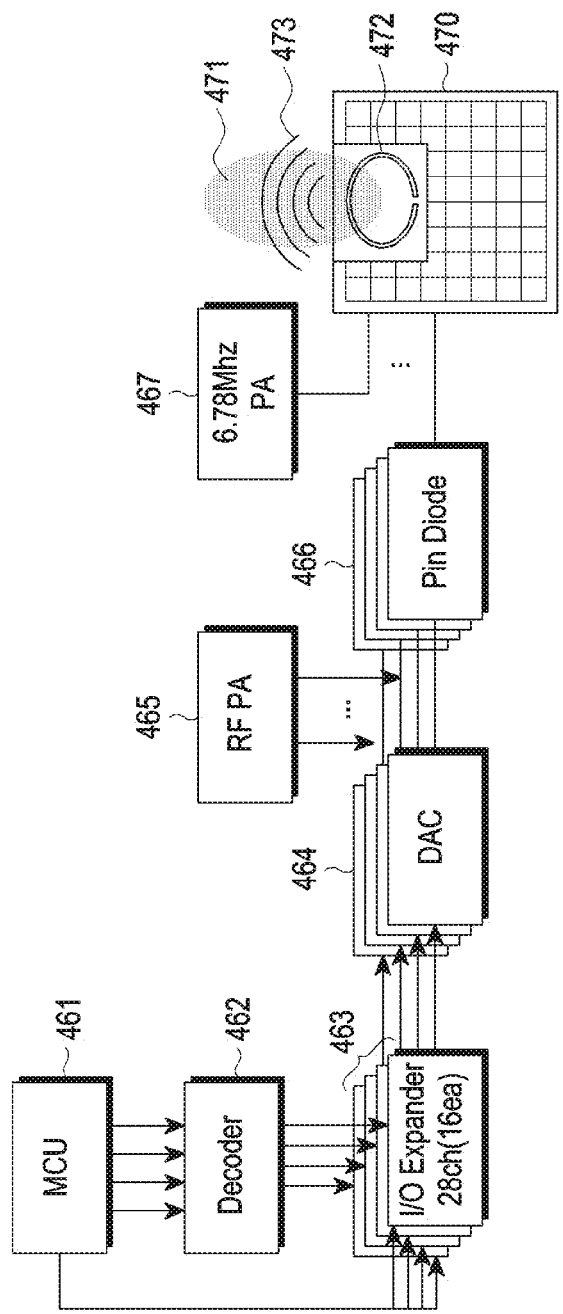
FIG. 4B illustrates a block diagram of the wireless power transmitter and the electronic device according to various embodiments of the disclosure.

FIG. 4B illustrates a block diagram of the wireless power transmitter and the electronic device according to various embodiments of the disclosure.

Referring to FIG. 4B, the wireless power transmitter may include an MCU 461, a decoder 462, an I/O expander 463, a digital-to-analog converter (DAC) 464, an RF amplifier (power amplifier (PA) 465, a phase shifter 466, a 6.78 MHz amplifier 467, a power transmission antenna array 470 including multiple patch antennas, and a coil 472.

The MCU 461 may be, for example, a type of the processor 410 in FIG. 4A, and may output information relating to an address of the I/O expander 463 to the decoder 462. For example, the MCU 461 may output address-related information via a General-Purpose Input/Output (GPIO). The decoder 462 may decode received address-related information, and may control the I/O expander 463 specific to each address by using the address-related information that is a decoding result. The MCU 461 may output phase adjustment information to the I/O expander 463. For example, the MCU 461 may transmit phase adjustment information via a serial peripheral interface (SPI). The I/O expander 463 may digitalize received phase adjustment information and output the same to the DAC 464. The I/O expander 463 may output phase adjustment information in the digital form to the DAC 464 through multiple output channels, the number of which is larger than the number of input channels. For example, when the number of channels between the I/O expander 463 and the decoder 464 is 16, the number of channels of the I/O expander 463 and DAC 464 may be 64. The number of patch antennas included in the power transmission antenna array 470, the DAC 464, and the phase shifter 466 may be, for example, 64. For example, the I/O expander 463 may output phase adjustment information in the digital form to the DAC 464 via the GPIO. The DAC 464 may convert the received phase adjustment information in the digital form into an analog form and output the phase adjustment information in the analog form to the phase shifter 466. The phase shifter 466 may be, for example, a pin-diode-based phase shifter. The phase shifter 466 may receive AC power according to the electromagnetic wave scheme, for example, AC power of 5.8 GHz from the RF PA 465 through multiple channels. The phase shifter 466 may adjust phases of multiple respective powers received through the multiple channels, by using the received phase adjustment information. The phase shifter 466 may output the phase-adjusted powers to the multiple respective patch antennas of the power transmission antenna array 470. The multiple patch antennas may receive the respective phase-adjusted powers to form sub-RF waves, and the RF wave 471 may be formed by beamforming or interference of the sub-RF waves. As described above, a scheme of phase-shifting power from the RF PA 465 and transmitting the same to patch antennas may be referred to as a passive scheme. The 6.78 MHz amplifier 467 may provide the coil 472 with an AC power of 6.78 MHz according to the resonance scheme (e.g., the AFA scheme), and may generate a magnetic field 473 by using the same.

Figure 4C:
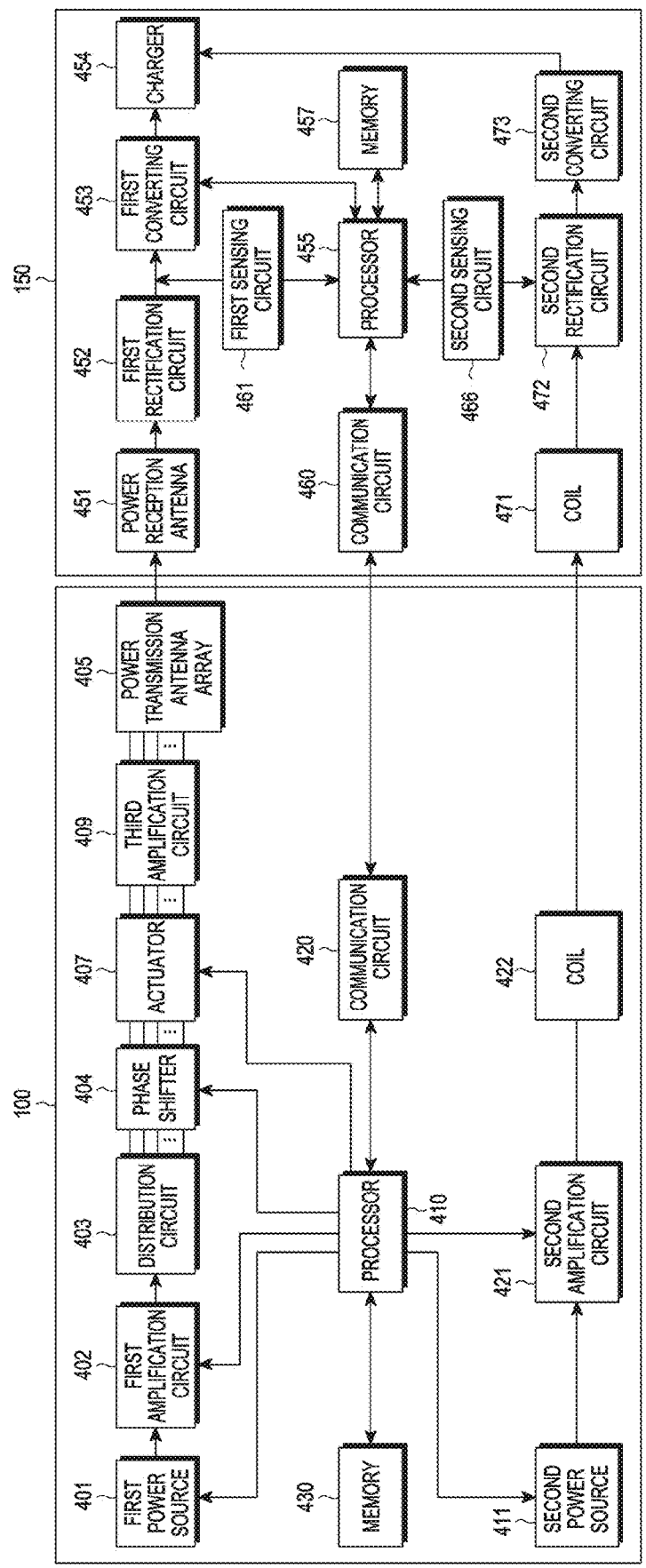
FIG. 4C illustrates a block diagram of the wireless power transmitter and the electronic device according to various embodiments of the disclosure.

FIG. 4C illustrates a block diagram of the wireless power transmitter and the electronic device according to various embodiments of the disclosure. In contrast to the wireless power transmitter in FIG. 4A, the wireless power transmitter in FIG. 4C may include an attenuator 407 and a third amplification circuit 409. AC power amplified by the first amplification circuit 402 may be provided to multiple phase shifters 404 through the distribution circuit 403. In addition, the multiple attenuators 407 may be connected to the multiple phase shifters 404, respectively. As described above, the processor 410 may adjust at least one of phases or amplitudes of AC power input to the multiple respective patch antennas of the power transmission antenna array 405, so as to allow beamforming at a specific point. The processor 410 may adjust at least one of phases or amplitudes of AC powers input to the multiple respective patch antennas, by adjusting at least one of shifting degrees of the respective multiple phase shifters 404 or attenuation degrees of the multiple respective attenuators 407. The attenuator 407 may operate in a digital manner. The processor 410 may be connected to the I/O expander (not illustrated), and the I/O expander (not illustrated) may be connected to the phase shifter 404 and the attenuator 407. Therefore, a signal from the processor 410 may be expanded to multiple signals, and the expanded multiple signals may be transferred to the multiple phase shifters 404 or the multiple attenuators 407, respectively. Multiple AC powers, at least one of the amplitudes or phases of which has been adjusted, may be input to the third amplification circuit 409, and the third amplification circuit 409 may amplify the received multiple AC powers and may transfer the amplified AC powers to the multiple respective patch antennas included in the power transmission antenna array 405. The wireless power transmitter 100 as shown in FIG. 4C may be referred to as an active wireless power transmitter.

Figure 4D:
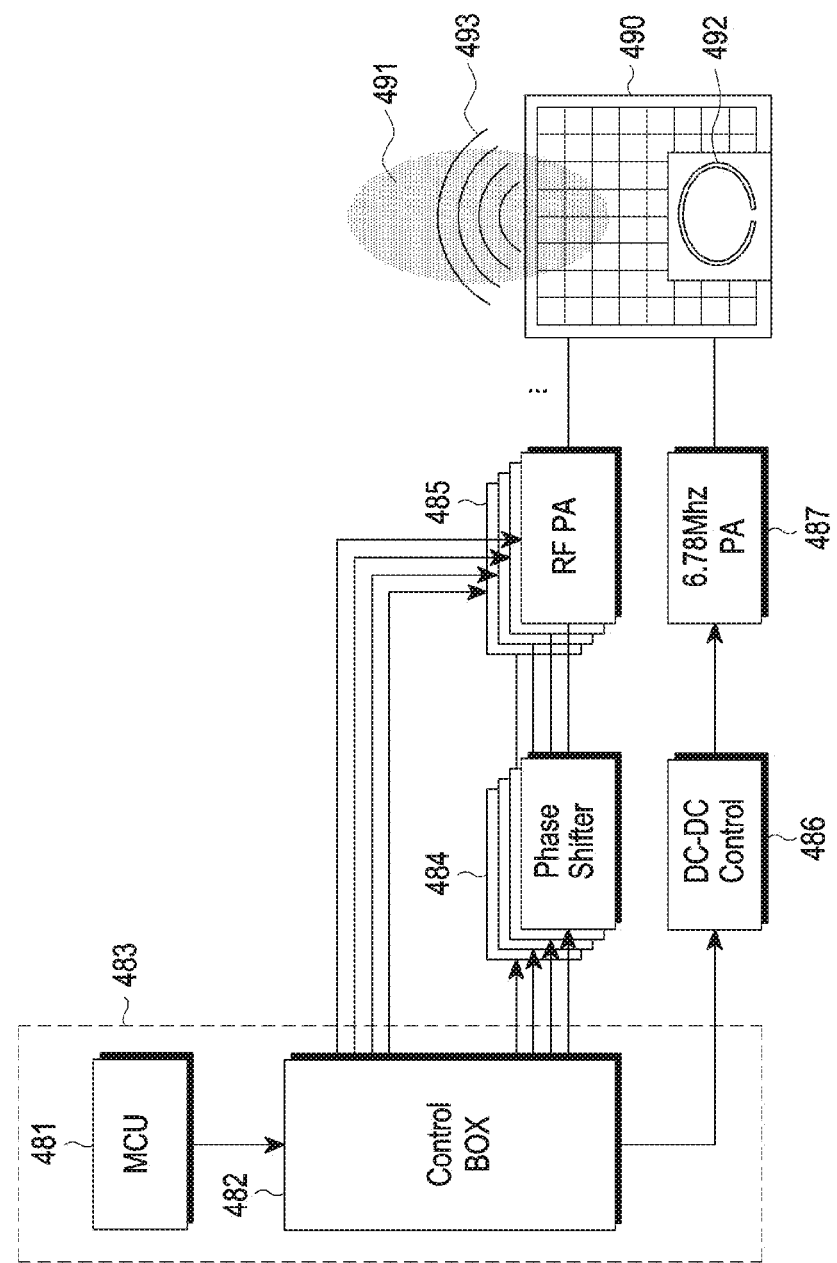
FIG. 4D illustrates a block diagram of the wireless power transmitter according to various embodiments of the disclosure.

FIG. 4D illustrates a block diagram of the wireless power transmitter according to various embodiments of the disclosure.

Referring to FIG. 4D, the wireless power transmitter may include a control circuit 483, a phase shifter 484, an RF PA 485, a DC-DC controller 486, a 6.78 MHz PA 487, a power transmission antenna array 490, and a coil 492. The control circuit 483 may include an MCU 481 and a control box 482. The MCU 481 may determine at least one of phase adjustment information or amplitude adjustment information of an electrical signal input to each of multiple patch antennas included in the power transmission antenna array 490, and may output the determined information to the control box 482. The control box 482 may output a control signal for phase adjustment to the phase shifter 484 and may output a control signal for amplitude adjustment to the RF PA 485. Therefore, at least one of the phase or amplitude of the electrical signal input to each of the multiple patch antennas included in the power transmission antenna array 490 may be adjusted so that a beamforming location of the RF wave 491 may be controlled. As described above, a scheme of adjusting at least one of the phase or amplitude of the electrical signal input to the patch antennas may be referred to as an active scheme.

The MCU 481 may determine magnitude information of power applied to the coil in order to adjust a magnitude of a magnetic field 493 according to the resonance scheme and may transfer the determined information to the control box 482. The control box 482 may transfer a coil application power magnitude control signal to the DC-DC controller 486, and the DC-DC controller 486 may control a magnitude of power output from the 6.78 MHz PA 487. Therefore, the magnitude of the magnetic field 493 generated from the coil 492 may be controlled.

Figure 5:
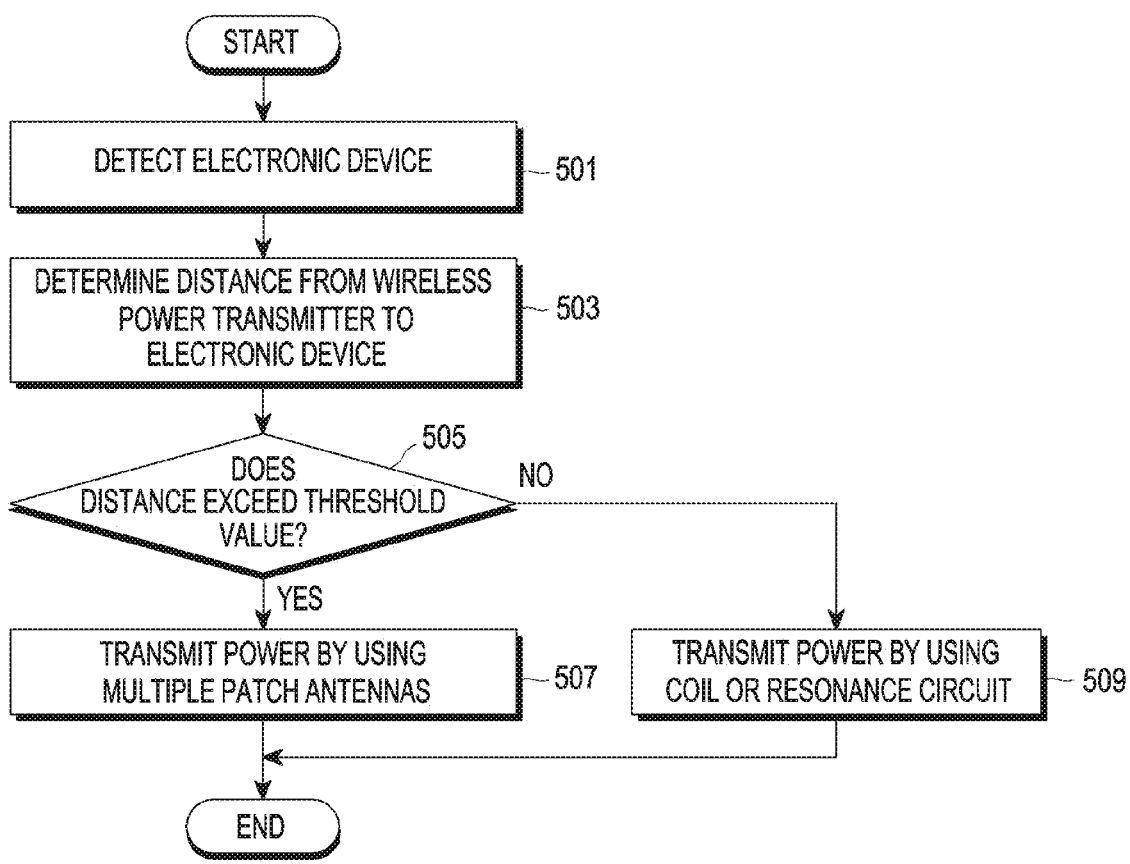
FIG. 5 illustrates a flowchart for explaining an operation method of the wireless power transmitter according to various embodiments of the disclosure.

FIG. 5 illustrates a flowchart for explaining an operation method of the wireless power transmitter according to various embodiments of the disclosure.

In operation 501, the wireless power transmitter 100 may detect the electronic device 150. In operation 503, the wireless power transmitter 100 may determine a distance from the wireless power transmitter 100 to the electronic device 150. In operation 505, the wireless power transmitter 100 may determine whether the distance exceeds a threshold value. The threshold value may be a numerical value determined via experiments or the like, which is advantageous over transmission of power by the electromagnetic wave scheme than by the resonance scheme or the induction scheme. For example, a distance, in which an efficiency of the case where power is transmitted in the electromagnetic wave scheme is equal to an efficiency of the case where power is transmitted by the resonance scheme or the induction scheme, may be configured as the threshold value. Alternatively, a distance, in which a reception magnitude of the case where power is transmitted in the electromagnetic wave scheme is equal to a reception magnitude of the case where power is transmitted by the resonance scheme or the induction scheme, may be configured as the threshold value. The threshold value may be configured by various conditions.

If it is determined that the distance exceeds the threshold value, the wireless power transmitter 100 may transmit, in operation 507, power by means of multiple patch antennas. That is, the wireless power transmitter 100 may select the charging scheme to be the electromagnetic wave scheme. If it is determined that the distance exceeds the threshold value, the wireless power transmitter 100 may transmit, in operation 509, power by means of the coil or the resonance circuit. That is, the wireless power transmitter 100 may select the charging scheme to be the resonance scheme or the induction scheme.

Figure 6A:
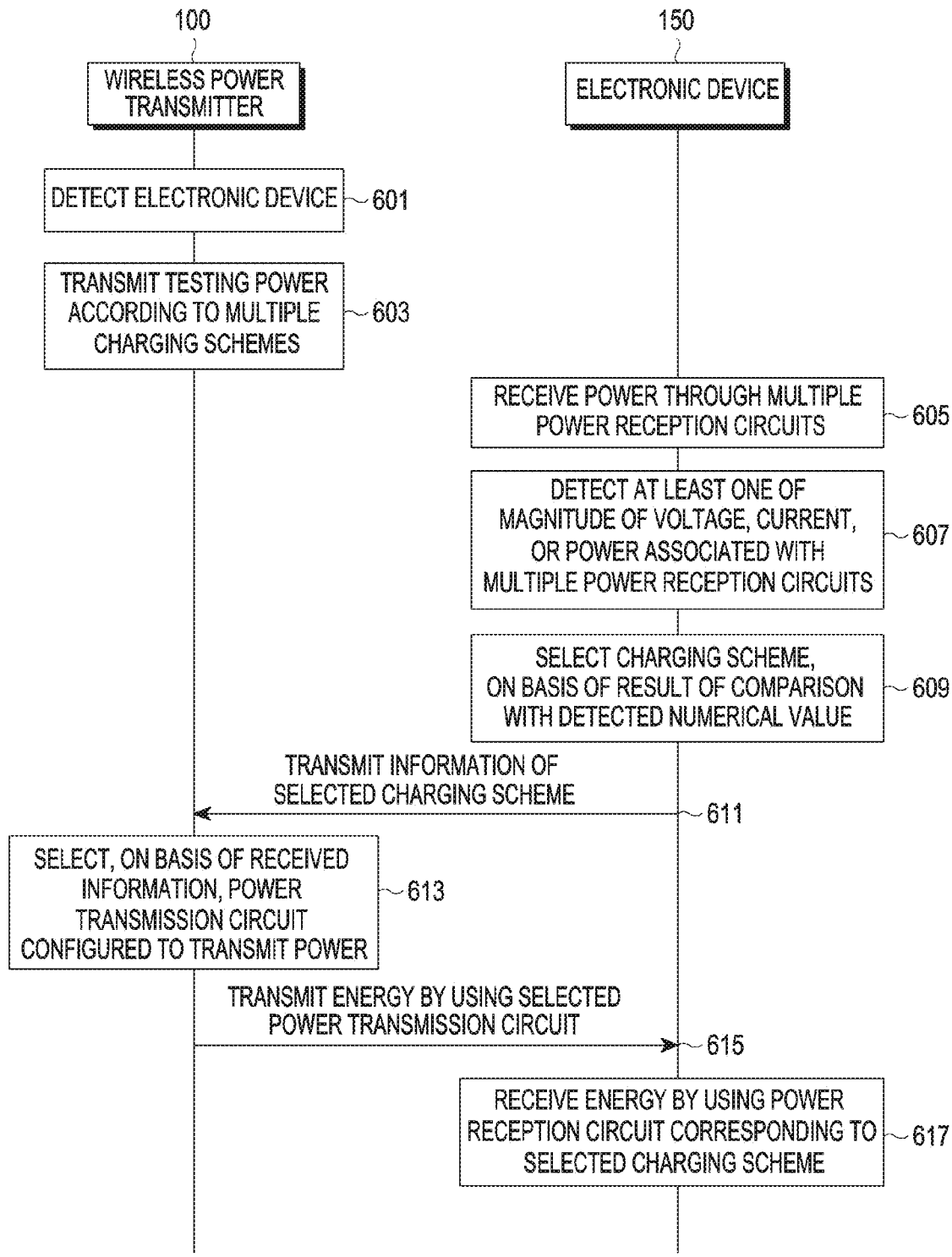
FIG. 6A illustrates a flowchart for explaining operation methods of the wireless power transmitter and the electronic device according to various embodiments of the disclosure.

FIG. 6A illustrates a flowchart for explaining operation methods of the wireless power transmitter and the electronic device according to various embodiments of the disclosure.

In operation 601, the wireless power transmitter 100 may detect the electronic device 150. In operation 603, the wireless power transmitter 100 may transmit a testing power according to multiple charging schemes. For example, the wireless power transmitter 100 may transmit a first testing power through multiple patch antennas according to the electromagnetic wave scheme, and may concurrently or sequentially transmit a second testing power through a coil (or a resonance circuit) according to the resonance scheme.

In operation 605, the electronic device 150 may receive power through multiple power reception circuits. The electronic device 150 may receive the first testing power through the multiple patch antennas and may receive the second testing power through the coil (or the resonance circuit). In operation 607, the electronic device 150 may detect at least one of the magnitude of voltage, current, or power associated with the multiple power reception circuits. As described above, those skilled in the art may easily understand that the electronic device 150 may detect at least one of the magnitude of voltage, current, or power output from the multiple power reception circuits and may detect, for example, at least one of the voltage, current, or power at an input terminal or an output terminal of a rectification circuit connected to each of the multiple power reception circuits, and there is no limitation on a detection point.

In operation 609, the electronic device 150 may select the charging scheme on the basis of a result of comparison with a detected numerical value. For example, if it is determined that a magnitude of voltage at the output terminal of the first rectification circuit (e.g., 452 of FIG. 4A) that rectifies the first testing power is greater than a magnitude of voltage at the output terminal of the second rectification circuit (e.g., 472 of FIG. 4A) that rectifies the second testing power, the electronic device 150 may select, as the charging scheme, the electromagnetic wave scheme corresponding to the first testing power. Alternatively, for example, if it is determined that a magnitude of voltage at the output terminal of the first rectification circuit (e.g., 452 of FIG. 4A) that rectifies the first testing power is smaller than a magnitude of voltage at the output terminal of the second rectification circuit (e.g., 472 of FIG. 4A) that rectifies the second testing power, the electronic device 150 may select, as the charging scheme, the resonance scheme or induction scheme corresponding to the second testing power. A charging scheme in which power is received at the greatest magnitude is selected, which may be selection of the charging scheme with a shortest charging time. That is, the wireless power transmitter 100 or the electronic device 150 may select a charging scheme expected to have a shortest charging time.

In various embodiments of the disclosure, the electronic device 150 may select the charging scheme according to a threshold value comparison scheme. When the magnitude of voltage at the output terminal of the first rectification circuit (e.g., 452 of FIG. 4A) exceeds the threshold value, the electronic device 150 may select the electromagnetic wave scheme as the charging scheme. If it is determined that the magnitude of voltage at the output terminal of the second rectification circuit (e.g., 472 of FIG. 4A) that rectifies the second testing power is greater than the threshold value, the electronic device 150 may select, as the charging scheme, the induction scheme or resonance scheme corresponding to the second testing power. If the magnitude of voltage at the output terminal of the first rectification circuit (e.g., 452 in FIG. 4A) and the magnitude of voltage at the output terminal of the second rectification circuit (e.g., 472 of FIG. 4A) that rectifies the second testing power both exceed the threshold value, the electronic device 150 may select, as the charging scheme, both the electromagnetic wave scheme and the induction scheme and resonance scheme. In various embodiments of the disclosure, a threshold value corresponding to the voltage at the output terminal of the first rectification circuit (e.g., 452 in FIG. 4A) and a threshold value corresponding to the voltage at the output terminal of the second rectification circuit (e.g., 472 of FIG. 4A) may be the same or may be different. For example, a lowest voltage value for using the electromagnetic wave scheme and a lowest voltage value for using the induction scheme or the resonance scheme may be different from each other. In various embodiments of the disclosure, if the magnitude of voltage at the output terminal of the first rectification circuit (e.g., 452 in FIG. 4A) and the magnitude of voltage at the output terminal of the second rectification circuit (e.g., 472 of FIG. 4A) that rectifies the second testing power both have values equal to or greater than the threshold value, the wireless power transmitter 100 may not perform charging or may select a charging scheme having a greater voltage value according to a relative comparison scheme.

In operation 611, the electronic device 150 may transmit information of the selected charging scheme to the wireless power transmitter 100. Networks for transmission information according to the selected charging scheme may be different. For example, in the case of the resonance scheme or the electromagnetic wave scheme, the electronic device 150 may transmit information via hardware for out-band communication, such as a BLE module, and the like. For example, in the case of the induction scheme, the electronic device 150 may transmit information according to turning on/off of a switch which is disposed inside the electronic device 150 in order to perform on/off keying modulation scheme. In operation 613, the wireless power transmitter 100 may select a power transmission circuit to transmit power on the basis of the received information. In operation 615, the wireless power transmitter 100 may transmit energy by using the selected power transmission circuit. In operation 617, the electronic device 150 may receive energy by using a power reception circuit corresponding to the selected charging scheme.

Figure 6B:
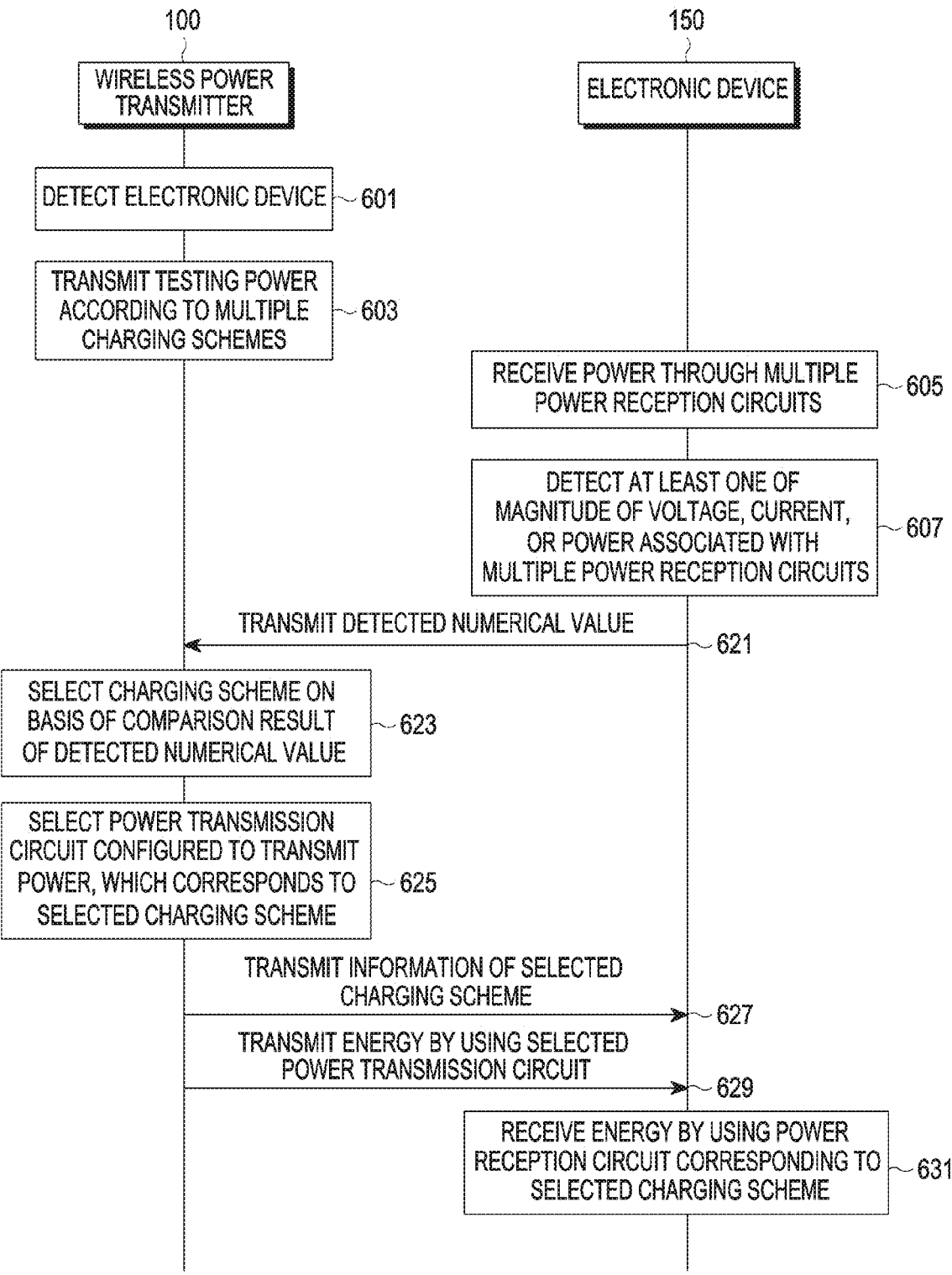
FIG. 6B illustrates a flowchart for explaining operation methods of the wireless power transmitter and the electronic device according to various embodiments of the disclosure.

FIG. 6B illustrates a flowchart for explaining operation methods of the wireless power transmitter and the electronic device according to various embodiments of the disclosure. Because operation 601 to operation 607 have been described in FIG. 6A further description thereof will be omitted.

In operation 621, the electronic device 150 may include a detected numerical value in a communication signal and transmit the same to the wireless power transmitter 100. In operation 623, the wireless power transmitter 100 may select a charging scheme on the basis of a result of comparison with the detected numerical value. As described in FIG. 6A, for example, if it is determined that a magnitude of voltage at the output terminal of a first rectification circuit (e.g., 452 of FIG. 4A) that rectifies a first testing power is greater than a magnitude of voltage at the output terminal of a second rectification circuit (e.g., 472 of FIG. 4A) that rectifies a second testing power, the wireless power transmitter 100 may select, as the charging scheme, the electromagnetic wave scheme corresponding to the first testing power.

In operation 625, the wireless power transmitter 100 may select a power transmission circuit to transmit power, which corresponds to the selected charging scheme. For example, when the electromagnetic wave scheme is selected as the charging scheme, the wireless power transmitter 100 may select multiple patch antennas as the power transmission circuit to transmit power. In operation 627, the wireless power transmitter 100 may transmit information of the selected charging scheme. In operation 629, the wireless power transmitter 100 may transmit energy by using the selected power transmission circuit. In operation 631, the electronic device 150 may receive energy by using a power reception circuit corresponding to the selected charging scheme.

As described in FIG. 6A and FIG. 6B, according to various embodiments, the charging scheme may be selected by the wireless power transmitter 100 or may be selected by the electronic device 150 that receives power.

Figure 7A:
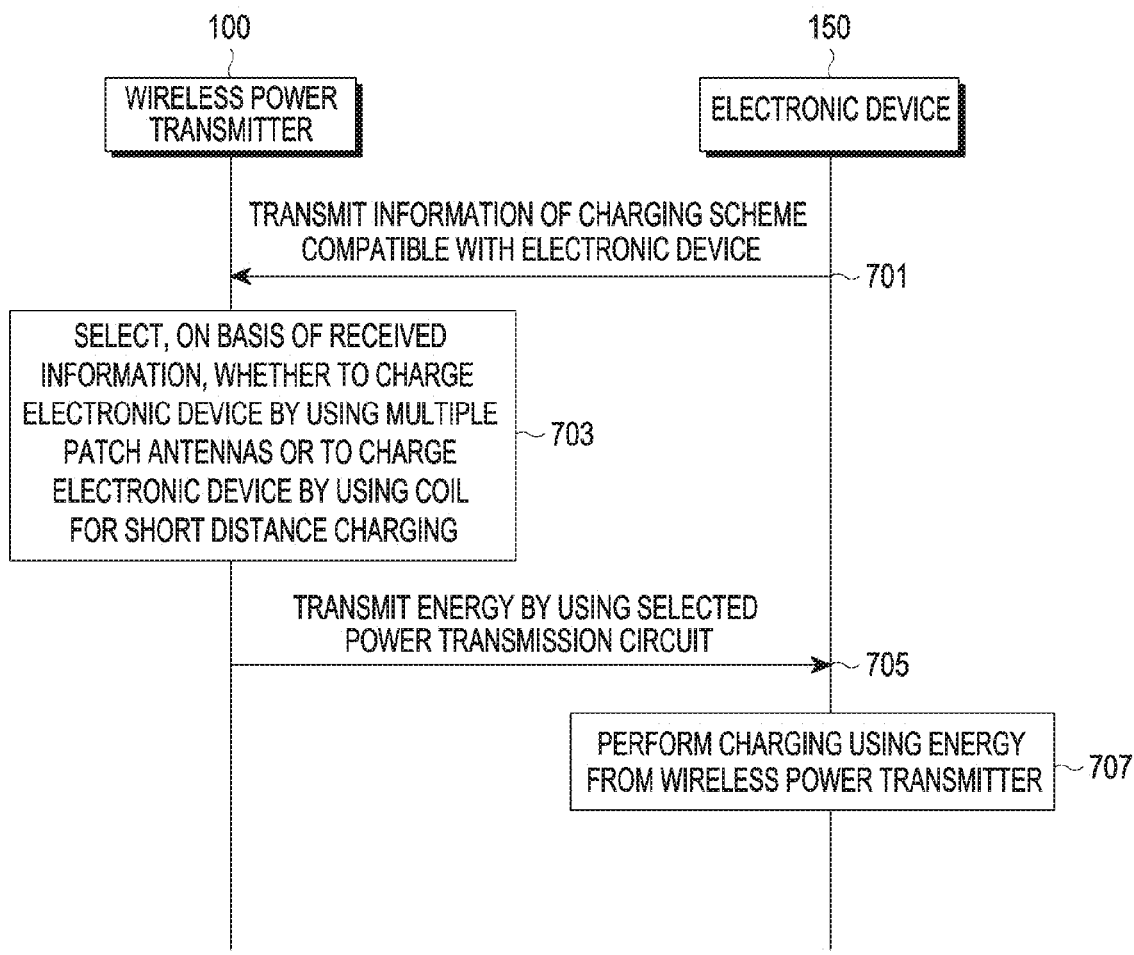
FIG. 7A illustrates a flowchart for explaining operation methods of the wireless power transmitter and the electronic device according to various embodiments of the disclosure.

FIG. 7A illustrates a flowchart for explaining operation methods of the wireless power transmitter and the electronic device according to various embodiments of the disclosure.

In operation 701, the wireless power transmitter 100 may transmit information of a selected charging scheme compatible with the electronic device 150. For example, when the electronic device 150 includes a BLE-based communication circuit, the electronic device 150 may include information of the charging scheme in an advertisement signal defined in the BLE standard and transmit the same. The electronic device 150 may encode and transmit information of the charging scheme. In various embodiments of the disclosure, the electronic device 150 may include information of the charging scheme in another signal defined in the BLE standard and transmit the same. Alternatively, the electronic device 150 may include information of the charging scheme in a signal defined in various communication schemes and transmit the same.

In operation 703, the wireless power transmitter 100 may select, on the basis of the received information, whether to charge the electronic device 150 by using multiple patch antennas or to charge the electronic device 150 by using a coil for short distance charging. For example, when the electronic device 150 supports only the resonance scheme, the wireless power transmitter 100 may select the resonance scheme as the charging scheme even when a distance to the electronic device 150 exceeds the threshold value described in FIG. 5. In operation 705, the wireless power transmitter 100 may transmit energy by using the selected power transmission circuit. In operation 707, the electronic device 150 may perform charging using energy from the wireless power transmitter 100.

Figure 7B:
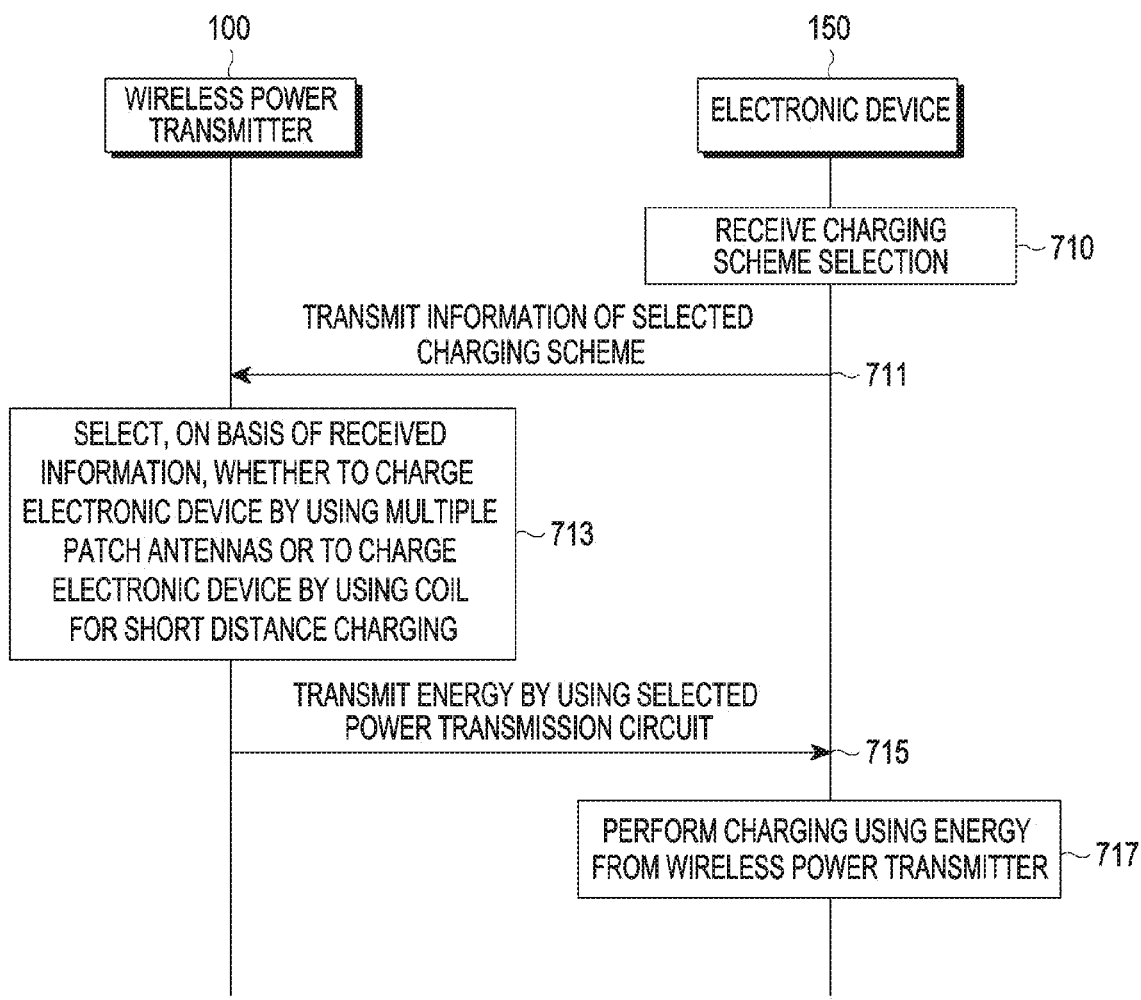
FIG. 7B illustrates a flowchart for explaining operation methods of the wireless power transmitter and the electronic device according to various embodiments of the disclosure.
Figure 7C:
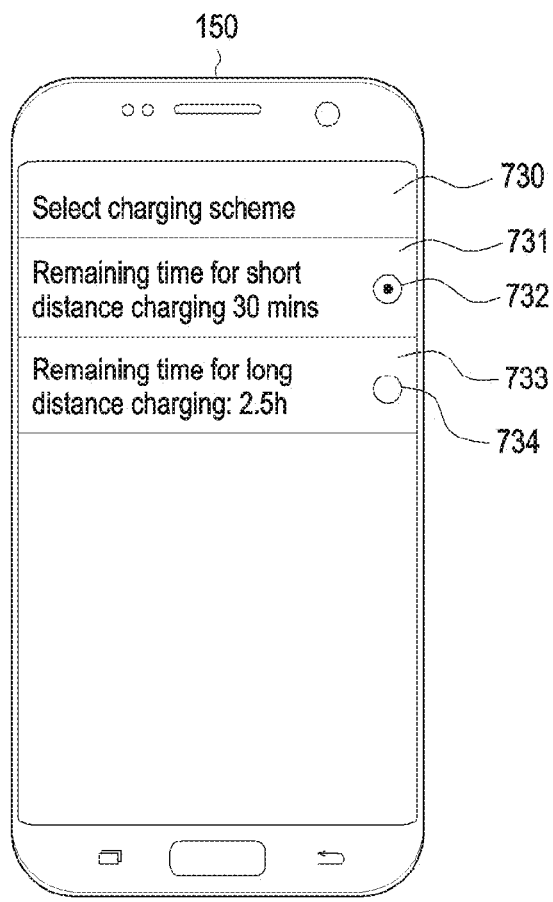
FIG. 7C illustrates a user interface configured to allow an input of selecting a charging scheme of the electronic device according to various embodiments of the disclosure.

FIG. 7B illustrates a flowchart for explaining operation methods of the wireless power transmitter and the electronic device according to various embodiments of the disclosure. An embodiment of FIG. 7B provides a description in more detail with reference to FIG. 7C. FIG. 7C illustrates a user interface configured to allow an input of selecting a charging scheme of the electronic device according to various embodiments of the disclosure.

In operation 710, the electronic device 150 may receive selection of a charging scheme. For example, as shown in FIG. 7C, the electronic device 150 may display, on a touchscreen, a user interface 730 for an input to select a charging scheme. In various embodiments of the disclosure, the electronic device 150 may receive information of a charging scheme compatible with the wireless power transmitter 100, and the user interface 730 may be configured by common charging schemes among charging schemes compatible with both the wireless power transmitter 100 and the electronic device 150. The user interface 730 may include charging scheme identification information 731 and 733, and keys 732 and 734 for charging scheme selection. The user interface 730 may include a full-charge estimation time corresponding to the charging scheme in charging scheme identification information 731 and 733 fields. In FIG. 7C, a short distance charging scheme may be selected to perform charging.

In operation 711, the electronic device 150 may transmit information of the selected charging scheme to the wireless power transmitter 100. In operation 713, the wireless power transmitter 100 may select, on the basis of the received information, whether to charge the electronic device 150 by using multiple patch antennas or to charge the electronic device 150 by using a coil for short distance charging. For example, when a user selects short distance charging, the wireless power transmitter 100 may select, as the charging scheme, the resonance scheme or the induction scheme. In operation 715, the wireless power transmitter 100 may transmit energy by using the selected power transmission circuit. In operation 717, the electronic device 150 may perform charging using energy from the wireless power transmitter 100.

Figure 8A:
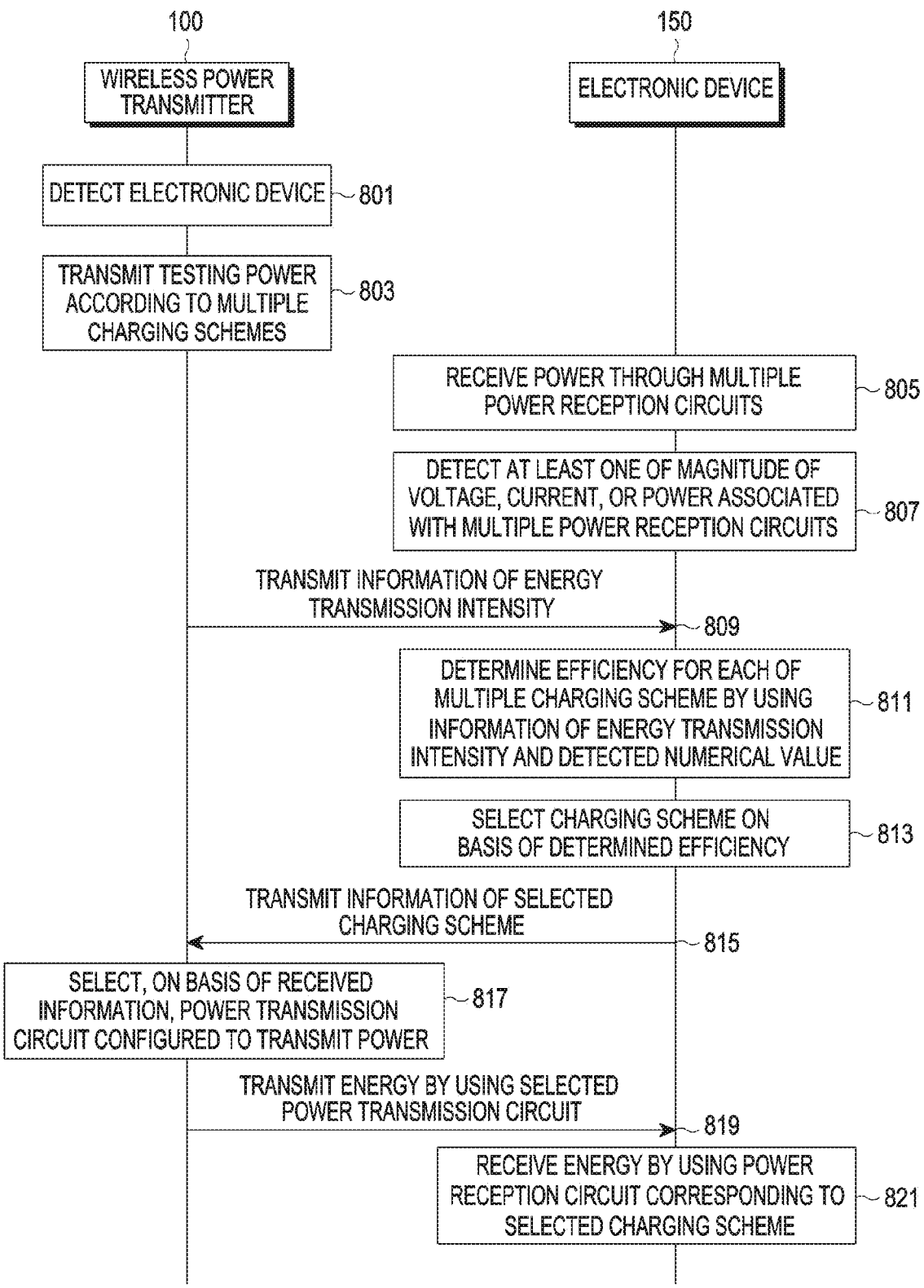
FIG. 8A illustrates a flowchart for explaining operation methods of the wireless power transmitter and the electronic device according to various embodiments of the disclosure.

FIG. 8A illustrates a flowchart for explaining operation methods of the wireless power transmitter and the electronic device according to various embodiments of the disclosure.

In operation 801, the wireless power transmitter 100 may detect an electronic device. In operation 803, the wireless power transmitter 100 may transmit a testing power according to multiple charging schemes. For example, the wireless power transmitter may transmit a first testing power in the electromagnetic wave scheme, and may transmit a second testing power in the resonance scheme. In operation 805, the electronic device 150 may receive power through multiple power reception circuits. In operation 807, the electronic device 150 may detect at least one of the magnitude of voltage, current, or power associated with the multiple power reception circuits.

In operation 809, the wireless power transmitter 100 may transmit information of an energy transmission intensity. For example, the wireless power transmitter 100 may transmit information of a transmission intensity of the first testing power and information of a transmission intensity of the second testing power to the electronic device 150 via a single communication signal or multiple communication signals. In operation 811, the electronic device 150 may determine an efficiency for each of multiple charging schemes by using a detected numerical value and the energy transmission intensity. In another embodiment, the electronic device 150 may measure an energy reception intensity and may determine a transmission efficiency by using the energy transmission intensity and the energy reception intensity.

In operation 813, the electronic device 150 may select the charging scheme on the basis of the determined efficiency. For example, the electronic device 150 may select the charging scheme having a higher efficiency. In operation 815, the electronic device 150 may transmit information of the selected charging scheme to the wireless power transmitter 100. In operation 817, the wireless power transmitter 100 may select a power transmission circuit to transmit power, on the basis of the received information. That is, the wireless power transmitter 100 may select the charging scheme on the basis of the received information. In operation 819, the wireless power transmitter 100 may transmit energy by using the selected power transmission circuit. In operation 821, the electronic device 150 may receive energy by using a power reception circuit corresponding to the selected charging scheme. As described above, power may be transmitted at an optimal efficiency, and power saving management may be possible accordingly.

Figure 8B:
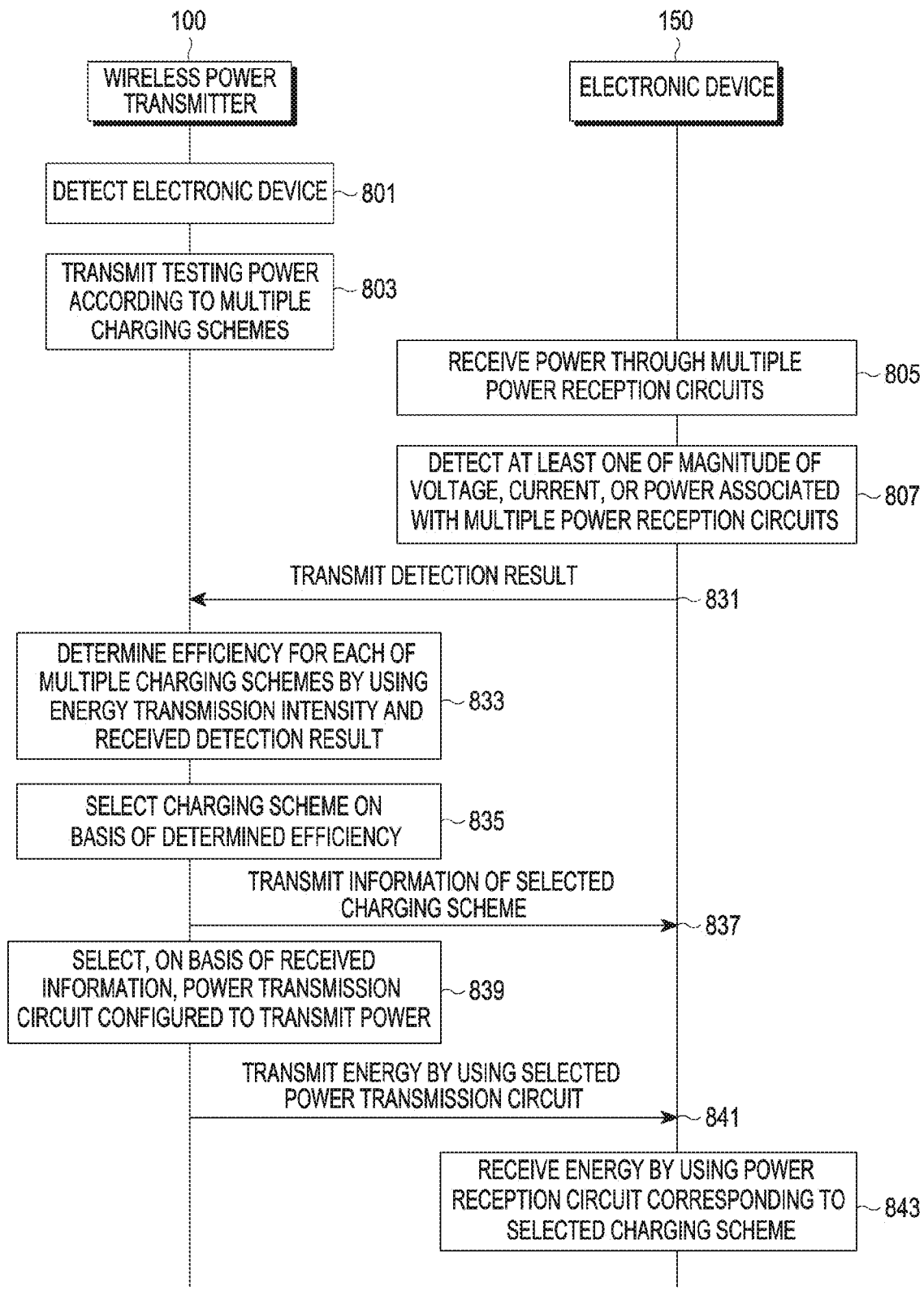
FIG. 8B illustrates a flowchart for explaining operation methods of the wireless power transmitter and the electronic device according to various embodiments of the disclosure.

FIG. 8B illustrates a flowchart for explaining operation methods of the wireless power transmitter and the electronic device according to various embodiments of the disclosure. Because operation 801 to operation 807 have been described in FIG. 8A, further description thereof will be omitted.

In operation 831, the electronic device 150 may transmit a detection result. In various embodiments of the disclosure, the electronic device 150 may detect an energy reception intensity and may transmit a power reception intensity to the wireless power transmitter 100. In operation 833, the wireless power transmitter 100 may determine an efficiency of each of multiple charging schemes by using the energy transmission intensity and the received detection result. Alternatively, the wireless power transmitter 100 may determine a transmission efficiency on the basis of the energy transmission intensity and the energy reception intensity in the electronic device 150. In operation 835, the electronic device 100 may select the charging scheme on the basis of the determined efficiency. For example, the wireless power transmitter 100 may select the charging scheme having a higher efficiency. In operation 837, the wireless power transmitter 100 may transmit information of the selected charging scheme. In operation 839, the wireless power transmitter 100 may select a power transmission circuit to transmit power, on the basis of the received information. In operation 841, the wireless power transmitter 100 may transmit energy by using the selected power transmission circuit. In operation 843, the electronic device 150 may receive energy by using a power reception circuit corresponding to the selected charging scheme.

As described in FIG. 8A and FIG. 8B, according to various embodiments, the charging scheme may be selected by the wireless power transmitter 100 or may be selected by the electronic device 150 that receives power, on the basis of the transmission efficiency.

Figure 9:
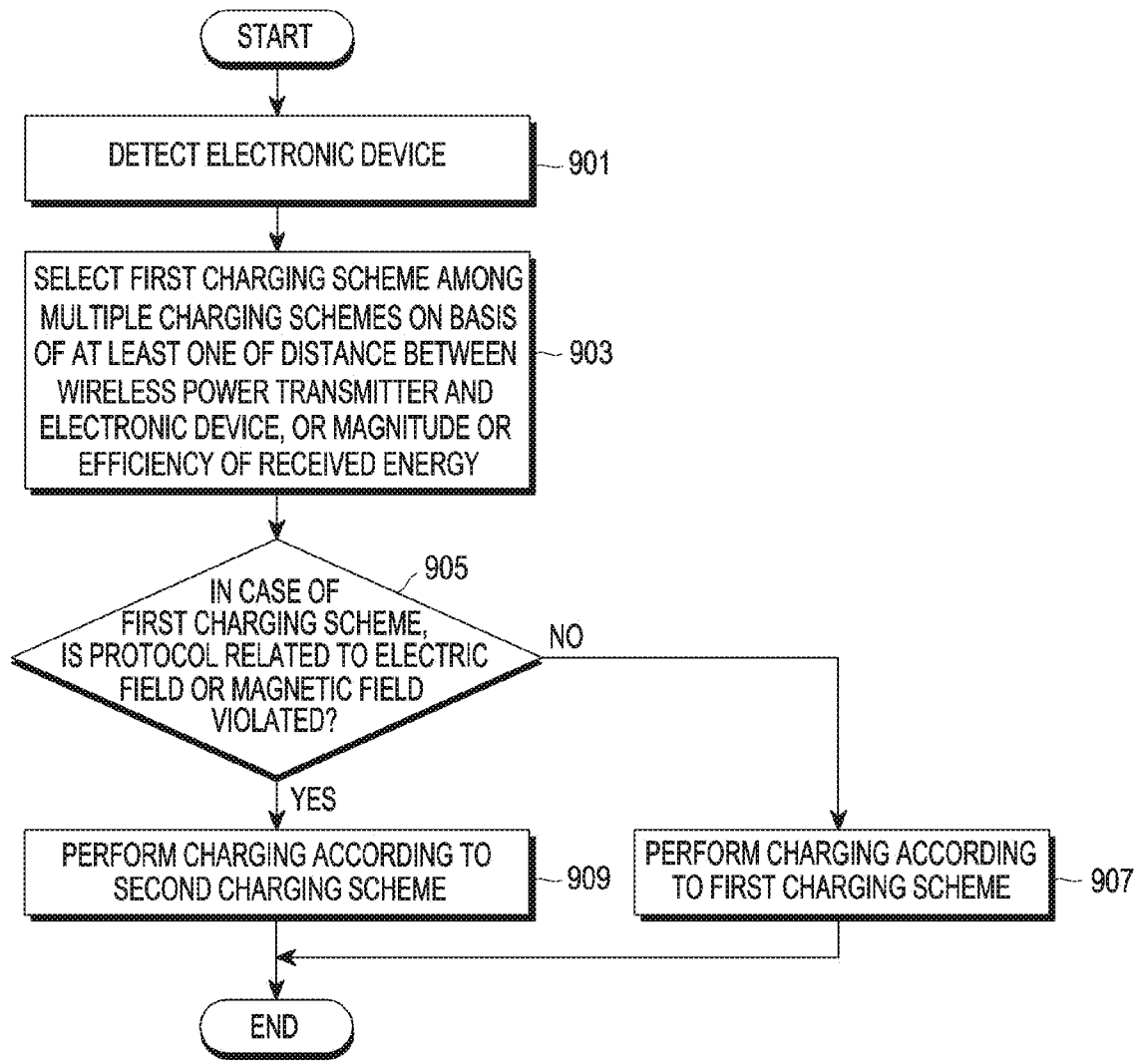
FIG. 9 illustrates a flowchart for explaining an operation method of the wireless power transmitter according to various embodiments of the disclosure.

FIG. 9 illustrates a flowchart for explaining an operation method of the wireless power transmitter according to various embodiments of the disclosure.

In operation 901, the wireless power transmitter 100 may detect the electronic device 150. In operation 903, as described above, the wireless power transmitter 100 may select a first charging scheme among multiple charging schemes on the basis of at least one of a distance between the wireless power transmitter 100 and the electronic device 150, or the magnitude or intensity of energy received by the electronic device 150.

In operation 905, in the case of the first charging scheme, the wireless power transmitter 100 may determine whether an electric field-associated or magnetic field-associated protocol is violated. For example, an organization, such as a Federal Communications Commission (FCC) has issued a protocol relating to Electromagnetic Interference (EMI) of an electric field or a magnetic field, and the wireless power transmitter 100 is required to comply with the related protocol. In addition, regarding the wireless charging standard (e.g., WPC standard or A4WP standard), the maximum transmission amount or the minimum transmission amount is regulated, and the wireless power transmitter 100 is required to comply with the corresponding regulations. Accordingly, when transmission is performed according to the determined first charging scheme, the wireless power transmitter 100 may determine whether an associated protocol is violated. Parameters for associated protocols and a condition for numerical values of the parameters may be pre-stored in the wireless power transmitter 100, and the wireless power transmitter 100 may detect numerical values corresponding to the pre-stored parameters and may determine whether a detection result satisfies the pre-stored condition so as to determine whether the protocols are complied with or violated.

If it is determined that the protocols are complied with, the wireless power transmitter 100 may perform charging, in operation 907, according to the selected first charging scheme. If it is determined that the protocols are violated, the wireless power transmitter 100 may change the charging scheme from the first charging scheme to a second charging scheme and may perform charging in operation 909 according to the second charging scheme.

In various embodiments of the disclosure, the wireless power transmitter 100 may determine to perform charging using both the first charging scheme and the second charging scheme. For example, when rapid charging of the electronic device 150 is required, the wireless power transmitter 100 may transmit power to the electronic device 150 by concurrently using multiple power transmission circuits. If it is determined that a concurrent charging condition for the electronic device 150 is satisfied, the wireless power transmitter 100 may determine to perform charging using both the first charging scheme and the second charging scheme. The wireless power transmitter 100 may determine whether the associated protocol is violated even when power is concurrently transmitted in multiple charging schemes, and if it is determined that the associated protocol is violated, power transmission using at least one charging scheme among the multiple charging schemes may be stopped, and the power transmission may be performed using the remaining charging schemes.

Figure 10A:
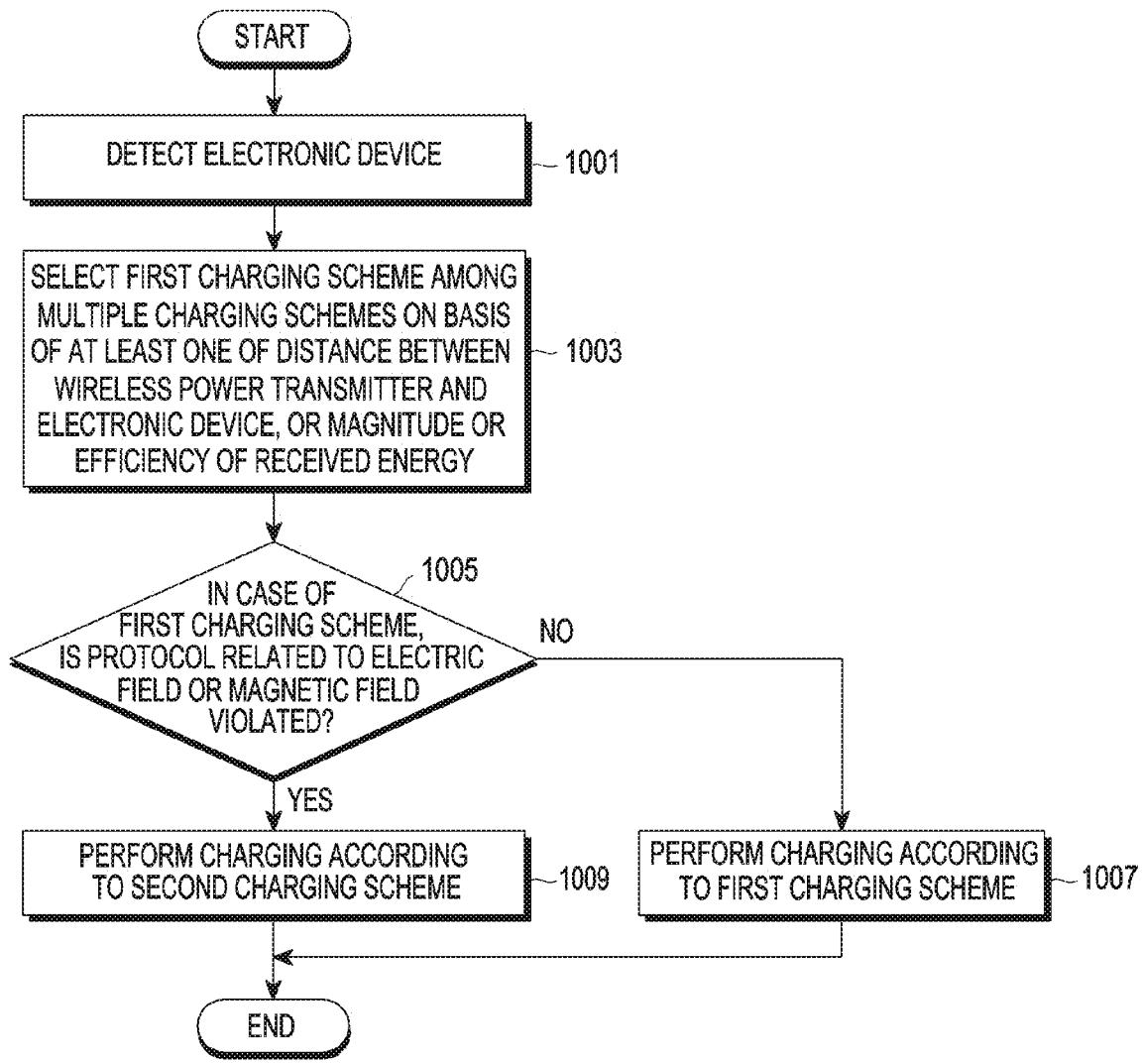
FIG. 10A illustrates a flowchart for explaining an operation method of the wireless power transmitter according to various embodiments of the disclosure.
Figure 10B:
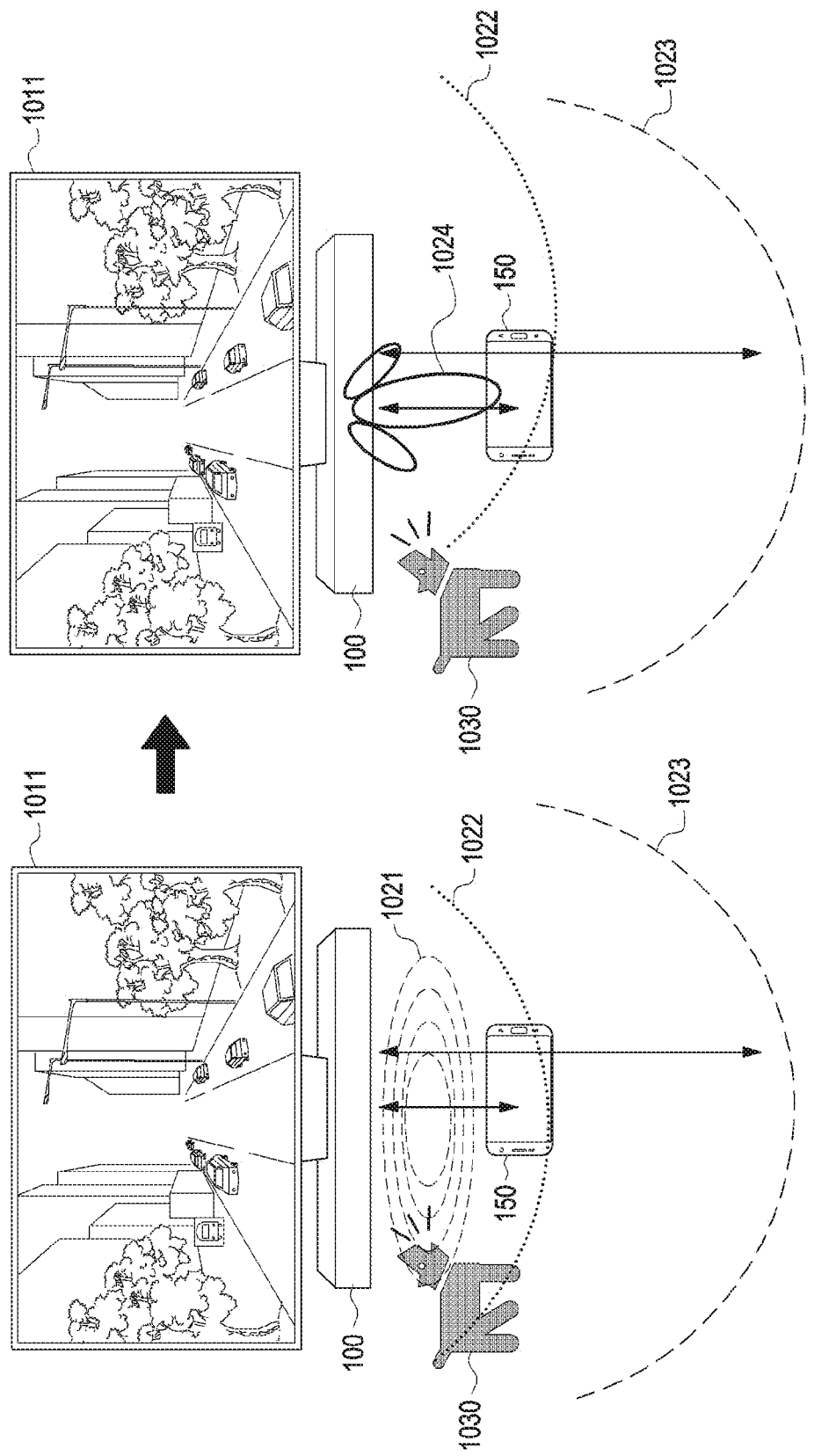
FIG. 10B illustrates a conceptual diagram for explaining the arrangement of the wireless power transmitter and a living body according to various embodiments of the disclosure.

FIG. 10A illustrates a flowchart for explaining an operation method of the wireless power transmitter according to various embodiments of the disclosure. An embodiment of FIG. 10A provides a description in more detail with reference to FIG. 10B. FIG. 10B illustrates a conceptual diagram for explaining the arrangement of the wireless power transmitter and a living body according to various embodiments of the disclosure.

In operation 1001, the wireless power transmitter 100 may detect the electronic device 150. In operation 1003, the wireless power transmitter 100 may select a first charging scheme among multiple charging schemes on the basis of at least one of a distance between the wireless power transmitter 100 and the electronic device 150 or the magnitude or efficiency of energy received by the electronic device 150.

In operation 1005, in the case of performing charging in a first charging scheme, the wireless power transmitter 100 may determine whether charging influences a living body. For example, as shown in FIG. 10B, a living body 1030 may be located around the wireless power transmitter 100. The wireless power transmitter 100 may determine a location of the living body 1030 according to various methods, such as vision recognition or radar recognition. If it is determined that charging does not influence the living body, the wireless power transmitter 100 may perform charging, in operation 1007, according to the first charging scheme. When it is determined that charging influences the living body, the wireless power transmitter 100 may perform charging, in operation 1009, according to a second charging scheme.

For example, as shown in FIG. 10B, the wireless power transmitter 100 may be located close to a TV 1011. When the electronic device 150 is located in a first range 1022, the wireless power transmitter 100 may charge the electronic device 150 according to the resonance scheme, and when the electronic device 150 is out of the first range 1022 and is located in a second range 1023, the electronic device 150 may be configured to be charged in the electromagnetic wave scheme. Because it is determined that the electronic device 150 is included in the first range 1022, the wireless power transmitter 100 may form a magnetic field 1021 on the basis of the resonance scheme. However, when it is determined that the magnetic field 1021 influences the living body 1030, the wireless power transmitter 100 may determine to charge the electronic device 150 via the electromagnetic wave scheme, as shown on the right side of FIG. 10B. The wireless power transmitter 100 may form an RF wave 1024, and because the RF wave 1024 is beamformed in the location of the electronic device 150, the living body 1030 may not be influenced. Although not illustrated, the wireless power transmitter 100 may select the charging scheme to be the electromagnetic wave scheme and then may change the charging scheme to the resonance scheme. For example, the wireless power transmitter 100 may detect that a living body is located in a direction in which the beamformed RF wave is formed. In this case, the wireless power transmitter 100 may change the charging scheme to the resonance scheme and may transmit power to the electronic device 150.

In various embodiments of the disclosure, even if a living body is detected, if it is determined that a Specific Absorption Rate (SAR)-related protocol proposed by the FCC is not violated, the wireless power transmitter or the electronic device may transmit power without changing a selected charging scheme.

Figure 11:
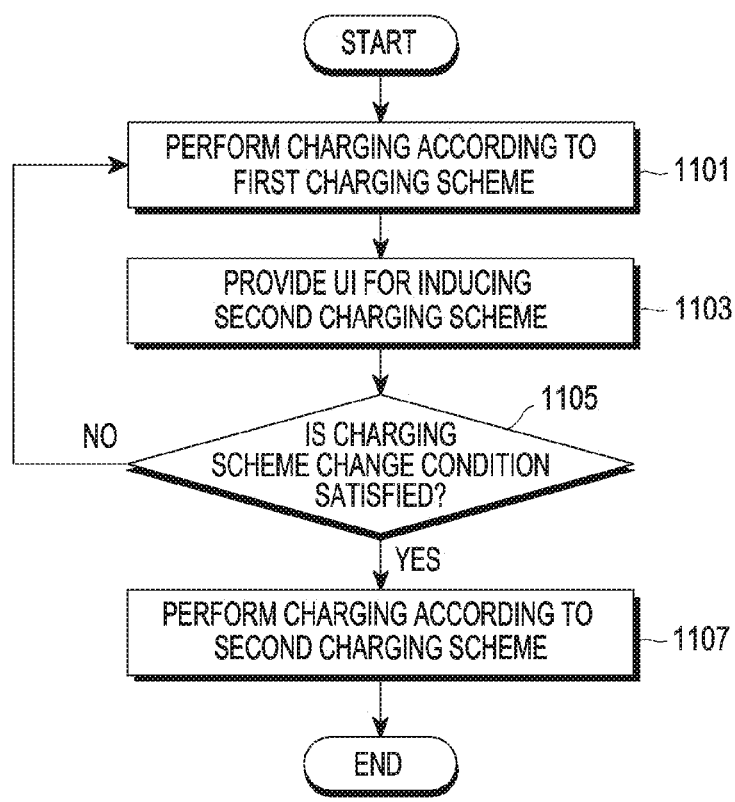
FIG. 11 illustrates a flowchart for explaining an operation method of the wireless power transmitter or the electronic device according to various embodiments of the disclosure.
Figure 12:
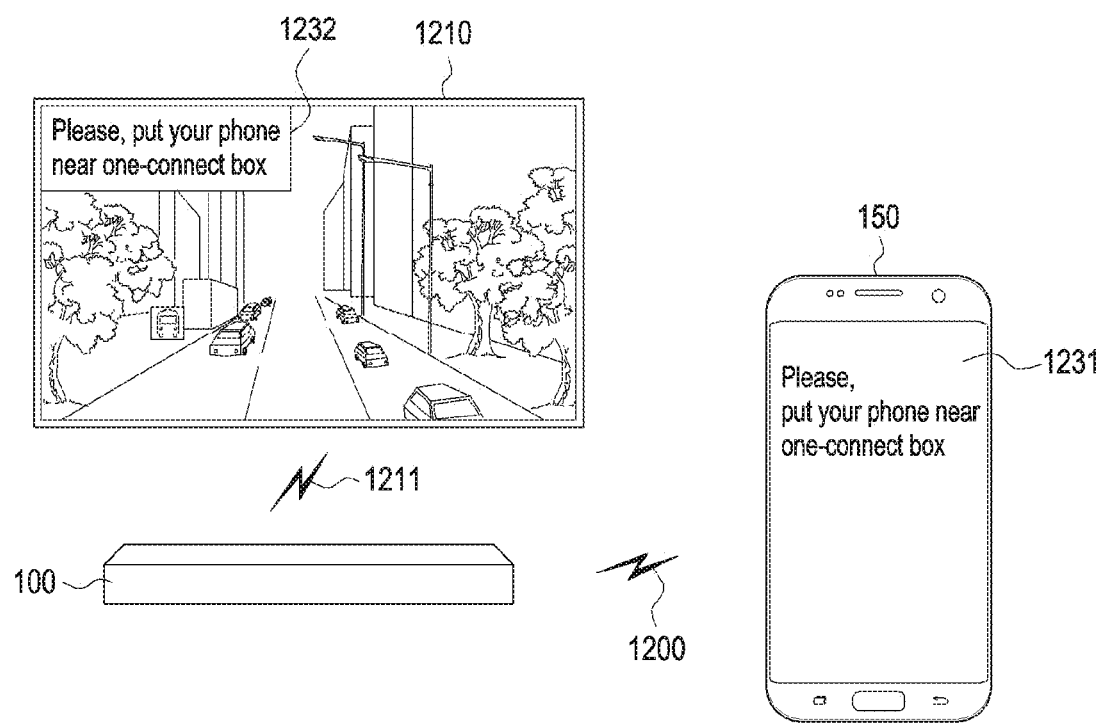
FIG. 12 illustrates a user interface configured to induce a change of a charging scheme for the wireless power transmitter or the electronic device according to various embodiments of the disclosure.

FIG. 11 illustrates a flowchart for explaining an operation method of the wireless power transmitter or the electronic device according to various embodiments of the disclosure. An embodiment of FIG. 11 will be described in more detail with reference to FIG. 12. FIG. 12 illustrates a user interface configured to induce a change of a charging scheme for the wireless power transmitter or the electronic device according to various embodiments of the disclosure.

In operation 1011, the wireless power transmitter 100 or the electronic device 150 may perform charging according to a first charging scheme. The wireless power transmitter 100 may transmit power through a power transmission circuit corresponding to the first charging scheme, and the electronic device 150 may receive power through a power reception circuit corresponding to the first charging scheme. In operation 1013, the wireless power transmitter 100 or the electronic device 150 may provide a UI for inducing the second charging scheme. When a transmission efficiency according to the first charging scheme is lower than a threshold value or when an intensity of power received by the electronic device 150 according to the first charging scheme is lower than a threshold value, the wireless power transmitter 100 or the electronic device 150 may provide the UI for switching a charging scheme to the second charging scheme. Alternatively, when the remaining battery amount of the electronic device 150 is lower than a reference value, the wireless power transmitter 100 or the electronic device 150 may provide the UI for switching the charging scheme to the second charging scheme. Alternatively, when an amount of power consumption by the electronic device 150 increases, the wireless power transmitter 100 or the electronic device 150 may provide the UI for switching the charging scheme to the second charging scheme. In this case, while using an application, the electronic device 150 may provide the UI for switching the charging scheme to the second charging scheme. Alternatively, when a magnitude of power chargeable in the second charging scheme by the wireless power transmitter 100 exceeds a threshold value, the wireless power transmitter 100 or the electronic device 150 may provide the UI for switching the charging scheme to the second charging scheme. For example, while the wireless power transmitter 100 is charging another electronic device in the second charging scheme, if the another electronic device is fully charged, the UI for switching the charging scheme to the second charging scheme may be provided.

For example, as shown in FIG. 12 the wireless power transmitter 100 may transmit data 1211 to a TV 1210. The wireless power transmitter 100 may transmit the data 1211 to the TV 1210, the data 1211 including an instruction causing display of a UI 1232 that induces switching to the second charging scheme. If the wireless power transmitter 100 includes a display, the wireless power transmitter 100 may display the UI that induces switching to the second charging scheme. Alternatively, the wireless power transmitter 100 may transmit data 1200 to the electronic device 150, the data 1200 including an instruction causing display of a UI 1231 that induces switching to the second charging scheme. For example, "one-connect box" may be a model name of a device including the wireless power transmitter 100, and the UI 1231 may be configured as a name familiar to a user. Alternatively, when a transmission efficiency according to the first charging scheme is lower than the threshold value or when an intensity of power received by the electronic device 150 according to the first charging scheme is lower than a threshold value, the UI 1231 for switching the charging scheme to the second charging scheme may be displayed. In various embodiments of the disclosure, the wireless power transmitter 100 may provide a UI that induces switching to the second charging scheme via not only a screen but also various schemes, such as sound, vibration, LED flickering, etc.

In operation 1015, the wireless power transmitter 100 or the electronic device 150 may determine whether a charging scheme change condition is satisfied. For example, the charging scheme change condition may be a condition that a distance between the wireless power transmitter 100 and the electronic device 150 is equal to or smaller than a threshold value and then becomes to exceed the threshold value or a condition that the distance between the wireless power transmitter 100 and the electronic device 150 exceeds the threshold value and then is reduced to the threshold value or smaller. The user may check the UI and may move the electronic device 150 to a wireless power transmitter 100 side. Accordingly, the electronic device 150 may be located relatively close to the wireless power transmitter 100. The wireless power transmitter 100 or the electronic device 150 may determine that the distance the wireless power transmitter 100 and the electronic device 150 is equal to or smaller than the threshold value. In operation 1017, the wireless power transmitter 100 or the electronic device 150 may perform charging according to the second charging scheme.

Figure 13:
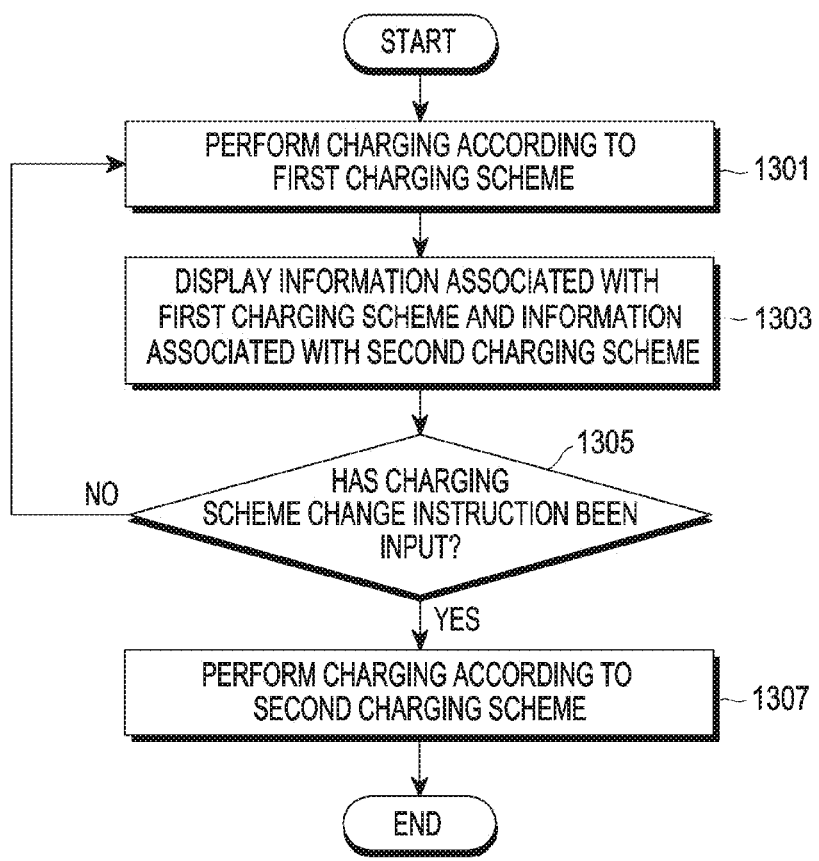
FIG. 13 illustrates a flowchart for explaining an operation method of the wireless power transmitter or the electronic device according to various embodiments of the disclosure.
Figure 14:
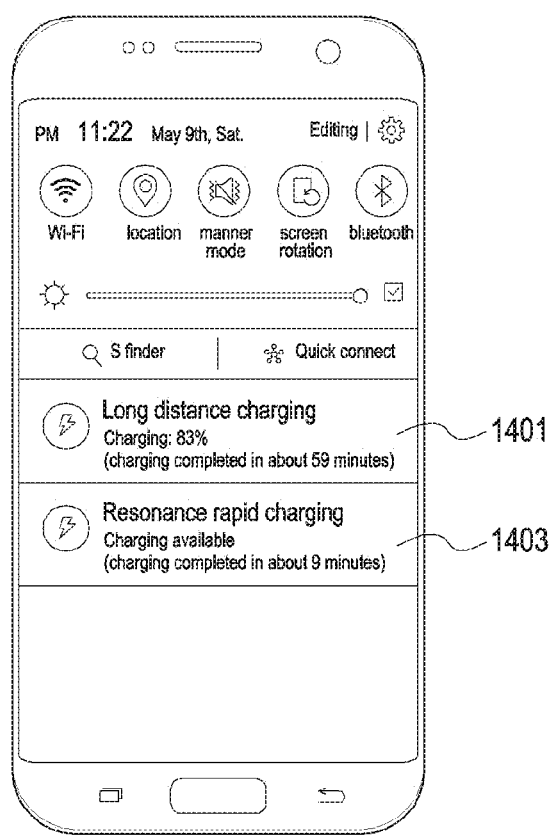
FIG. 14 illustrates information associated with a charging scheme displayed in the electronic device according to various embodiments of the disclosure.

FIG. 13 illustrates a flowchart for explaining an operation method of the wireless power transmitter or the electronic device according to various embodiments of the disclosure. An embodiment of FIG. 13 will be described in more detail with reference to FIG. 14. FIG. 14 illustrates information associated with a charging scheme displayed in the electronic device according to various embodiments of the disclosure.

In operation 1301, the wireless power transmitter 100 or the electronic device 150 may perform charging according to the first charging scheme. For example, the wireless power transmitter 100 may transmit power through multiple patch antennas according to the electromagnetic wave scheme, and the electronic device 150 may receive power through the multiple patch antennas according to the electromagnetic wave scheme. In operation 1303, the wireless power transmitter 100 or the electronic device 150 may display information associated with the first charging scheme and information associated with the second charging scheme. For example, as shown in FIG. 14, the electronic device 150 may display information 1401 and 1403 associated with charging schemes. The information 1401 associated with the first charging scheme may include identification information indicating the electromagnetic wave scheme (e.g., long distance charging), information indicating whether charging is being performed according to the electromagnetic wave scheme (e.g., a state of being charged), information indicating a charging rate (e.g., 83%), a full-charge estimation time (e.g., fully charged after about 59 minutes), and the like. The information 1402 associated with the second charging scheme may include identification information indicating the resonance scheme (e.g., resonance high-speed charging), information indicating availability of charging in the resonance scheme (e.g., a state in which charging is possible), a full-charge estimation time (e.g., fully charged after about 9 minutes), and the like. Although not illustrated, the wireless power transmitter 100 may also directly display information associated with the charging scheme or may perform control to display the information via another electronic device such as a TV. Alternatively, the magnitude, sensitivity, etc. of charge power may also be displayed.

In operation 1305, the wireless power transmitter 100 or the electronic device 150 may determine whether a wireless charging scheme change instruction is input. For example, in FIG. 14B, a user may specify the information 1402 associated with the second charging scheme. In the electronic device 150, specifying the information associated with the charging scheme may be preconfigured to changing of the charging scheme in the specified scheme. Accordingly, in response to specifying of the information 1402 associated with the second charging scheme. The electronic device 150 may change the charging scheme from the first charging scheme to the second charging scheme. In operation 1307, the electronic device 150 may perform charging according to the second charging scheme.

In various embodiments of the disclosure, the electronic device 150 may display information as shown in FIG. 14 in an animation at the start of charging, or may display the information on a status bar or the like. While executing another application, the electronic device 150 may display associated information.

Figure 15:
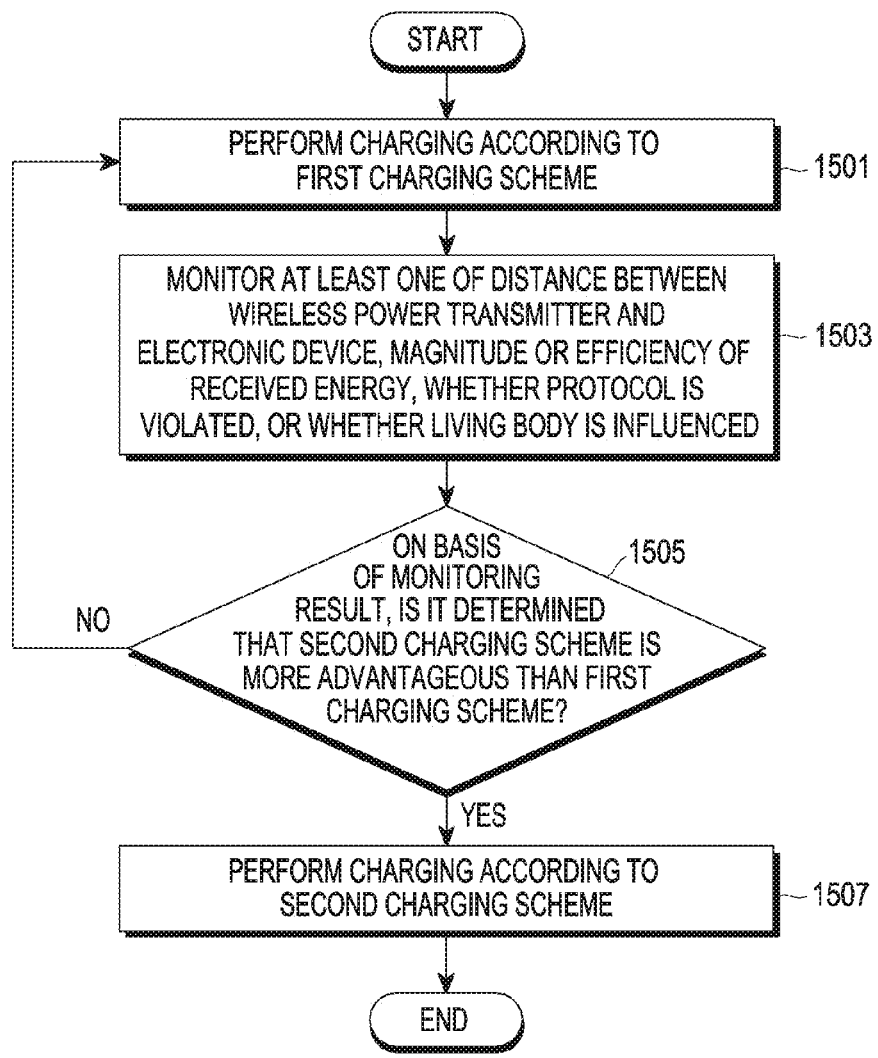
FIG. 15 illustrates a flowchart for explaining an operation method of the wireless power transmitter or the electronic device according to various embodiments of the disclosure.

FIG. 15 illustrates a flowchart for explaining an operation method of the wireless power transmitter or the electronic device according to various embodiments of the disclosure.

In operation 1501, the wireless power transmitter 100 or the electronic device 150 may perform charging according to the first charging scheme. For example, the wireless power transmitter 100 may transmit power through multiple patch antennas according to the electromagnetic wave scheme, and the electronic device 150 may receive power through the multiple patch antennas according to the electromagnetic wave scheme. In operation 1503, the wireless power transmitter 100 or the electronic device 150 may monitor at least one of a distance between the wireless power transmitter 100 and the electronic device 150, a magnitude or efficiency of energy received by the electronic device 150, whether a protocol is violated, or whether a living body is influenced.

In operation 1505, the wireless power transmitter 100 or the electronic device 150 may determine whether the second charging scheme is more advantageous than the first charging scheme, on the basis of a monitoring result. Example in which the wireless power transmitter 100 or the electronic device 150 determines that the second charging scheme is more advantageous than the first charging scheme may be described in more details with reference to FIG. 16A to FIG. 16C. However, if it is determined that the second charging scheme is more advantageous than the first charging scheme, the wireless power transmitter 100 or the electronic device 150 may perform charging, in operation 1507, according to the second charging scheme.

Figure 16A:
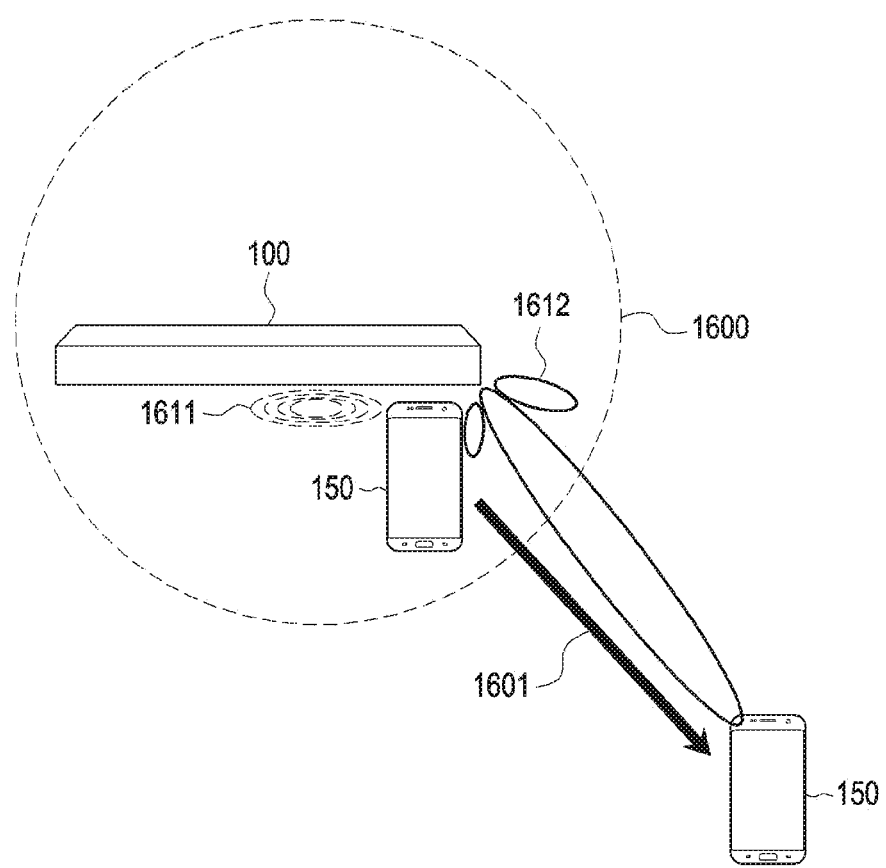
FIG. 16A to FIG. 16C illustrate conceptual diagrams for explaining charging scheme change procedures according to various embodiments of the disclosure.
Figure 16B:
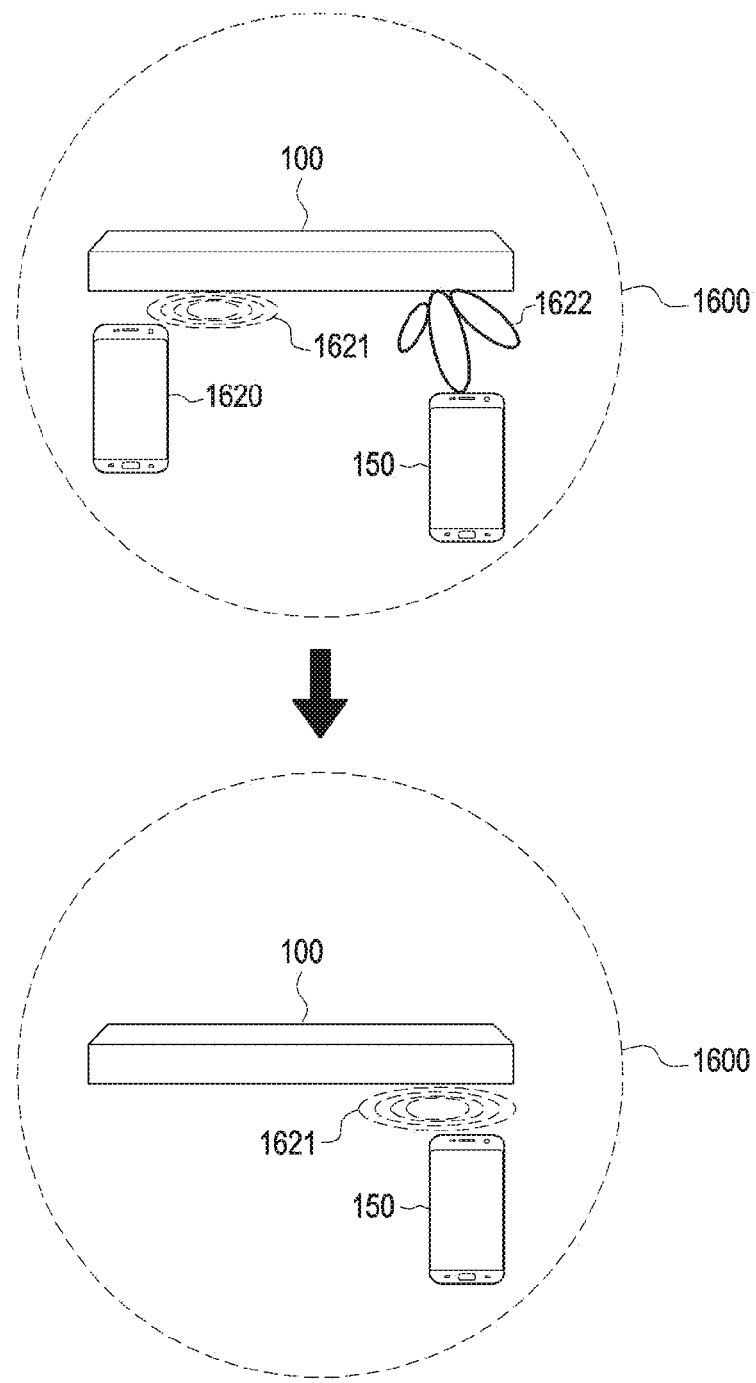
Figure 16C:
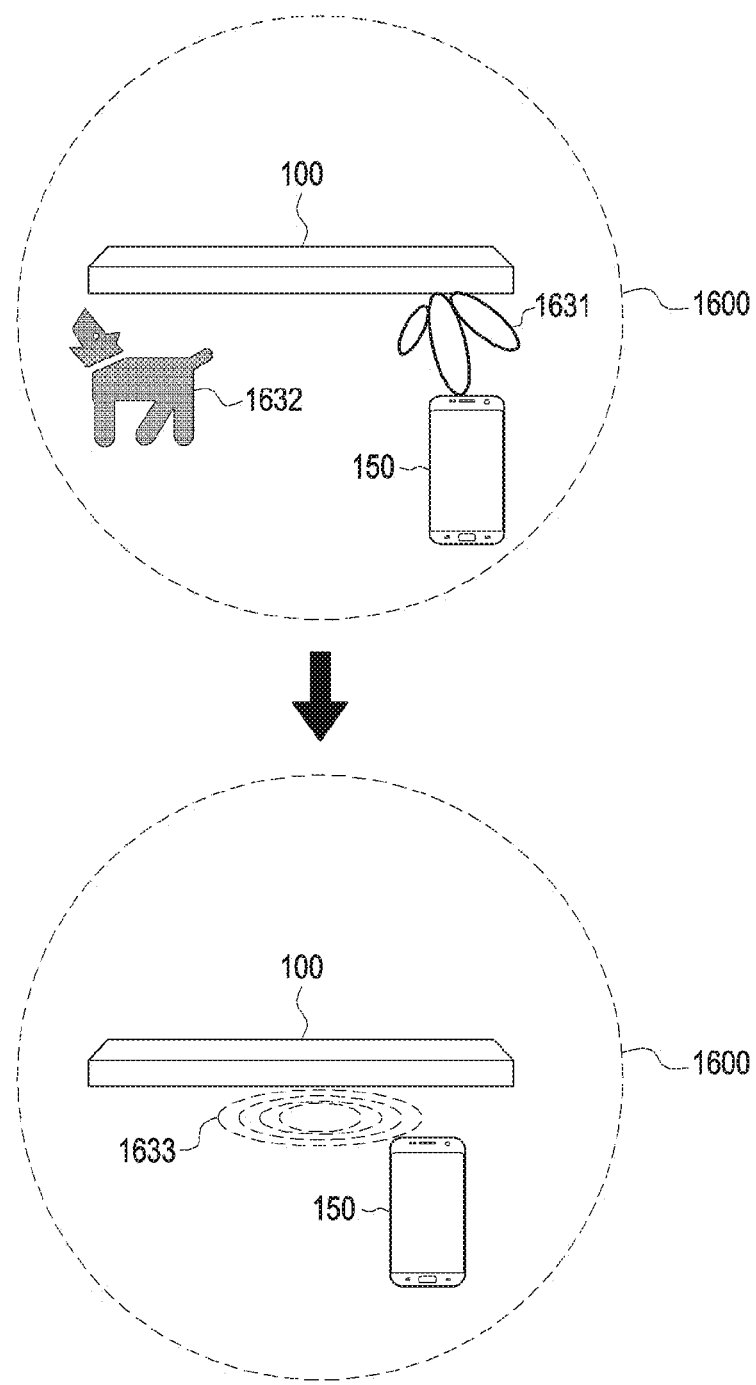

FIG. 16A to FIG. 16C illustrate conceptual diagrams for explaining charging scheme change procedures according to various embodiments of the disclosure.

Referring to FIG. 16A, the wireless power transmitter 100 may be configured to perform charging according to the resonance scheme when the electronic device 150 is located in a first range 1600 and may be configured to perform charging according to the electromagnetic wave scheme when the electronic device 150 is located out of the first range 1600. The wireless power transmitter 100 may determine that the electronic device 150 is located within the first range 1600 at a first time point. The wireless power transmitter 100 may transmit power to the electronic device 150 by forming a magnetic field 1611 via a coil (or a resonance circuit) according to the resonance scheme. The wireless power transmitter 100 may monitor a distance between the wireless power transmitter 100 and the electronic device 150.

At a second time point, the electronic device 150 may move out 1601 of the first range 600. For example, the user may carry the electronic device 150 and move out of the first range 600. The wireless power transmitter 100 may determine that the electronic device 150 is located out of the first range 1600 due to increasing of the distance between the wireless power transmitter 100 and the electronic device 150. The wireless power transmitter 100 may determine, accordingly, to charge the electronic device 150 in the electromagnetic wave scheme. The wireless power transmitter 100 may transmit power to the electronic device 150 by forming an RF wave 1612 via multiple patch antennas corresponding to the electromagnetic wave scheme.

Referring to FIG. 16B, the wireless power transmitter 100 may be configured to perform charging according to the resonance scheme when the electronic device 150 is located in a first range 1600 and may be configured to perform charging according to the electromagnetic wave scheme when the electronic device 150 is located out of the first range 1600. At the first time point, the wireless power transmitter 100 may identify another electronic device 1620 and may perform charging. Since the another electronic device 1620 is included in the first range 1600, the wireless power transmitter 100 may charge the another electronic device 1620 in the resonance scheme. The wireless power transmitter 100 may transmit power to the electronic device 1620 by forming a magnetic field 1621 via the coil (or a resonance circuit). At the second time point, the electronic device 150 may be disposed within the first range 1600. The wireless power transmitter 100 may determine that the electronic device 150 is disposed within the first range 1600 and may thus select the resonance scheme as the charging scheme of the electronic device 150. The wireless power transmitter 100 may determine whether a protocol is violated when charging is performed in the resonance scheme. For example, in the resonance scheme standard, a minimum charging power value to be received by the wireless power receiver may be suggested. When the electronic device 150 and the another electronic device 1620 are concurrently charged, the wireless power transmitter 100 may determine that power less than the minimum power value, which is suggested to the electronic device 150, is transmitted. Accordingly, the wireless power transmitter 100 may select to charge the electronic device 150 in the electromagnetic wave scheme. The wireless power transmitter 100 may transmit power to the electronic device 150 by forming an RF wave 1622 via multiple patch antennas.

At a third time point, the another electronic device 1620 may move out of the first range 1600. The wireless power transmitter 100 may monitor whether a protocol is violated. For example, when the electronic device 150 is charged alone, the wireless power transmitter 100 may determine that power of the suggested minimum power value or greater can be transmitted to the electronic device 150. The wireless power transmitter 100 may charge the electronic device 150 in the resonance scheme on the basis of the fact that the protocol is not violated even if charging is performed in the resonance scheme. The wireless power transmitter 100 may transmit power to the electronic device 150 by forming a magnetic field 1621 via the coil (or a resonance circuit).

Alternatively, the wireless power transmitter 100 may charge, at the second time point, the electronic device 150 according to the electromagnetic wave scheme on the basis of the fact that a transmission efficiency of power transmitted from the wireless power transmitter 100 to the electronic device 150 is equal to or smaller than a threshold value. The wireless power transmitter 100 may monitor a transmission efficiency corresponding to the resonance scheme. For example, the wireless power transmitter 100 may periodically perform charging according to the resonance scheme and may monitor a transmission efficiency according to the resonance scheme on the basis of a detected current, voltage, or magnitude or a reception intensity from the electronic device 150. At the third time point at which the other electronic device 1620 is disappeared, the wireless power transmitter 100 may determine that the transmission efficiency of power transmitted from the wireless power transmitter 100 to the electronic device 150 exceeds the threshold value. The wireless power transmitter 100 may change the charging scheme to the resonance scheme according thereto and may also charge the electronic device 150 by forming a magnetic field 1621.

Referring to FIG. 16C, the wireless power transmitter 100 may be configured to perform charging according to the resonance scheme when the electronic device 150 is located in a first range 1600 and may be configured to perform charging according to the electromagnetic wave scheme when the electronic device 150 is located out of the first range 1600. At the first time point, the electronic device 150 may be disposed within the first range 1600. At the first time point, a living body 1632 may be located within the first range 1600. Since the electronic device 150 is disposed in the first range 1600, the wireless power transmitter 100 may select the resonance scheme as a charging scheme. In the case where a magnetic field is formed by the resonance scheme, the wireless power transmitter 100 may determine that the magnetic field influences the living body 1632. Therefore, the wireless power transmitter 100 may select the electromagnetic wave scheme as the charging scheme so that the living body 1632 is not influenced. The wireless power transmitter 100 may beamform an RF wave 1631 at a location of the electronic device 150, and the living body 1632 may not be influenced by the magnetic field or an electric field.

The wireless power transmitter 100 may monitor whether the living body is influenced. At the second time point, the living body 1632 may move out of the first range 1600. For example, the wireless power transmitter 100 may determine, on the basis of vision recognition or radar recognition, that the living body 1632 moves out of the first range 1600 at the second time point, and there is no limitation on a method of determining by the wireless power transmitter 100 whether the living body 1632 moves. The wireless power transmitter 100 may determine that formation of the magnetic field in the resonance scheme does not influence the living body 1632 and may select the resonance scheme as the charging scheme according thereto. The wireless power transmitter 100 may transmit power to the electronic device 150 by forming a magnetic field 1633 according to the resonance scheme.

In relation to FIG. 16A to FIG. 16C, although it is described that the wireless power transmitter 100 monitors and changes a charging scheme, the description is merely exemplary. As described above, the electronic device 150 may also perform monitoring and change the charging scheme.

Figure 17:
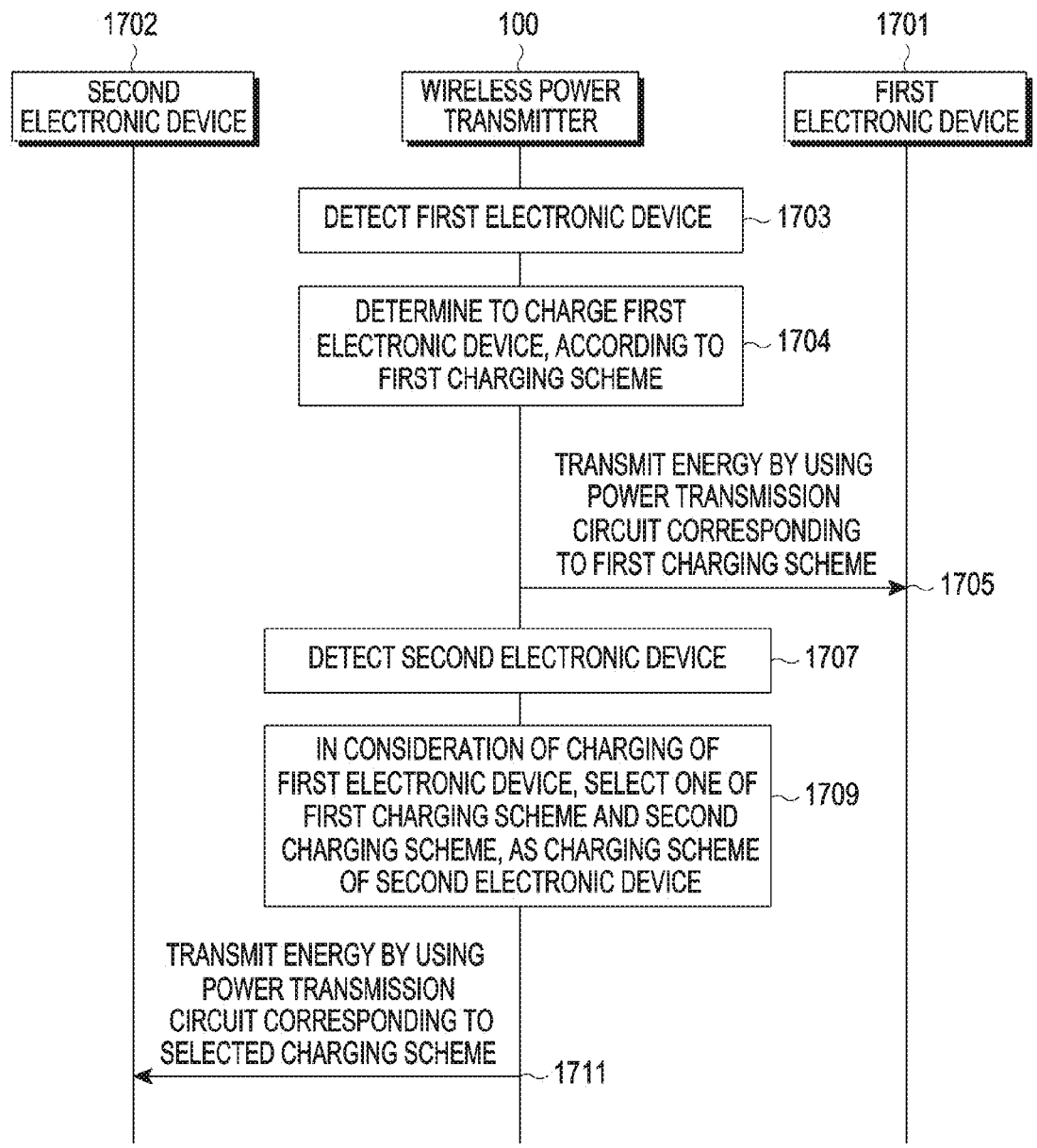
FIG. 17 illustrates a flowchart for explaining operation methods of the wireless power transmitter and multiple electronic devices according to various embodiments of the disclosure.

FIG. 17 illustrates a flowchart for explaining operation methods of the wireless power transmitter and multiple electronic devices according to various embodiments of the disclosure.

In operation 1703, the wireless power transmitter 100 may detect the first electronic device 1701. In operation 1704, the wireless power transmitter 100 may determine to charge a first electronic device according to the first charging scheme. As described above, the wireless power transmitter 100 may select the first charging scheme on the basis of at least one of a distance between the wireless power transmitter 100 and the first electronic device 1701, a magnitude and efficiency of energy received by the first electronic device 1701, whether a protocol is violated, or whether a living body is influenced. In operation 1705, the wireless power transmitter 100 may transmit energy by using a power transmission circuit corresponding to the first charging scheme.

In operation 1707, the wireless power transmitter 100 may detect a second electronic device 1702. In operation 1709, the wireless power transmitter 100 may select a charging scheme of the second electronic device to be one of the first charging scheme or the second charging scheme in consideration of charging of the first electronic device. For example, the wireless power transmitter 100 may select the charging scheme of the second electronic device 1702 to be the first charging scheme on the basis of at least one of a distance between the wireless power transmitter 100 and the second electronic device 1702, a magnitude and efficiency of energy received by the second electronic device 1702, whether a processor is violated, or whether a living body is influenced. When the first electronic device 1701 and the second electronic device 1702 both are charged according to the first charging scheme, the wireless power transmitter 100 may determine that sufficient power may not be transmitted to both electronic devices. Accordingly, the wireless power transmitter 100 may select the second charging scheme as the charging scheme of the second electronic device 1702. In operation 1711, the wireless power transmitter 100 may transmit energy by using a power transmission circuit corresponding to a selected charging scheme. The wireless power transmitter 100 may assign an identifier (ID) to each of the electronic devices 1701 and 1702 and may manage a charging scheme, charging time, a charging amount, etc. specific to each identifier. The wireless power transmitter 100 may recognize the identifiers according to a received instruction.

Figure 18:
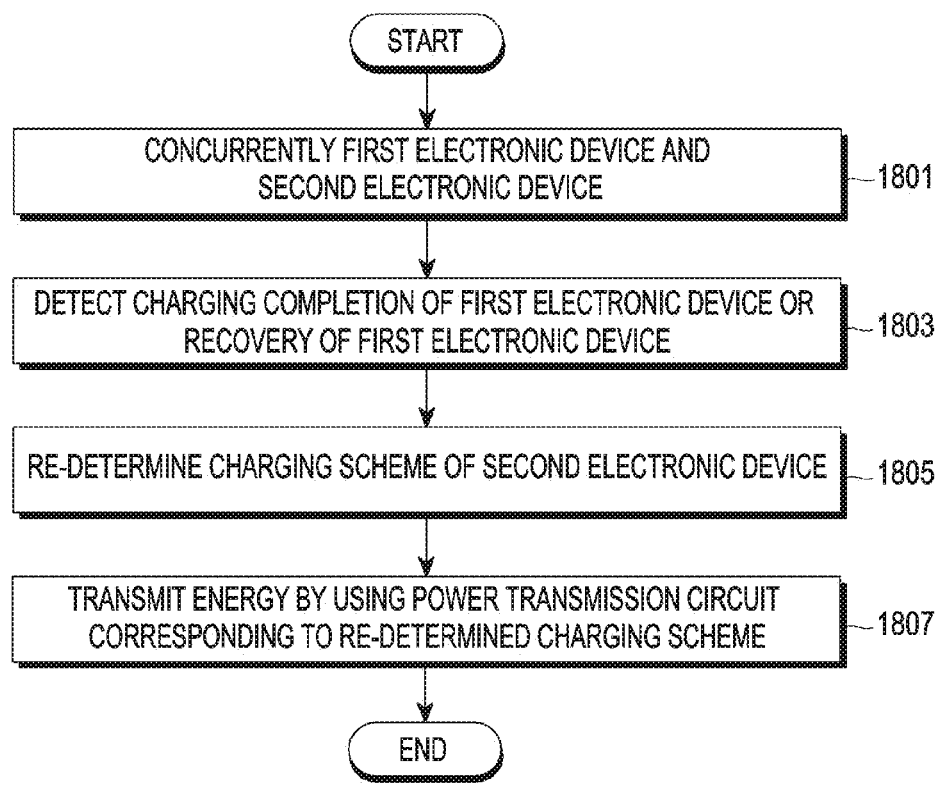
FIG. 18 illustrates a flowchart for explaining an operation method of the wireless power transmitter according to various embodiments of the disclosure.

FIG. 18 illustrates a flowchart for explaining an operation method of the wireless power transmitter according to various embodiments of the disclosure.

In operation 1801, the wireless power transmitter 100 may concurrently charge the first electronic device and the second electronic device. In operation 1803, the wireless power transmitter 100 may detect completion of charging of the first electronic device or recovery of the first electronic device. In operation 1805, the wireless power transmitter 100 re-determine the charging scheme of the second electronic device. For example, the wireless power transmitter 100 may charge the first electronic device in the first charging scheme and may charge the second electronic device in the second charging scheme. The wireless power transmitter 100 may detect the recovery of the first electronic device and may determine whether to charge the second electronic device according to the first charging scheme or according to the second charging scheme. For example, the wireless power transmitter 100 may determine that charging the second electronic device has a higher efficiency, and therefore the charging scheme of the second electronic device may be changed to the first charging scheme. In operation 1807, the wireless power transmitter 100 may transmit energy by using a power transmission circuit corresponding to the re-determined charging scheme. In various embodiments of the disclosure, the wireless power transmitter 100 may perform auxiliary charging when the first electronic device is fully charged. The wireless power transmitter 100 may transmit auxiliary charging power, the magnitude of which is smaller than that of existing charging power, to the first electronic device, so as to prevent the first electronic device from being discharged again after the completion of charging and enable a fully charged state to be maintained.

Figure 19:
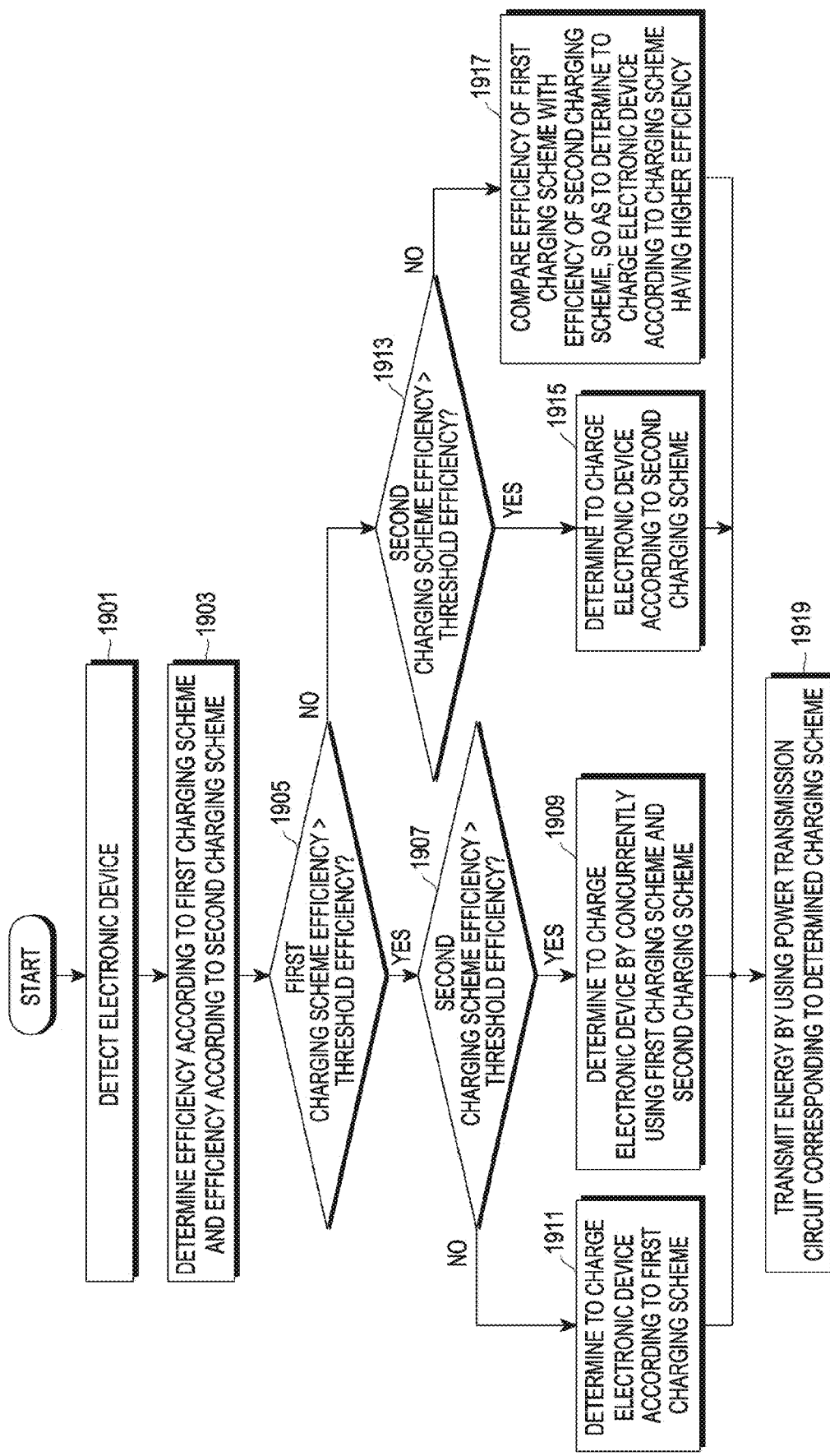
FIG. 19 illustrates a flowchart for explaining an operation method of the wireless power transmitter according to various embodiments of the disclosure.

FIG. 19 illustrates a flowchart for explaining an operation method of the wireless power transmitter according to various embodiments of the disclosure.

In operation 1901, the wireless power transmitter 100 may detect the electronic device 150. In operation 1903, the wireless power transmitter 100 may determine an efficiency according to the first charging scheme and an efficiency according to the second charging scheme. In operation 1905, the wireless power transmitter 100 may determine whether the efficiency of the first charging scheme exceeds a threshold efficiency. If it is determined that the efficiency of the first charging scheme exceeds the threshold efficiency, the wireless power transmitter 100 may determine, in operation 1907, whether the efficiency of the second charging scheme exceeds the threshold efficiency. If it is determined that the efficiency of the first charging scheme exceeds the threshold efficiency, and the efficiency of the second charging scheme exceeds the threshold efficiency, the wireless power transmitter 100 may determine, in operation 1909, to charge the electronic device 150 by concurrently using the first charging scheme and the second charging scheme. If it is determined that the efficiency of the first charging scheme exceeds the threshold efficiency, and the efficiency of the second charging scheme is equal to or lower than the threshold efficiency, the wireless power transmitter 100 may determine, in operation 1911, to charge the electronic device 150 according to the first charging scheme. In operation 1905, if it is determined that the efficiency of the first charging scheme is equal to or lower than the threshold efficiency, the wireless power transmitter 100 may determine, in operation 1913, whether the efficiency of the second charging scheme exceeds the threshold efficiency. If the efficiency of the first charging scheme is equal to or lower than the threshold efficiency, and the efficiency of the second charging scheme exceeds the threshold efficiency, the wireless power transmitter 100 may determine, in operation 1915, to charge the electronic device according to the second charging scheme. If the efficiency of the first charging scheme is equal to or lower than the threshold efficiency, and the efficiency of the second charging scheme is equal to or lower than the threshold efficiency, the wireless power transmitter 100 may, in operation 1917, compare the efficiency of the first charging scheme with the efficiency of the second charging scheme and determine to charge the electronic device 150 according to a charging scheme having a higher efficiency. In operation 1919, the wireless power transmitter 100 may transmit energy by using a power transmission circuit corresponding to the determined charging scheme. For example, when it is determined that charging is performed using both the first charging scheme and the second charging scheme, the wireless power transmitter 100 may transmit power to the electronic device 150 by forming a magnetic field by means of a coil (or a resonance circuit) while forming an RF wave using multiple patch antennas.

Figure 20A:
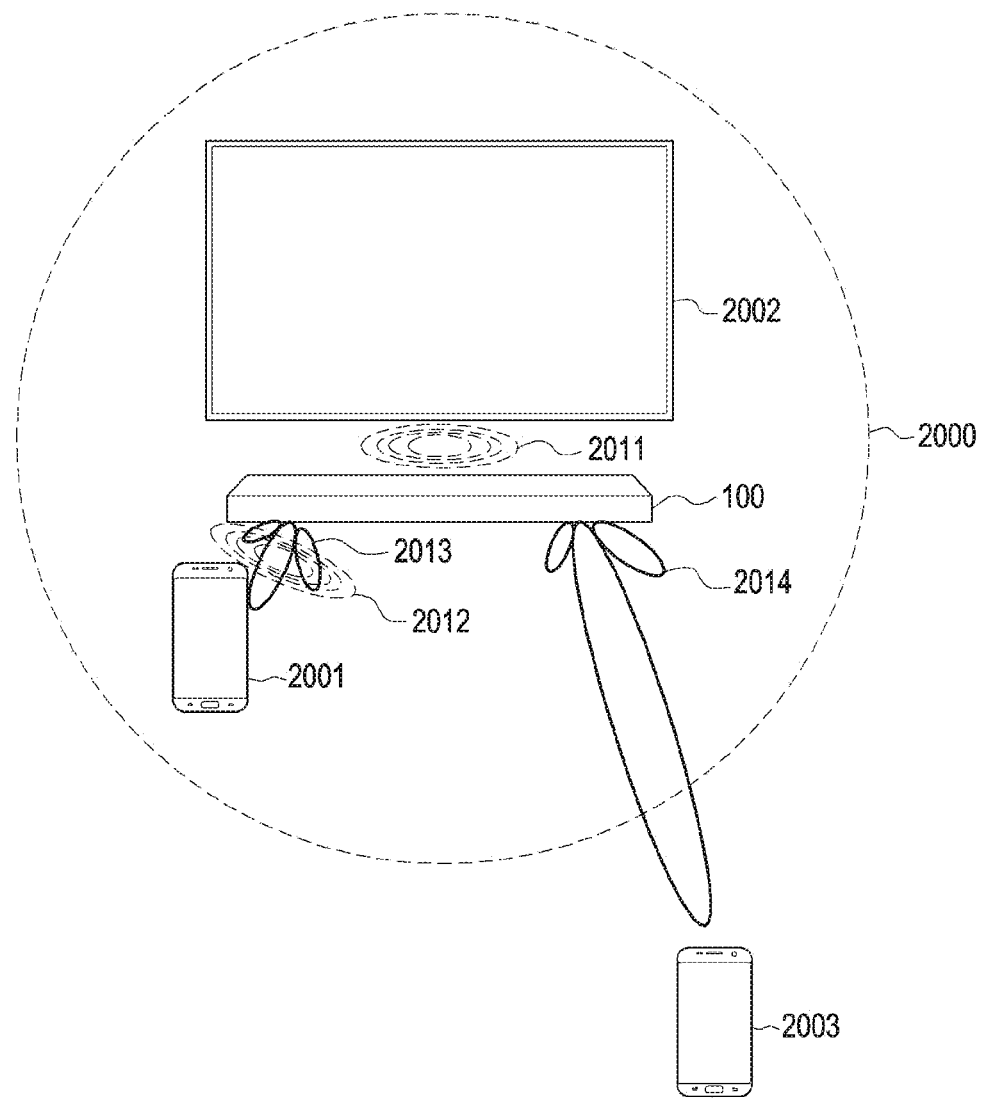
FIG. 20A illustrates a conceptual diagram for explaining charging the electronic device by the wireless power transmitter according to various embodiments of the disclosure.

FIG. 20A illustrates a conceptual diagram for explaining charging the electronic device by the wireless power transmitter according to various embodiments of the disclosure.

The wireless power transmitter 100 may be configured to perform charging according to the resonance scheme with respect to an electronic device included in a first range 2000, and may be configured to perform charging according to the electromagnetic wave scheme with respect to an electronic device located out of the first range 2000. The wireless power transmitter 100 may transmit power to a TV 2002 by forming a magnetic field 2011 according to the resonance scheme. The wireless power transmitter 100 may charge a first electronic device 2001 by using both the resonance scheme and the electromagnetic wave scheme. The wireless power transmitter 100 may transmit power to the first electronic device 2001 by forming a magnetic field 2012 according to the resonance scheme and forming an RF wave 2013 according to the electromagnetic wave scheme. The wireless power transmitter 100 may transmit power to the second electronic device 2003 by forming an RF wave 2014 according to the electromagnetic wave scheme. The wireless power transmitter 100 may perform beamforming at the location of the first electronic device 2001 to form the RF wave 2013 and may perform beamforming at the location of the second electronic device 2003 to form the RF wave 2014.

Figure 20B:
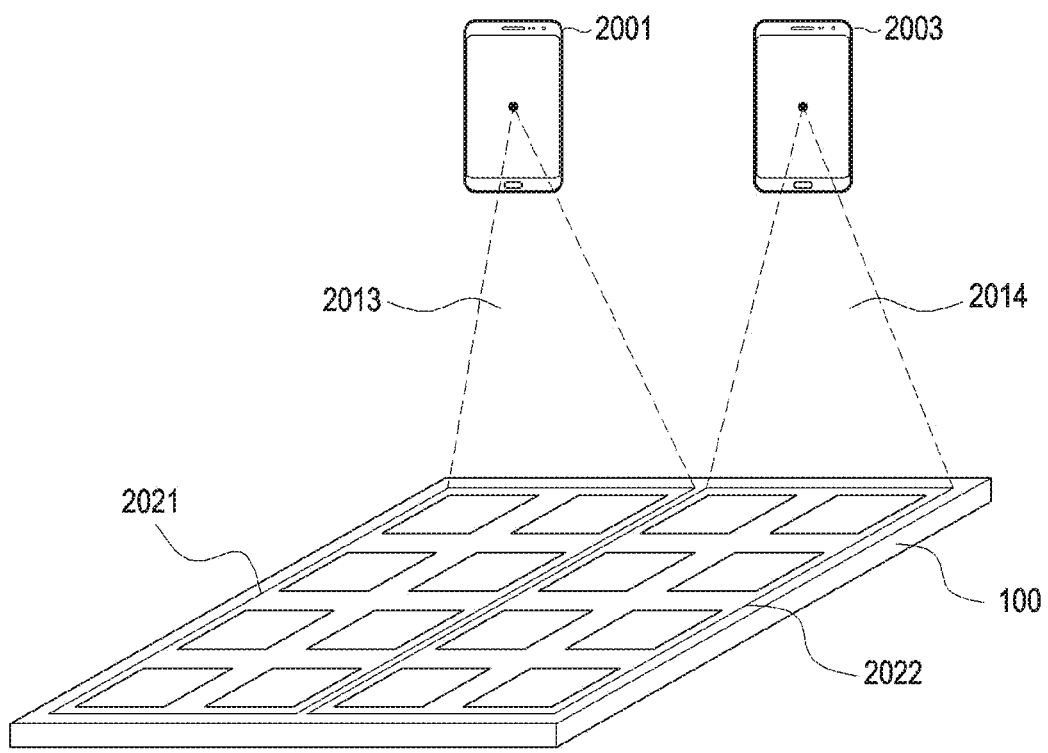
FIG. 20B and FIG. 20C illustrate conceptual diagrams for explaining RF wave formation for multiple locations according to various embodiments of the disclosure.
Figure 20C:
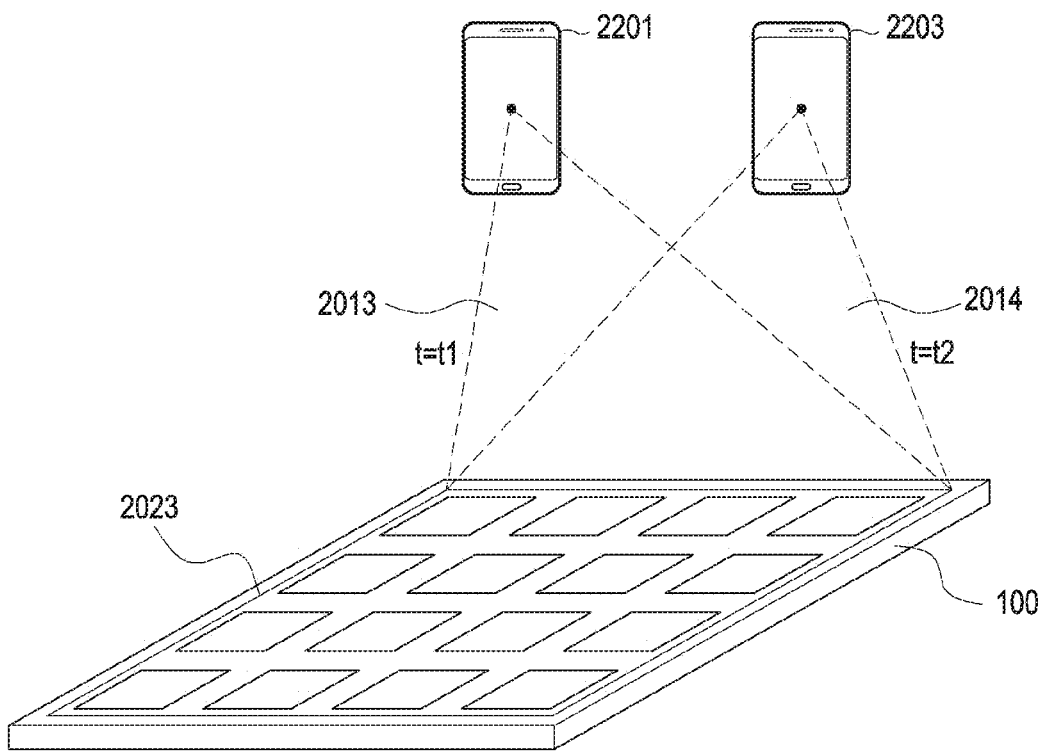

FIG. 20B and FIG. 20C illustrate conceptual diagrams for explaining RF wave formation for multiple locations according to various embodiments of the disclosure.

Referring to FIG. 20B, in various embodiments of the disclosure, the wireless power transmitter 100 may determine the locations of multiple electronic devices 2001 and 2003. For example, the wireless power transmitter 100 may determine a direction of the electronic device 2001 on the basis of a communication signal from the first electronic device 2001, and may determine a direction of the electronic device 2003 on the basis of a communication signal from the second electronic device 2003. The wireless power transmitter 100 may determine patch antenna groups 2221 and 2222 for charging the multiple respective electronic devices 2001 and 2003. The wireless power transmitter 100 may wirelessly charge the multiple electronic devices 2001 and 2003 by using the patch antenna groups 2221 and 2222. The wireless power transmitter 100 may perform wireless charging using the patch antenna group 2221. The wireless power transmitter 100 may perform wireless charging using the patch antenna group 2222.

In another embodiment, as described above, the wireless power transmitter 100 may select the patch antenna groups 2221 and 2222 in the directions of the multiple electronic devices 2001 and 2003, respectively. For example, the antenna group 2221 disposed on the relatively left side may be selected for the first electronic device 2001 determined to be disposed on the relatively left side of the wireless power transmitter 100, and the patch antenna group 2222 disposed on the relatively right side may be selected for the second electronic device 2003 determined to be disposed on the relatively right side of the wireless power transmitter 100. The patch antenna group 2221 may form the RF wave 2013 for charging the first electronic device 2001, and the patch antenna group 2222 may form the RF wave 2014 for charging the second electronic device 2003.

The wireless power transmitter 100 may select the number of patch antennas included in the patch antenna group on the basis of rated powers of the multiple respective electronic devices 2001 and 2003. For example, a relatively large number of patch antennas may be assigned to an electronic device having a relatively high rated power. According to the description above, the multiple electronic devices 2001 and 2003 may by concurrently charged.

Referring to FIG. 20B, the wireless power transmitter 100 may determine the directions of multiple electronic devices 2001 and 2003. The wireless power transmitter 100 may distribute a charging time for charging each of the multiple electronic devices 2001 and 2003. The wireless power transmitter 100 may wirelessly charge the multiple electronic devices 2001 and 2003 on the basis of the distributed charging time. For example, during a first time t1, each of all patch antennas 2223 is controlled to form sub-RF waves so as to form the RF wave 2013 for charging the first electronic device 2001, and during the second time t2, the RF wave 2014 for charging the second electronic device 2003 may be formed using all the patch antennas 2223. In various embodiments of the disclosure, the wireless power transmitter 100 may form the RF wave while alternating between the multiple electronic devices 2001 and 2003.

Figure 21:
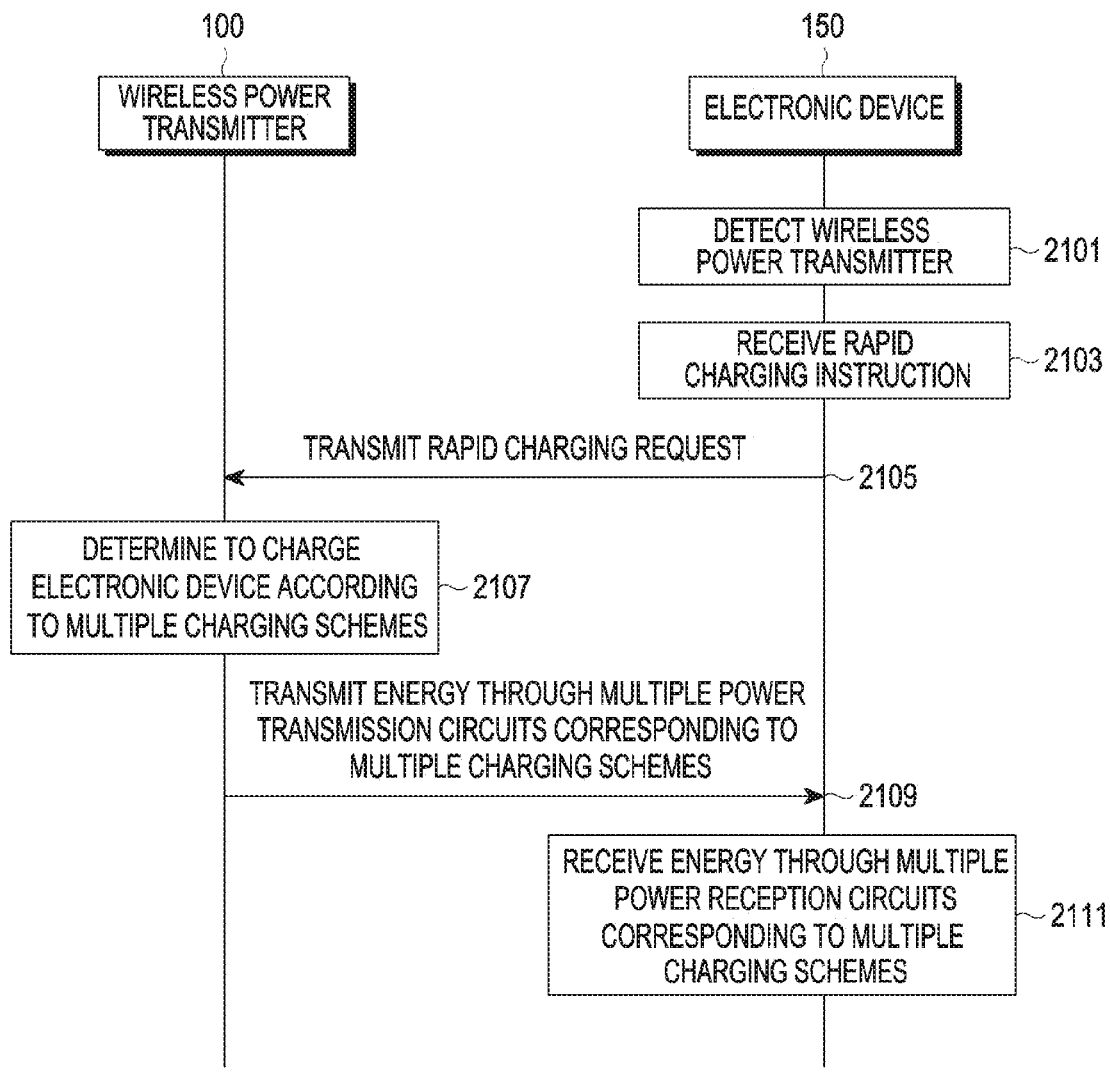
FIG. 21 illustrates a flowchart for explaining an operation method of the electronic device according to various embodiments of the disclosure.

FIG. 21 illustrates a flowchart for explaining an operation method of the electronic device according to various embodiments of the disclosure.

In operation 2101, the electronic device 150 may detect the wireless power transmitter 100. In operation 2103, the electronic device 150 may receive a rapid charging instruction. For example, the electronic device 150 may display a user interface enabling an input of a rapid charging instruction and may receive the rapid charging instruction via the user interface. In another embodiment, when a rapid charging initiation condition is detected, the electronic device 150 may initiate rapid charging in response thereto. In operation 2105, the electronic device 150 may transmit a rapid charging request.

In operation 2107, the wireless power transmitter 100 may determine to charge the electronic device 150 according to multiple charging schemes, in response to the received rapid charging request. In operation 2109, the wireless power transmitter 100 may transmit energy by using multiple power transmission circuits corresponding to the multiple charging schemes. In operation 2111, the electronic device 150 may receive energy through multiple power reception circuits corresponding to the multiple charging schemes. Accordingly, the electronic device 150 may receive a relatively large magnitude of power.

FIG. 22A to FIG. 22F illustrates a conceptual diagram for explaining the arrangement of the wireless power transmitter according to various embodiments of the disclosure.

Figure 22A:
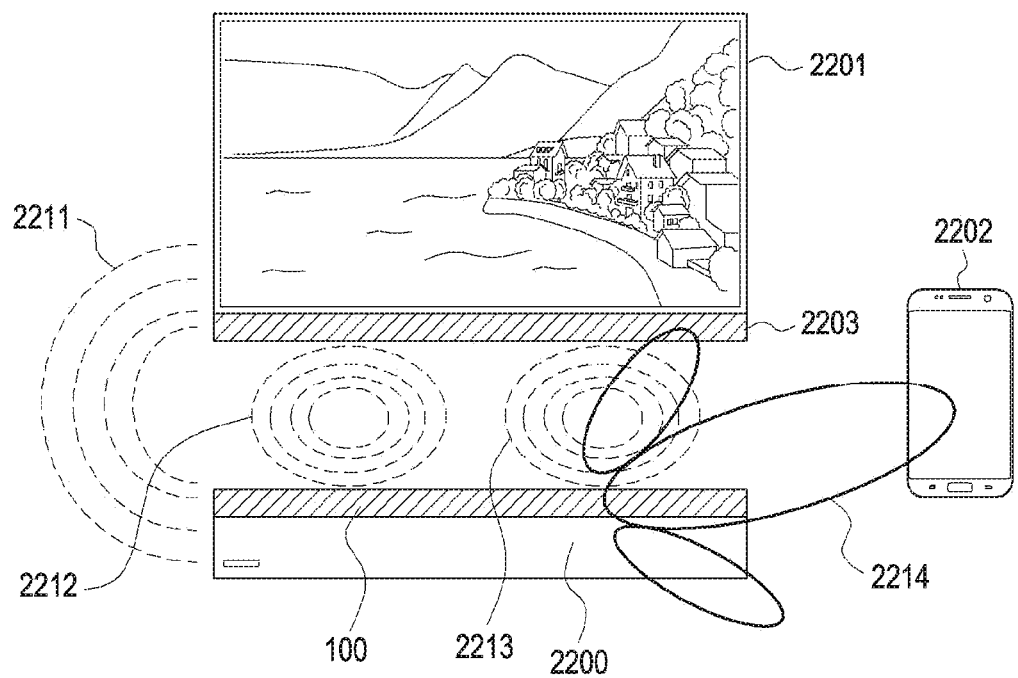
FIG. 22A to FIG. 22F illustrate a conceptual diagram for explaining the arrangement of the wireless power transmitter according to various embodiments of the disclosure.

Referring to FIG. 22A, the wireless power transmitter 100 may be included in a data transmission/reception device 2200. For example, the data transmission/reception device 2200 may wirelessly transmit data to or receive data from a TV 2201. For example, the data transmission/reception device 2200 may wirelessly transmit, to the TV 2201, at least one of a video signal or an audio signal received from the outside. The wireless power transmitter 100 may have a shape elongated laterally depending on a shape of the data transmission/reception device 2200. The wireless power transmitter 100 included in the data transmission/reception device 2200 may wirelessly transmit power to the TV 2201. Therefore, the TV 2201 may wirelessly receive at least one of power, a video signal, or an audio signal without a connection through a wire. For example, the wireless power transmitter 100 may transmit power to the TV 2201 by forming magnetic fields 2211, 2212, and 2213 according to the resonance scheme. The TV 2201 may include the wireless power receiver 2203, and the wireless power receiver 2203 may, for example, convert the magnetic fields 2211, 2212, and 2213 generated in the vicinity into current, voltage, or power. For example, the wireless power receiver 2203 may have a shape elongated laterally corresponding to a shape of the wireless power transmitter 100. In various embodiments of the disclosure, the wireless power transmitter 100 may perform charging according to the electromagnetic wave scheme, and may form, for example, the RF wave 2214 with respect to the location of the electronic device 2202 located in a relatively remote distance. When the TV 2201 is turned off, the wireless power transmitter 100 may form a magnetic field in order to charge the electronic device 2202.

Figure 22B:
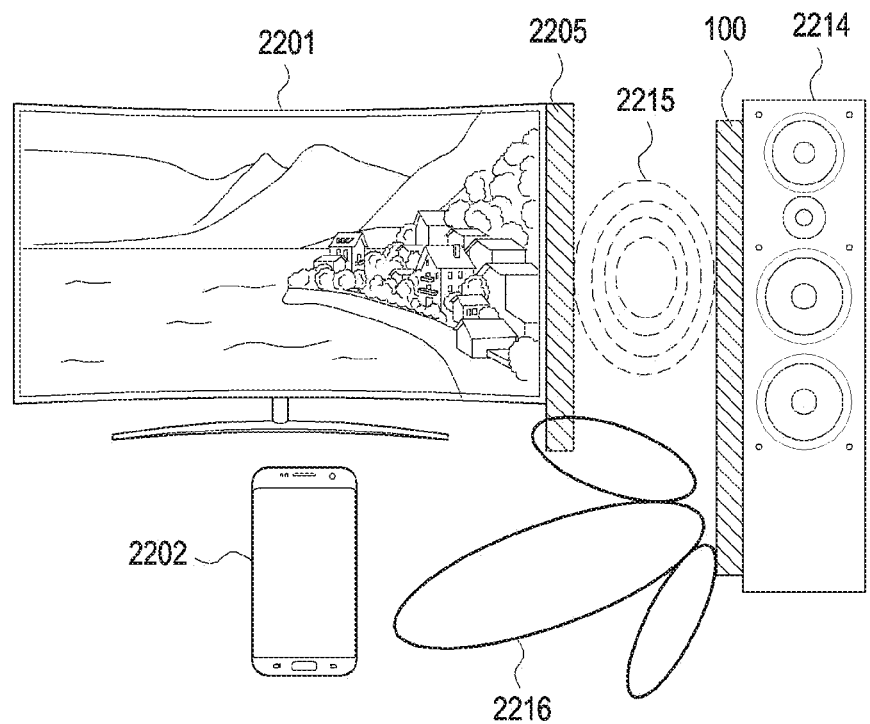

Referring to FIG. 22B, the wireless power transmitter 100 may be included in an audio device 2214. The wireless power transmitter 100 may have a shape elongated longitudinally depending on a shape of the audio device 2214. A wireless power receiver 2205 included in the TV 2201 may have a shape elongated longitudinally corresponding to a shape of the wireless power transmitter 100. The wireless power transmitter 100 may transmit power to the wireless power receiver 2205 by forming a magnetic field 2215. The wireless power transmitter 100 may transmit power to the electronic device 2202 by forming an RF wave 2216.

Figure 22C:
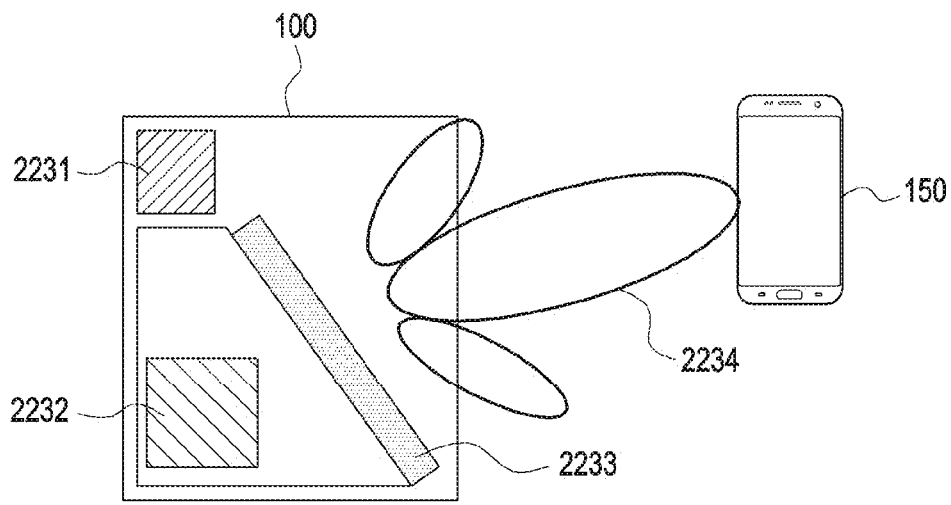
Figure 22D:
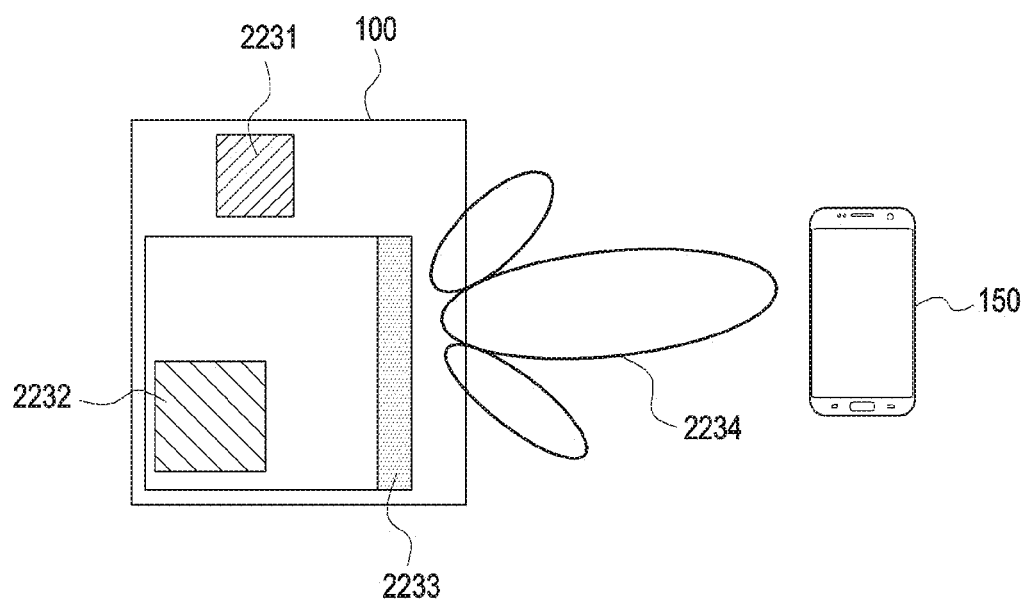

Referring to FIG. 22C, the wireless power transmitter 100 may include a power transmission circuit 2231 according to the resonance scheme or the induction scheme, a control circuit 2232, and a power transmission circuit 2233 according to the electromagnetic wave scheme. As described above, the power transmission circuit 2231 may include at least one of a capacitor, a coil, an amplification circuit, a power source providing power having, for example, a frequency of 100 kHz to 205 kHz or a frequency of 6.78 MHz. The power transmission circuit 2233 may include a patch antenna array, a phase shifter, a distribution circuit, an amplification circuit, or a power source providing power having, for example, a frequency of 5.8 GHz. The power transmission circuit 2233 may be disposed to be formed toward the RF wave 2234 in the relatively upward direction. When the wireless power transmitter 100 is disposed, for example, on the floor, the electronic device 150 may be highly likely to be located on the upper side compared to the wireless power transmitter 100. Accordingly, the patch antenna array may be disposed to be inclined with respect to the bottom surface so that the RF wave 2234 may be directed upward. The control circuit 2232 may include, for example, a communication circuit or a processor, may perform communication with the electronic device 150, or may control the power transmission circuit 2231 or power transmission of the power transmission circuit 2233. Referring to FIG. 22D, the power transmission circuit 2233 may be disposed so as to be substantially perpendicular to the floor. For example, when a height at which the wireless power transmitter 100 is disposed is similar to a height at which the electronic device 150 is primarily disposed, the RF wave 2234 may be formed parallel to the floor. As illustrated in FIG. 22C and FIG. 22D, the placement direction of the patch antenna arrays of the electromagnetic wave scheme may be changed depending on the placement position of the wireless power transmitter 100. The wireless power transmitter 100 according to various embodiments of the disclosure may include an actuator for mechanically adjusting the placement direction of the patch antenna array. The wireless power transmitter 100 may mechanically change the displacement direction of the patch antenna array according to the location or direction in which the electronic device is located.

Figure 22E:
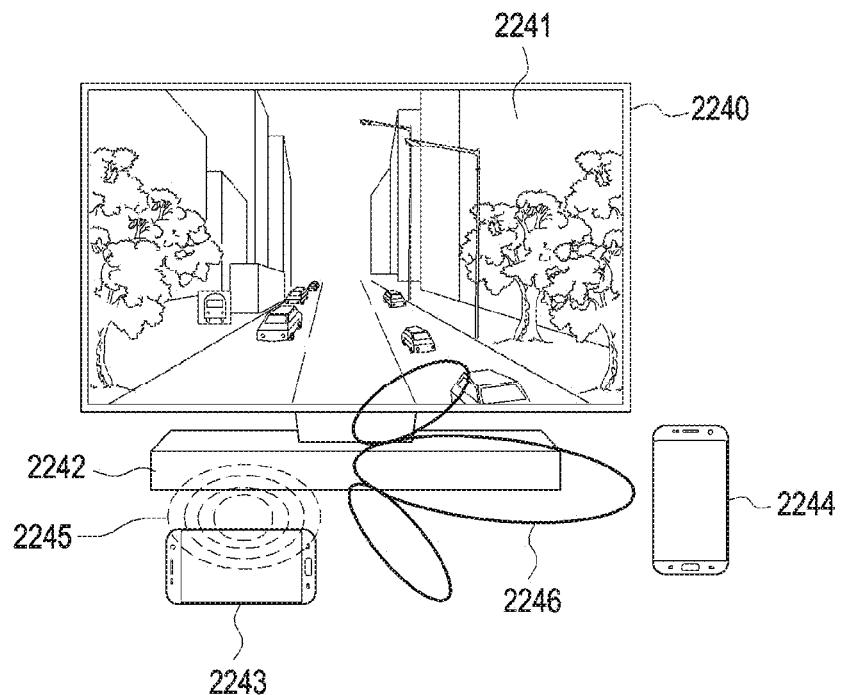
Figure 22F:
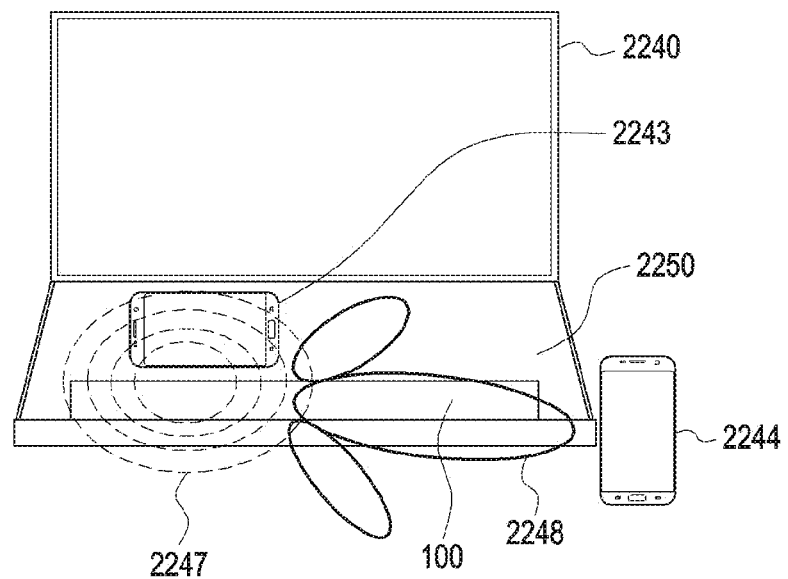

Referring to FIG. 22E, a TV 2240 may include a display 2241 and a body 2242. The body 2242 may include a power transmission circuit capable of generating a magnetic field 2245 and a power transmission circuit capable of generating an RF wave 2246. Therefore, electronic devices 2243 and 2244 may be charged using the RF wave 2246 and the magnetic field 2245 formed from the body 2242. Referring to FIG. 22F, the TV 2240 may be supported by a supporting structure 2250. The wireless power transmitter 100 disposed within the supporting structure 2250 may include a power transmission circuit that generates a magnetic field 2247 and a power transmission circuit that forms an RF wave 2248. Therefore, the electronic devices 2243 and 2244 may be charged using the RF wave 2248 and the magnetic field 2247 formed from the wireless power transmitter 100. There is no limitation on a displacement shape of the wireless power transmitter 100. For example, the wireless power transmitter 100 may be disposed on a desk or under a desk, and may charge various electronic devices positioned on a desk, such as a smartphone, a keyboard, and a mouse, on the basis of at least one of the resonance scheme, the induction scheme, or the electromagnetic wave scheme.

Figure 23:
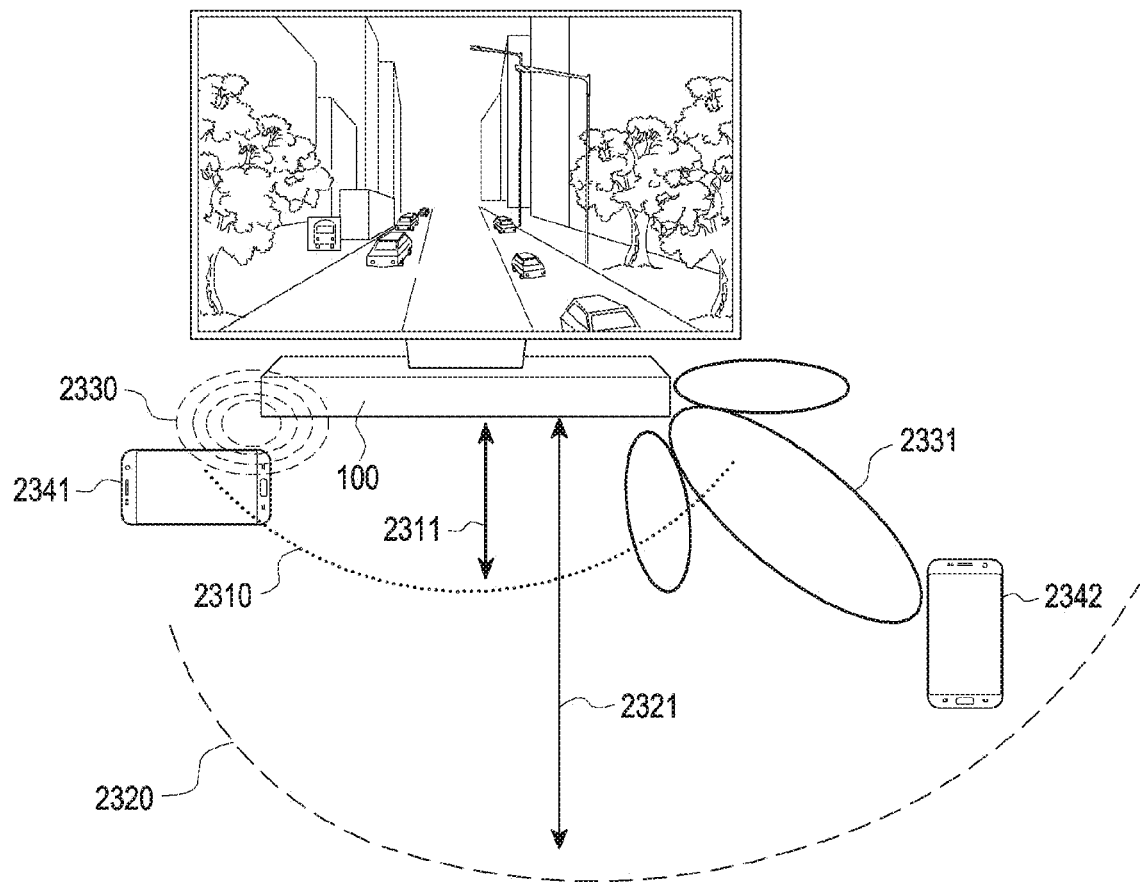
FIG. 23 illustrates a conceptual diagram for explaining determination criteria for a short distance charging and a long distance charging according to various embodiments of the disclosure.

FIG. 23 illustrates a conceptual diagram for explaining determination criteria for a short distance charging and a long distance charging according to various embodiments of the disclosure.

As illustrated in FIG. 23, the first area 2310, in which a distance from the wireless power transmitter 100 is equal to or less than a first distance 2311, may be configured as a short distance charging area. A second area 2320, in which a distance of the wireless power transmitter 100 exceeds the first distance 2311 and equal to or less than a second distance 2321, may be configured as a long distance charging area. In the short distance charging area, the wireless power transmitter 100 may charge an electronic device 2341 by forming a magnetic field 2230 according to the resonance scheme or the induction scheme. In the long distance charging area, the wireless power transmitter 100 may charge an electronic device 2342 by forming an RF wave 2331 according to the electromagnetic wave scheme. In various embodiments of the disclosure, for example, the wireless power transmitter 100 may configure, as the first area 2310, a range in which an efficiency of the resonance scheme is higher than an efficiency of the electromagnetic wave scheme, a range, in which an intensity of power received by the electronic device according to the resonance scheme is higher than an intensity of power received by the electronic device according to the electromagnetic wave scheme, and the like. Alternatively, the wireless power transmitter 100 may configure, as the first area 2310, a range in which power transmission by the resonance scheme satisfies an optimum EMI condition, a range in which a magnitude of a magnetic field is equal to or less than a preconfigured numerical value (e.g., 6.25 µT), and the like. In various embodiments, the wireless power transmitter 100 may determine the first distance 2311 according to a type of the electronic device. For example, the wireless power transmitter 100 may configure the first distance 2311 to be relatively large with respect to the electronic device, such as a TV, which includes a coil having a relatively high reactance. Alternatively, the wireless power transmitter 100 may configure the first distance 2311 to be relatively small with respect to the electronic device, such as a smartphone, which includes a coil having a relatively low reactance.

Figure 24A:
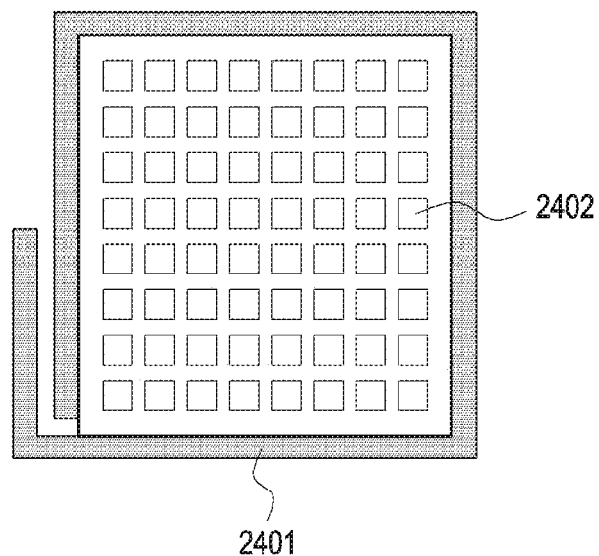
FIG. 24A illustrates a plan view for explaining locations of a coil and a patch antenna array according to various embodiments of the disclosure.
Figure 24B:
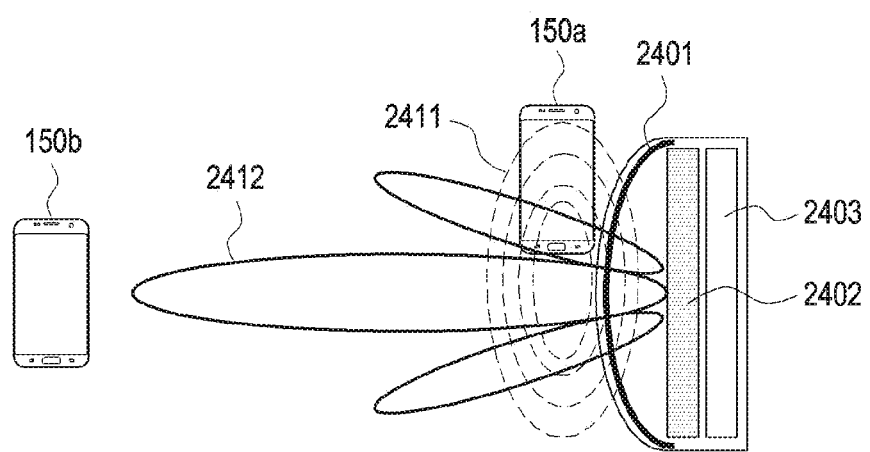
FIG. 24B illustrates a first side view observed in a first direction, for explaining the locations of the coil and the patch antenna array according to various embodiments of the disclosure.
Figure 24C:
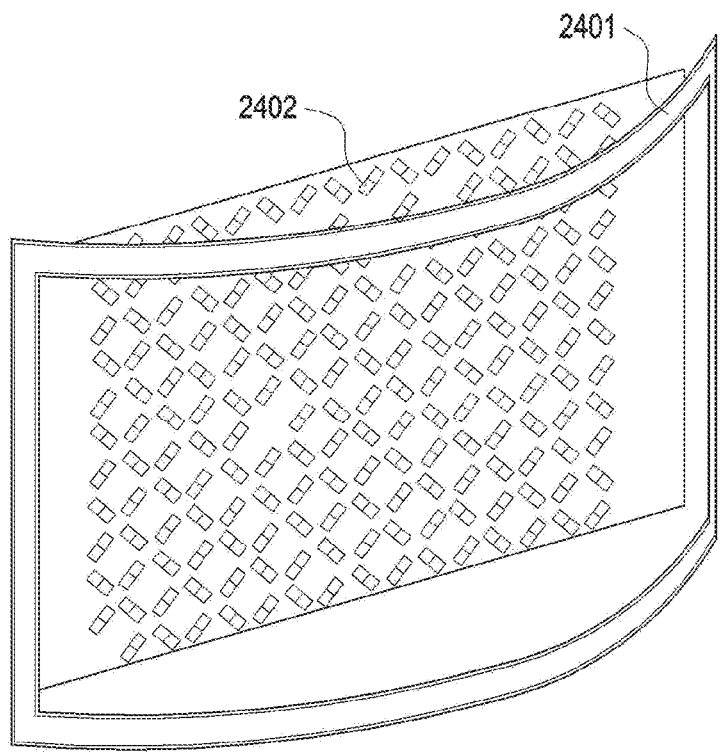
FIG. 24C is a perspective view for explaining the locations of the coil and the patch antenna array according to various embodiments of the disclosure.
Figure 24D:
FIG. 24D illustrates a second side view observed in a second direction, for explaining the locations of the coil and the patch antenna array according to various embodiments of the disclosure.
Figure 24E:
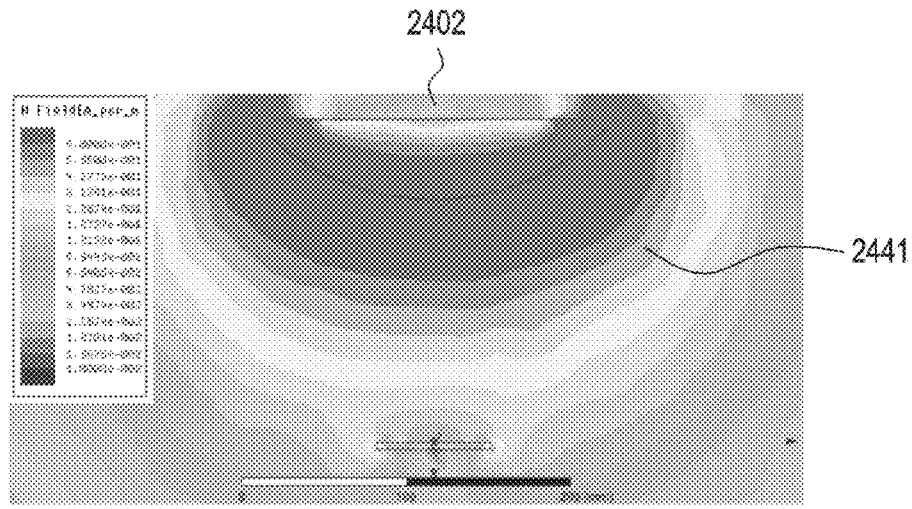
FIG. 24E illustrates an RF wave formed by the patch antenna array according to various embodiments of the disclosure.
Figure 24F:
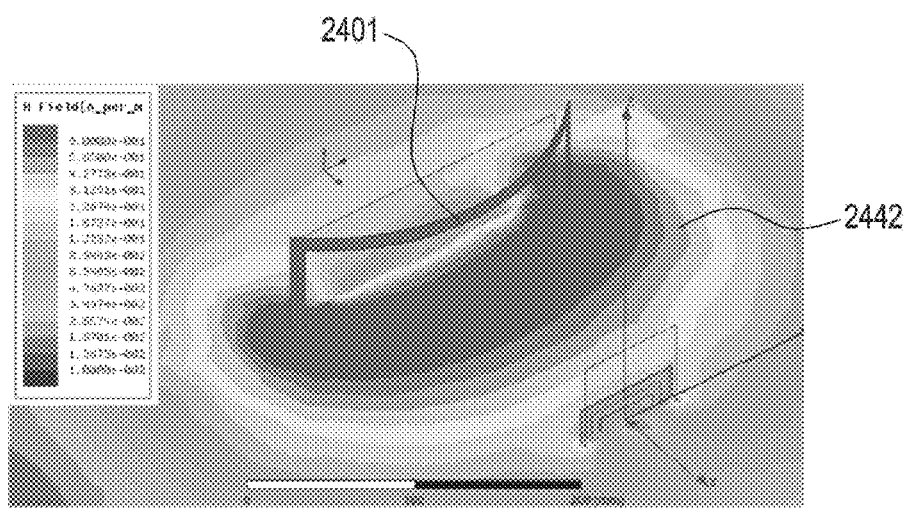
FIG. 24F illustrates a magnetic field formed by the coil according to the various embodiments of the disclosure.

FIG. 24A illustrates a plan view for explaining locations of a coil and a patch antenna array according to various embodiments of the disclosure. As illustrated in FIG. 24A, a coil 2401 may be located around a patch antenna array 2402 including multiple patch antennas. Although the coil 2401 is illustrated as being wound twice, this is merely exemplary and the number of windings of the coil 2401 is not limited. FIG. 24B is a first side view observed in a first direction, for explaining the locations of the coil and the patch antenna array according to various embodiments of the disclosure, FIG. 24C is a perspective view, and FIG. 24D illustrates a second side view observed in a second direction. As illustrated in FIG. 24B to FIG. 24D, a part of the coil 2401, which extends in the lateral direction, may have a curved shape. The part of the coil 2401, which has a curved shape, may be spaced a specified distance from the patch antenna array 2402. Accordingly, the magnetic field generated by the coil 2401 and the RF wave from the patch antenna array 2402 may not be interfered with each other. As illustrated in FIG. 24E, an RF wave 2441 from the patch antenna array 2402 may be formed well without the influence of the coil 2401. As illustrated in FIG. 24F, a magnetic field 2442 formed in the coil 2401 may be formed well without the influence of the patch antenna array 2402. The electronic device according to various embodiments of the disclosure may also include the coil 2401 and the patch antenna array 2402. In various embodiments of the disclosure, the coil 2401 may be implemented in various shapes, such as a circular shape and an elliptical shape. The patch antenna array may be manufactured in a relatively small size, or may be implemented in a flip type or the like.

Figure 25:
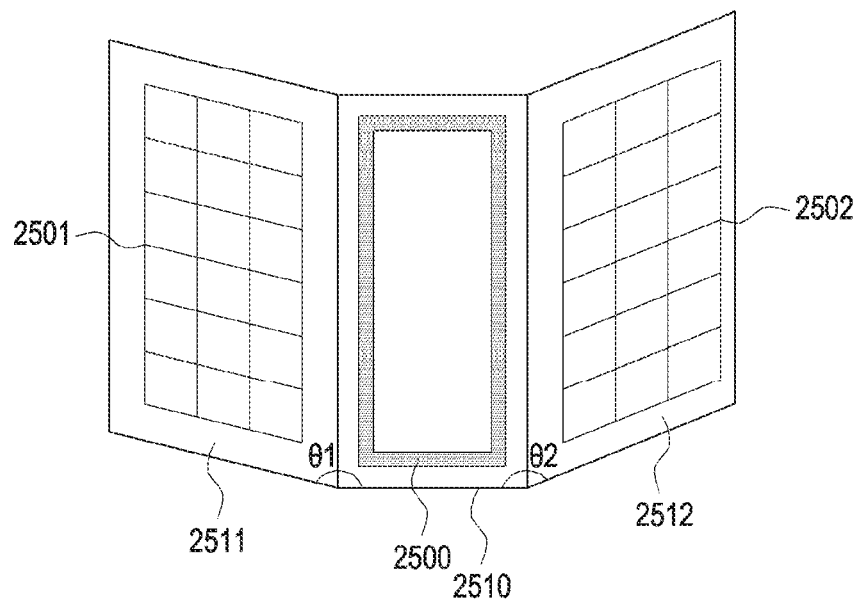
FIG. 25 illustrates a conceptual diagram for explaining the locations of the coil and the patch antenna array according to various embodiments of the disclosure.

FIG. 25 illustrates a conceptual diagram for explaining the locations of the coil and the patch antenna array according to various embodiments of the disclosure. As illustrated in FIG. 25, a coil 2500 may be disposed on a first surface 2510. A patch antenna array 2501 may be disposed on a second surface 2511, and a patch antenna array 2502 may be disposed on a third surface 2512. A first angle θ1 formed by the first surface 2510 and the second surface 2511, and a second angle θ2 formed by the first surface 2510 and the third surface 2512 may be the same or different. At least one of the first angle θ1 or the second angle θ2 may be mechanically adjusted by a processor, and the wireless power transmitter 100 may further include an actuator for adjusting angles.

Each of the components of the electronic device according to the disclosure may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the disclosure may be implemented by an instruction stored in a computer-readable storage medium in a programming module form. When the instruction is executed by one or more processors, the one or more processors may perform a function corresponding to the instruction. The computer-readable storage medium may be, for example, the memory.

Various embodiments of the disclosure relate to a storage medium that stores instructions, wherein the instructions are configured to cause, when executed by at least one processor, the processor to perform at least one operation including: detecting an electronic device; selecting at least one of a coil or multiple patch antennas, as a power transmission circuit to transmit power for changing an electronic device; and transmitting the power through at least one of the coil or the multiple patch antennas according to the selection.

Various embodiments of the disclosure relate to a storage medium that stores instructions, wherein the instructions are configured to cause, when executed by at least one processor, the processor to perform at least one operation including: selecting at least one of a coil or the multiple patch antennas, as a power reception circuit to receive power from a power transmitter; transmitting information of the selected power reception circuit to a wireless power transmitter; and receiving the power through at least one of the coil or the multiple patch antennas according to the selection.

The instructions as described above may be stored in an external server, or may be downloaded by and installed in an electronic device, such as a wireless power transmitter. That is, an external server according to various embodiments of the disclosure may store instructions that can be downloaded by the wireless power transmitter.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added.

Various embodiments disclosed herein are provided merely to easily describe technical details of the disclosure and to help the understanding of the disclosure, and are not intended to limit the scope of the disclosure. Therefore, it should be construed that all modifications and changes or modified and changed forms based on the technical idea of the disclosure fall within the scope of the disclosure.

The invention claimed is:

1. A wireless power transmitter comprising:
   multiple patch antennas configured to transmit power to an electronic device according to a first charging method;
   a coil configured to transmit power to the electronic device according to a second charging method;
   a communication circuit; and
   a processor, wherein the processor is configured to:
　　control the wireless power transmitter to detect the electronic device,
　　based on detecting the electronic device, control the wireless power transmitter to transmit a first testing power through the multiple patch antennas and a second testing power through the coil,
　　based on transmitting the first testing power and the second testing power, receive, from the electronic device, through the communication circuit, information indicating at least one charging method for charging the electronic device, wherein the at least one charging method is at least one of the first charging method and the second charging method, and
　　based on the received information indicating the at least one charging method, select at least one power transmission circuit among the coil or the multiple patch antennas, and control the wireless power transmitter to transmit power for charging the electronic device using the selected at least one power transmission circuit.

2. The wireless power transmitter of claim 1, wherein the processor is further configured to:
　　determine a distance between the wireless power transmitter and the electronic device, and
　　select, based on the distance, at least one of the coil or the multiple patch antennas, as a as the at least one power transmission circuit for charging the electronic device.

3. The wireless power transmitter of claim 2, wherein the processor is further configured to:
　　based on the distance exceeding a threshold distance, select the multiple patch antennas as the at least one power transmission circuit for charging the electronic device, and
　　based on the distance being equal to or less than the threshold distance, select the coil as the at least one power transmission circuit for charging the electronic device.

4. The wireless power transmitter of claim 3, wherein the processor is configured to:
　　based on the threshold distance corresponding to the electronic device, select the at least one power transmission circuit for charging the electronic device.

5. The wireless power transmitter of claim 1,
wherein the at least one charging method is determined by the electronic device based on a first magnitude, at which the first testing power is received in the electronic device, and a second magnitude, at which the second testing power is received in the electronic device.

6. The wireless power transmitter of claim 1,
wherein the processor is further configured to receive, through the communication circuit, first information of a first magnitude, at which the first testing power is received in the electronic device, and second information of a second magnitude, at which the second testing power is received in the electronic device, and
select, using the received first information and the received second information, at least one of coil or the multiple patch antennas as the at least one power transmission circuit for charging the electronic device.

7. The wireless power transmitter of claim 1,
wherein the processor is further configured to transmit a first transmission intensity of the first testing power and a second transmission intensity of the second testing power to the electronic device through the communication circuit, and
wherein the at least one charging method is determined by the electronic device based on a first transmission efficiency of the first testing power identified based on the first transmission intensity of the first testing power and a first reception intensity of the first testing power, and a second transmission efficiency of the second testing power identified based of the second transmission intensity of the second testing power and a second reception intensity of the second testing power.

8. The wireless power transmitter of claim 1,
wherein the processor is further configured to:
receive, through the communication circuit, a first reception intensity of the first testing power in the electronic device and a second reception intensity of the second testing power in the electronic device,
determine a first transmission efficiency of the first testing power based on first transmission intensity of the first testing power and the first reception intensity of the first testing power,
determine a second transmission efficiency of the second testing power based on a second transmission intensity of the second testing power and the second reception intensity of the second testing power,
based on the first transmission efficiency of the first testing power and the second transmission efficiency of the second testing power, select at least one of the coil or the multiple patch antennas as the at least one power transmission circuit for charging the electronic device.

9. The wireless power transmitter of claim 1, wherein the processor is further configured to:
　　based on transmitting of the first testing power and the second testing power, determine whether a specified protocol is violated, and
　　based on a determination result, select at least one of the coil or the multiple patch antennas as the at least one power transmission circuit for charging the electronic device.

10. The wireless power transmitter of claim 1, wherein the processor is further configured to:
　　detect a living body located near the wireless power transmitter, and
　　based on whether the living body is influenced, select at least one of the coil or the multiple patch antennas as the at least one power transmission circuit for charging the electronic device.

11. The wireless power transmitter of claim 1,
wherein the processor is further configured to:
receive information of the electronic device through the communication circuit, and
based on the received information of the electronic device, select at least one of the coil or the multiple patch antennas as the at least one power transmission circuit for charging the electronic device.

12. The wireless power transmitter of claim 1,
wherein the processor is further configured to receive, through the communication circuit, the information indicating the at least one charging method specified via a user interface of the electronic device.

13. The wireless power transmitter of claim 1,
wherein the processor is further configured to transmit, to the electronic device, information of the selected at least one power transmission circuit for charging the electronic device.

14. The wireless power transmitter of claim 1, wherein the processor is further configured to:
   control the wireless power transmitter to transmit first power through the multiple patch antennas at a first time point, and
   control the wireless power transmitter to transmit second power through the coil at a second time point.

\* \* \* \* \*